US012715819B2

(12) United States Patent
Liu et al.

(10) Patent No.: US 12,715,819 B2
(45) Date of Patent: Aug. 25, 2026

(54) BLOCK COPOLYMER POROUS CARBON FIBERS AND USES THEREOF

(71) Applicant: VIRGINIA TECH INTELLECTUAL PROPERTIES, INC., Blacksburg, VA (US)

(72) Inventors: Guoliang Liu, Blacksburg, VA (US); Zhengping Zhou, Blacksburg, VA (US)

(73) Assignee: VIRGINIA TECH INTELLECTUAL PROPERTIES, INC., Blacksburg, VA (US)

( * ) Notice: Subject to any disclaimer, the term of this patent is extended or adjusted under 35 U.S.C. 154(b) by 1484 days.

(21) Appl. No.: 17/049,332

(22) PCT Filed: Apr. 19, 2019

(86) PCT No.: PCT/US2019/028371

§ 371 (c)(1),
(2) Date: Oct. 20, 2020

(87) PCT Pub. No.: WO2019/204762

PCT Pub. Date: Oct. 24, 2019

(65) Prior Publication Data

US 2021/0047242 A1 Feb. 18, 2021

Related U.S. Application Data

(60) Provisional application No. 62/660,881, filed on Apr. 20, 2018.

(51) Int. Cl.
*C04B 35/83* (2006.01)
*C01B 32/05* (2017.01)
(Continued)

(52) U.S. Cl.
CPC .............. *C04B 35/83* (2013.01); *C01B 32/05* (2017.08); *D01D 5/0007* (2013.01); *D01D 5/247* (2013.01);
(Continued)

(58) Field of Classification Search
CPC ...... C04B 35/83; C01B 32/05; D01D 5/0007; D01D 5/247; D01F 6/40; D01F 9/22
(Continued)

(56) References Cited

U.S. PATENT DOCUMENTS

2013/0183511 A1* 7/2013 Dai ...................... B01J 20/3078 252/502

FOREIGN PATENT DOCUMENTS

CN 102765782 A * 11/2012
WO WO-2013123137 A1 * 8/2013 .............. B22F 1/004

OTHER PUBLICATIONS

Machine_English_translation_CN_102765782_A; Shi et. al.; Method for preparing hierarchical porous carbon capacitive deionization electrode; Nov. 7, 2012; EPO; whole document (Year: 2024).*
(Continued)

*Primary Examiner* — Tahseen Khan
(74) *Attorney, Agent, or Firm* — Carin R. Miller; Lex Generalis, LLC

(57) ABSTRACT

Described herein are porous carbon fibers, methods of making the porous carbon fibers, and methods of using the porous carbon fibers. In some aspects, the porous carbon fibers can have a hierarchical distribution of uniformly distributed meso- and micropores, wherein the micropores and mesopores can be interconnected. In aspects, the porous carbon fibers can have mesopores with a uniform pore size.

20 Claims, 39 Drawing Sheets

(51) Int. Cl.
*D01D 5/00* (2006.01)
*D01D 5/247* (2006.01)
*D01F 6/40* (2006.01)
*D01F 9/22* (2006.01)

(52) U.S. Cl.
CPC .................. *D01F 6/40* (2013.01); *D01F 9/22* (2013.01); *C01P 2004/03* (2013.01); *C01P 2004/04* (2013.01); *C01P 2006/12* (2013.01); *C01P 2006/14* (2013.01); *C01P 2006/17* (2013.01); *C04B 2235/422* (2013.01); *C04B 2235/5248* (2013.01)

(58) Field of Classification Search
USPC .......................................................... 428/131
See application file for complete search history.

(56) References Cited

OTHER PUBLICATIONS

"International Search Report and Written Opinion issued by the United States International Searching Authority on Apr. 20, 2017 for PCT/US2017/012269."
Choma, et al., "New opportunities in Stober Synthesis: preparation of microporous and mesoporous carbon spheres", Journal of Materials Chemistry, vol. 25, pp. 1-5, Apr. 19, 2012.
Dutta, et al., "Hierachically porous carbon derived from polymers and biomass: effect of interconnected pores on energy applications", Energy & Environmental Science, vol. 7, No. 11, pp. 3574-3592, Nov. 2014.
Zhou, et al., "Block copolymer-based porous carbon fibers", Science Advances, vol. 5, No. 2, pp. 1-9, Feb. 1, 2019.
Zhou, et al., "Controlling the Pore Size of Mesoporous Carbon Thin Films through Thermal and Solvent Annealing.", Small, Advanced Science News, vol. 13, No. 15, pp. 1-9, Feb. 2, 2017.
Kupgan et al., "NLDFT Pore Size Distribution in Amorphous Microporous Materials", Langmuir, vol. 33, pp. 11138-11145, Published: Aug. 22, 2017.
Zhong, et al., "Electrochemically Active Nitrogen-Enriched Nanocarbons with Well-Defined Morphology Synthesized by Pyrolysis of Self-Assembled Block Copolymer", J. Am. Chem. Soc., vol. 134, pp. 14846-14857, Published: Aug. 15, 2012.
Duay, et al., "Self-Limiting Electrodeposition of Hierarchical MnO2 and M(OH)2/MnO2 Nanofibril/Nanowires Mechanism and Supercapacitor Properties", ACS Nano, vol. 7, No. 2, pp. 1200-1214, Published online:Jan. 17, 2013.
Lee, et al., "Differentiate the pseudocapacitance and double-layer capacitance contributions for nitrogen-doped reduced graphene oxide in acidic and alkaline electrolytes", J. Power Sources, vol. 227, pp. 300-308, Available online: Nov. 23, 2012.
Ardizzone, et al., "Inner and "Outer" Active Surface of RuO2 Electrodes", Electrochim. Acta, vol. 35, No. 1, pp. 263-267.
Wang, et al., "Pseudocapacitive Contributions to Electrochemical Energy Storage in TiO2 (Anatase) Nanoparticles", J. Phys. Chem. C, vol. 111, pp. 14925-14931, In Final Form: Jul. 31, 2007.
Yu ,et al., "Scalable synthesis of hierarchically structured carbon nanotube-graphene fibres for capacitive energy storage", Nature Nanotechnology, vol. 9, pp. 555-562, Published Online: May 11, 2014.
Liu, et al., "Wearable energy-dense and power-dense supercapacitor yarns enabled by scalable graphene-metallic textile composite electrodes", Nature Communications, vol. 6, No. 7260, Published: Jun. 11, 2015.
Buchmeiser, et al., "Carbon fibers: precursor systems, processing, structure, and properties", Angewandte Chemie International, Edition 53, pp. 5262-5298 (2014).
Subianto, et al., "Electrospinning: designed architectures for energy conversion and storage devices", Energy & Environmental Science, vol. 4, pp. 4761-4785, Accepted: Sep. 16, 2011.
Sun, et al., "Preparation of weavable, all-carbon fibers for non-volatile memory devices", Angewandte Chemie International, Edition 52, pp. 13351-13355 (2013).
Salanne et al., "Efficient storage mechanisms for building better supercapacitors", Nature Energy, vol. 1, pp. 16070-16079, Published: May 27, 2016.
Lang, et al., "Nanoporous metal/oxide hybrid electrodes for electrochemical supercapacitors", Nature Nanotechnology, vol. 6, pp. 232-236, Published online: Feb. 20, 2011.
Mai, et al., "Synergistic interaction between redox-active electrolyte and binder-free functionalized carbon for ultrahigh supercapacitor performance", Nature Communications, vol. 4, pp. 2923-2929, Published: Dec. 11, 2013.
Bhaway, et al., "Hierarchical electrospun and cooperatively assembled nanoporous Ni/NiO/MnOx/carbon nanofiber composites for lithium ion battery anodes", ACS Applied Materials & Interfaces, vol. 8, pp. 19484-19493, Published: Jul. 11, 2016.
Lu, et al., "Electrospun nanomaterials for supercapacitor electrodes: Designed architectures and electrochemical performance", Advanced Energy Materials, vol. 7, No. No. 1601301 (2017).
Inagaki, et al., "Carbon nanofibers prepared via electrospinning", Advanced Materials, vol. 24, pp. 2547-2566 (2012).
El-Kady, et al., "Laser scribing of high-performance and flexible graphene-based electrochemical capacitors", Science, vol. 335, pp. 1326-1330, Mar. 16, 2012.
El-Kady, et al., "Scalable fabrication of high-power graphene micro-supercapacitors for flexible and on-chip energy storage", Nature Communications, vol. 4, No. 1475, pp. 1-9, Published: Feb. 12, 2013.
Naito, et al., "Enhancing the thermal conductivity of polyacrylonitrile- and pitch-based carbon fibers by grafting carbon nanotubes on them", Carbon, vol. 48, pp. 1849-1857, Available online: Jan. 28, 2010.
Morris, et al., "High performance carbon fibers from very high molecular weight polyacrylonitrile precursors", Carbon, vol. 101, pp. 245-252, Available online: Feb. 2, 2016.
Cai, et al., "High-performance supercapacitor electrode from cellulose-derived, inter-bonded carbon nanofibers", Journal of Power Sources, vol. 324, pp. 302-308, Available online: May 27, 2016.
Ding, et al., "Processing and characterization of low-cost electrospun carbon fibers from organosolv lignin/polyacrylonitrile blends", Carbon, vol. 100, pp. 126-136, Available online: Dec. 24, 2015.
McCann, et al., "Highly porous fibers by electrospinning into a cryogenic liquid", Journal of the American Chemical Society, vol. 128, pp. 1436-1437, Published on Web Jan. 13, 2006.
Chen, et al., "Macroscopic graphene fibers directly assembled from CVD-grown fiber-shaped hollow graphene tubes", Angewandte Chemie, vol. 127, pp. 15160-15163 (2015).
Zhou et al., "Ultrahigh volumetric capacitance and cyclic stability of fluorine and nitrogen co-doped carbon microspheres", Nature Communications, vol. 6, pp. 8503-8510, Published: Sep. 29, 2015.
Simon, Y. Gogotsi, "Materials for electrochemical capacitors", Nature Materials, vol. 7, pp. 845-854, Nov. 2008.
Forse, et al., "Direct observation of ion dynamics in supercapacitor electrodes using in situ diffusion NMR spectroscopy", Nature Energy vol. 2, pp. 16216-16222 Published: Feb. 6, 2017.
Chmiola, et al., "Anomalous increase in carbon capacitance at pore sizes less than 1 nanometer" Science, vol. 313, pp. 1760-1763, Sep. 22, 2006.
Arico, et al., "Nanostructured materials for advanced energy conversion and storage devices", Nature Materials, vol. 4, pp. 366-377, May 2005.
Zhu, et al., "Carbon-based supercapacitors produced by activation of graphene", Science, vol. 332, pp. 1537-1541, Jun. 24, 2011.
Wang, et al., "Solid-state supercapacitor based on activated carbon cloths exhibits excellent rate capability", Advanced Materials, vol. 26, pp. 2676-2682 (2014).
Kim, et al., "Synthesis and characterization of porous carbon nanofibers with hollow cores through the thermal treatment of electrospun copolymeric nanofiber webs", Small, vol. 3, pp. 91-95 (2007).
Yu, et al., "Tin nanoparticles encapsulated in porous multichannel carbon microtubes: preparation by single-nozzle electrospinning

(56) References Cited

OTHER PUBLICATIONS and application as anode material for high-performance li-based batteries", Journal of the American Chemical Society, vol. 131, pp. 15984-15985, Published on Web Oct. 20, 2009.
Shi, et al., "Porous carbon and carbon/metal oxide microfibers with well-controlled pore structure and interface", Journal of the American Chemical Society, vol. 130, pp. 5034-5035, Published on Web Mar. 20, 2008.
Ji, et al., "Porous carbon nanofibers from electrospun polyacrylonitrile/SiO2 composites as an energy storage material", Carbon, vol. 47, pp. 3346-3354, Available online: Aug. 6, 2009.
Zhou, et al., "Controlling the pore size of mesoporous carbon thin films through thermal and solvent annealing", Small, vol. 13, No. 1603107 (2017).
Bae, et al., "A unique embossed carbon layer from induced domain alignment in a block copolymer thin film under an electric field", Chemical Communications, vol. 49, pp. 5456-5458, Accepted: Apr. 23, 2013.
Tang, et al., "Long-range ordered thin films of block copolymers prepared by zone-casting and their thermal conversion into ordered nanostructured carbon", Journal of the American Chemical Society, vol. 127, pp. 6918-6919, Published on Web Apr. 21, 2005.
Yan et al., "Design and preparation of highly structure-controllable mesoporous carbons at the molecular level and their application as electrode materials for supercapacitors", Journal of Materials Chemistry A, vol. 3, pp. 22781-22793, Accepted: Sep. 28, 2015.
Zhong, et al., "Electrochemically active nitrogen-enriched nanocarbons with well-defined morphology synthesized by pyrolysis of self-assembled block copolymer", Journal of the American Chemical Society, vol. 134, pp. 14846-14857, Published: Aug. 15, 2012.
Bates, et al., "Block copolymer thermodynamics: theory and experiment", Annual Review of Physical Chemistry, vol. 41, pp. 525-557 (1990).
Seo, et al., "Reticulated nanoporous polymers by controlled polymerization-induced microphase separation", Science, vol. 336, pp. 1422-1425, Jun. 15, 2012.
Zhong, et al., "Preparation of porous nanocarbons with tunable morphology and pore size from copolymer templated precursors", Materials Horizons, vol. 1, pp. 121-124, Accepted: Sep. 10, 2013.
Park, et al., "Block copolymer lithography: periodic arrays of ~1011 holes in 1 square centimeter", Science, vol. 276, pp. 1401-1404, May 30, 1997.
Bates, et al., "Polarity-switching top coats enable orientation of sub-10-nm block copolymer domains", Science, vol. 338, pp. 775-779, Nov. 9, 2012.
Ruiz et al., "Density multiplication and improved lithography by directed block copolymer assembly", Science, vol. 321, pp. 936-939, Aug. 15, 2008.
Tang, et al., "Evolution of block copolymer lithography to highly ordered square arrays", Science, vol. 322, pp. 429-432, Oct. 17, 2008.
Nguyen, et al., "Direct preparation of mesoporous carbon by pyrolysis of poly(acrylonitrile-b-methylmethacrylate) diblock copolymer", Journal of Materials Chemistry, vol. 21, pp. 14226-14230 (2011).
Gomez, et al., "Effect of cross-linking on the structure and thermodynamics of lamellar block copolymers", Macromolecules, vol. 39, pp. 4848-4859.
Hura, et al., "Robust, high-throughput solution structural analyses by small angle X-ray scattering (SAXS)", Nature Methods, vol. 6, No. 8, pp. 606-612, Aug. 2009.
Thommes, et al., "Physisorption of gases, with special reference to the evaluation of surface area and pore size distribution (IUPAC Technical Report)", Pure and Applied Chemistry, vol. 87, pp. 1051-1069, Accepted: Apr. 30, 2015.
Li, et al., "Nitrogen- and oxygen-enriched 3D hierarchical porous carbon fibers: synthesis and superior supercapacity", Journal of Materials Chemistry A, vol. 3, pp. 14817-14825, Accepted: Jun. 8, 2015.
Zhang, et al., "Carbon-based materials as supercapacitor electrodes", Chemical Society Reviews, vol. 38, pp. 2520-2531.
Zhao, et al., "The role of nanomaterials in redox-based supercapacitors for next generation energy storage devices", Nanoscale, vol. 3, pp. 839-855, Accepted: Nov. 19, 2010.
Kang, et al., "Development of an equivalent circuit model for electrochemical double layer capacitors (EDLCs) with distinct electrolytes", Electrochimica Acta, vol. 115, pp. 587-598, Available online: Nov. 14, 2013.
Xu, et al., "Holey graphene frameworks for highly efficient capacitive energy storage", Nature Communications, vol. 5, pp. 4554-4561, Published: Aug. 8, 2014.
Yuan, et al., "The influence of large cations on the electrochemical properties of tunnel-structured metal oxides", Nature Communications, vol. 7, pp. 13374-13382, Published: Nov. 21, 2016.
Stoller, et al., "Best practice methods for determining an electrode material's performance for ultracapacitors", Energy & Environmental Science, vol. 3, pp. 1294-1301, Accepted: Jun. 22, 2010.
Zhong, et al., "A review of electrolyte materials and compositions for electrochemical supercapacitors", Chemical Society Reviews, vol. 44, pp. 7484-7539, Nov. 7, 2015.
Zhu, et al., "Hierarchical porous and N-doped carbon nanotubes derived from polyaniline for electrode materials in supercapacitors", Journal of Materials Chemistry A, vol. 2, pp. 12545-12551, Accepted: Jun. 6, 2014.

* cited by examiner

A e-spun PAN-*b*-PMMA
Oxidized PAN-*b*-PMMA
Pyrolyzed PAN-*b*-PMMA
Pyrolyzed PAN/PMMA
Pyrolyzed PAN Intensity (a.u.)

$10^7$ $10^6$ $10^5$ $10^4$ $10^3$ $10^2$ $10^1$ $10^0$ $I \sim q^x$ 0.1 1 q (nm$^{-1}$)

A
Electrical double layer
5 mV s$^{-1}$
62.2%
37.8%
Current density (A g$^{-1}$)
Voltage (V)

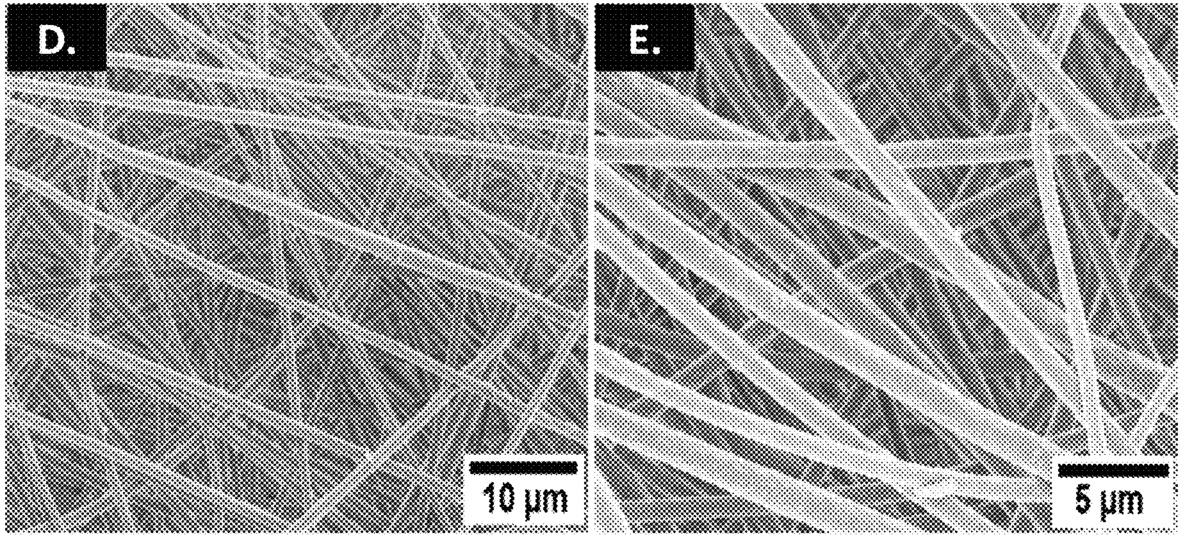
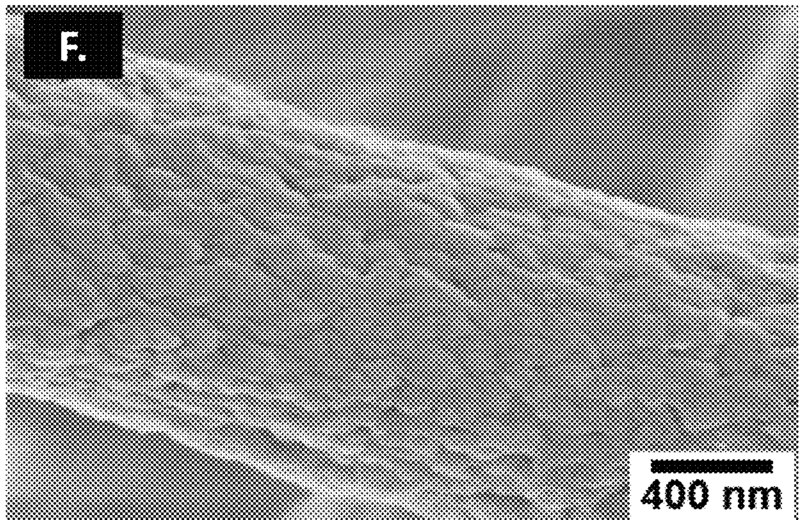
FIGS. 6D-6F

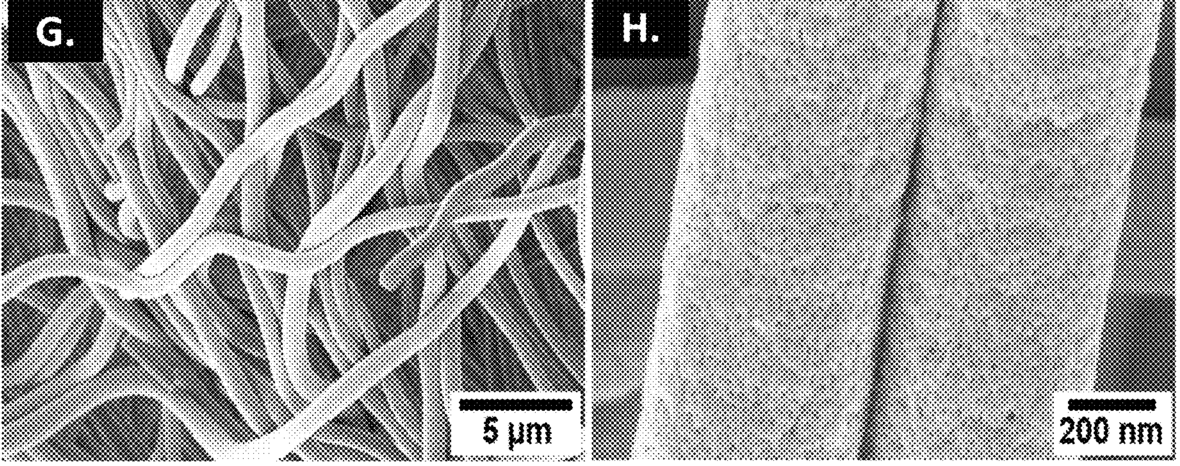
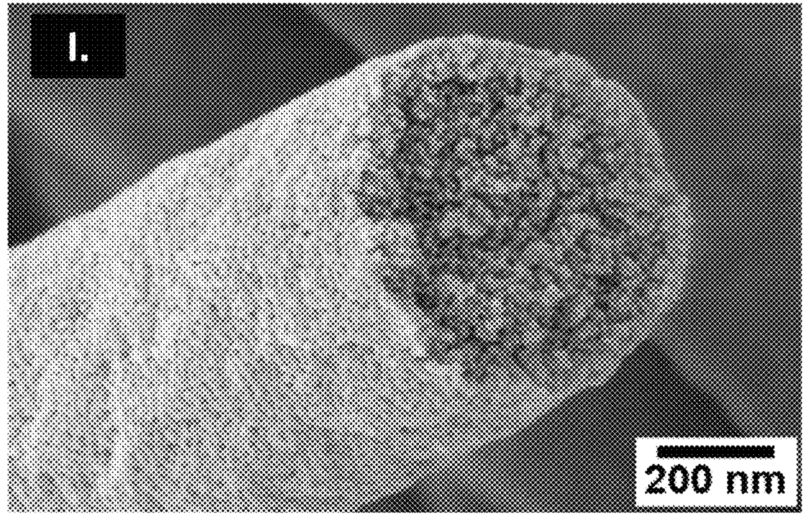
FIGS. 6G-6I

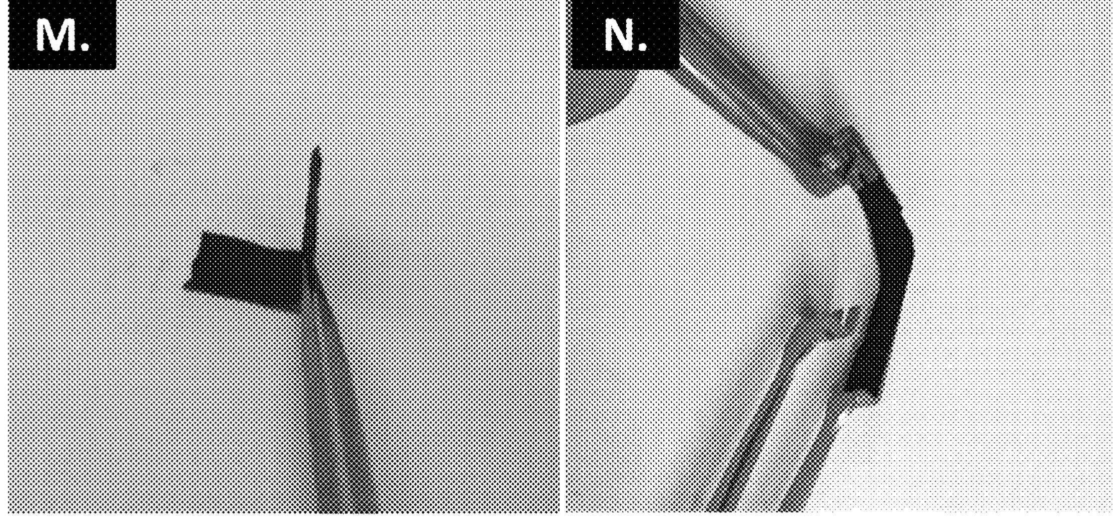
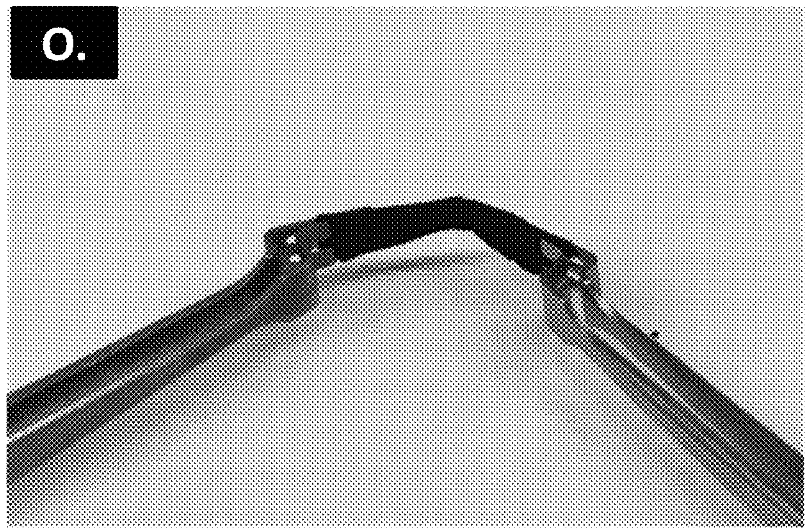
FIGS. 6M-6O

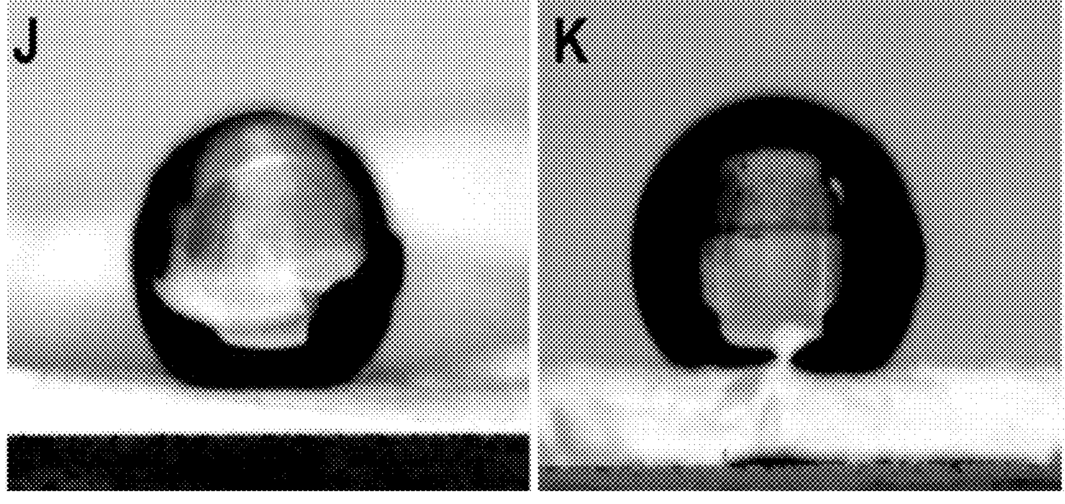
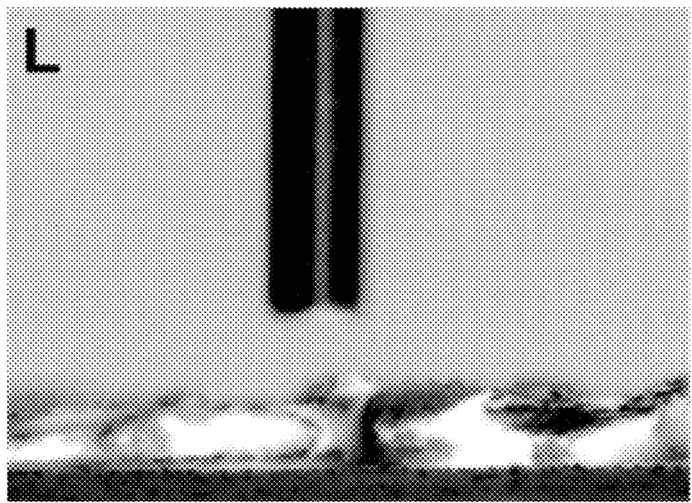
FIGS. 13J-13L

BLOCK COPOLYMER POROUS CARBON FIBERS AND USES THEREOF

CROSS-REFERENCE TO RELATED APPLICATIONS

This application is the U.S. National Stage Application under 35 U.S.C. § 371 of Patent Cooperation Treaty Application No.: PCT/US2019/028371, filed on Apr. 19, 2019, entitled "BLOCK COPOLYMER POROUS CARBON FIBERS AND USES THEREOF," which claims the benefit of and priority to U.S. Provisional Patent Application No. 62/660,881, filed on Apr. 20, 2018 entitled "POROUS CARBON FIBER FROM BLOCK COPOLYMERS," the contents of which are incorporated by reference herein in their entireties.

STATEMENT REGARDING FEDERALLY SPONSORED RESEARCH

This invention was made with Government support FA9550-17-1-0112 awarded by the United States Air Force Office of Scientific Research. The Government has certain rights in the invention.

TECHNICAL FIELD

Aspects of the disclosure generally relate to carbon fibers and methods of manufacturing carbon fibers.

BACKGROUND

Carbon fibers are superior materials for a variety of applications ranging from energy conversion and storage, separation techniques, membrane technologies, to wearable electronics because of their outstanding mechanical strength, high flexibility, low density, excellent electrical conductivity, chemical stability, high temperature tolerance, and small thermal expansion coefficient. In view of their wide applicability, there exists a need to improve carbon fiber to meet the increasing demands of the applications in which they are used.

SUMMARY

Described herein are various aspects of porous carbon fibers, where each carbon fiber can be composed of a carbon matrix; and mesopores, wherein the mesopores are uniformly distributed throughout the carbon matrix, wherein the mesopores are uniform in size, wherein at least 50% of the mesopores are interconnected. The porous carbon fiber can also optionally include micropores, wherein the micropores are distributed throughout the carbon matrix, wherein at least 50% of the micropores are interconnected with one or more mesopore. The micropores can be uniformly distributed throughout the carbon matrix. The mesopores have a uniform size. The size of the mesopores can range from about 2-50 nm. The porosity of the carbon fiber can be about 20-80 percent. The porous carbon fiber can have a BET surface area is greater than 300 $m^2$ $g^{-1}$. The mesopores can have a collective pore volume, wherein the collective pore volume ranging from about 0.05 to 1 $cm^3$/g.

Also described herein are aspects of a carbon fiber matrix, wherein the carbon fiber matrix can be composed of a plurality of carbon fibers, wherein each of the carbon fibers in the plurality of carbon fibers are composed of a carbon matrix; and mesopores, wherein the mesopores are uniformly distributed throughout the carbon matrix, wherein the mesopores are uniform in size, wherein at least 50% of the mesopores are interconnected. The carbon fiber matrix can further include micropores, wherein the micropores are distributed throughout the carbon matrix, wherein at least 50% of the micropores are interconnected with one or more mesopore. The micropores can be uniformly distributed throughout the carbon matrix. The mesopores can have a uniform size. The size of the mesopores can range from about 2-50 nm. The porosity of the carbon fibers can range from about 20-80 percent. The BET surface area can be about 500 $m^2$ $g^{-1}$. The mesopores can have a collective mesopore volume, wherein the collective mesopore volume ranging from about 0.05 to 1 $cm^3$/g.

Also described herein are various aspects of a porous carbon fiber that can be composed of a carbon matrix; and mesopores, wherein the mesopores are uniformly distributed throughout the carbon matrix, wherein the mesopores are uniform in size, wherein at least 50% of the mesopores are interconnected; and wherein the porous carbon fiber is manufactured from: a precursor block co-polymer forming a polymer fiber, wherein the precursor block copolymer comprises at least two different polymers that are capable of microphase separation; oxidizing the polymer fiber to form a microphase separated oxidized or crosslinked polymer fiber; and pyrolyzing the microphase separated oxidized or crosslinked polymer fiber to form the porous carbon fiber. In some aspects, the precursor block copolymer is composed of two or more polymers selected from the group consisting of polyacrylonitrile, polyimide, polymethyl methacrylate, polystyrene, polyethylene, polyvinyl pyridine, polycarbonate, polyester, and polysaccharides and derivatives thereof. The mesopores can have a uniform size. The porosity of the porous carbon fiber can range from about 20-80 percent.

These and other aspects, objects, features, and advantages of the example embodiments will become apparent to those having ordinary skill in the art upon consideration of the following detailed description of illustrated example embodiments.

BRIEF DESCRIPTION OF THE DRAWINGS

An understanding of the features and advantages of the various aspects described herein will be obtained by reference to the following detailed description that sets forth illustrative embodiments, in which the principles of the invention may be utilized, and the accompanying drawings of which. The figures herein are for illustrative purposes only and are not necessarily drawn to scale.

FIGS. 1A-1C show conventional (FIGS. 1A and 1B) and methods for synthesizing carbon fibers from various polymer precursors described herein (FIG. 1C). (FIG. 1A) Pure PAN is electrospun into a fiber mat, oxidized at about 280° C. in air to crosslink PAN (blue), and then pyrolyzed at about 800° C. in $N_2$ to generate carbon fibers (gray). An individual polymer fiber (purple) is magnified for illustration. (FIG. 1B) PAN is mixed with sacrificial PMMA (red) to form a polymer blend. After oxidation, the polymer blend macrophase-separates and forms nonuniform domains. After pyrolysis, PMMA is removed, resulting in nonuniform pores. (FIG. 1C) PAN-b-PMMA block copolymer microphase-separates into uniform PMMA nanodomains (red) in a matrix of PAN (blue) after oxidation and self-assembly. After pyrolysis, the PCFs contain well-controlled and uniformly distributed pores. SEM images of the carbon fibers from (FIGS. 1D and 1E) PAN, (FIGS. 1F and 1G) PAN/PMMA, and (FIGS. 1H and 1I) PAN-b-PMMA.

(FIG. 2A) Inset: A digital photograph of a piece of as-spun polymer fiber mat. (FIG. 2C) The bright and dark domains are PAN and PMMA, respectively. The good contrast between PAN and PMMA in the SEM image is due to the partial degradation of PMMA in air. (FIGS. 2E and 2F) High-magnification SEM images of uniformly distributed mesopores in PAN-b-PMMA-CFs. (FIGS. 2G and 2H) TEM images of mesopores in a PAN-b-PMMA-CF. (FIG. 2I) High-resolution TEM image of porous carbons at the edge of a PAN-b-PMMA-CF.

(FIG. 3A) SAXS spectra of electrospun (e-spun), oxidized and pyrolyzed PAN-b-PMMA fibers, in comparison with the carbon fibers pyrolyzed from PAN and PAN/PMMA blend a.u., arbitrary units. (FIG. 3B) $N_2$ at 77.4 K and (FIG. 3C) $CO_2$ at 273.2 K adsorption-desorption isotherms of all carbon fibers. STP, standard temperature and pressure (FIG. 3D) Calculated pore-size distributions of all carbon fibers using NLDFT.

(FIG. 4A) Schematic illustration of a binder-free and conductive-additive-free electrode composed of PCFs. (FIG. 4B) CV curves at a scan rate of 50 mV $s^{-1}$. (FIG. 4C) CP curves at a current density of 10 A $g^{-1}$. (FIG. 4D) Gravimetric capacitance versus current density ranging from 1 to 100 A $g^{-1}$. (FIG. 4E) Gravimetric capacitance and (FIG. 4F) BET surface area-normalized capacitance ($C_A$) of PAN-b-PMMA-CFs at 1 A $g^{-1}$, in comparison with those of other carbon fibers reported in the literature (black circles).

(FIG. 5A) Dunn method analysis of capacitance contribution of PAN-b-PMMA-CFs. The shaded regions show the current contributions from the electrical double-layer capacitive (magenta) and pseudocapacitive (cyan) processes. Inset: A histogram shows the percentages of electrical double-layer capacitance (62.2%) and pseudocapacitance (37.8%). (FIG. 5B) Cycling stability of PAN-b-PMMA-CFs at a current density of 100 A $g^{-1}$. Inset: Ragone plot of PCFs. The gravimetric energy density and the power density are calculated according to Eqs. 4 and 5, respectively. (FIG. 5C) Nyquist plots of carbon fibers in the frequency range of 100 kHz to 0.1 Hz with an across-current perturbation of 10 mV. Inset: Nyquist plots in the middle- and high-frequency range. The scattered points are experimental data and the solid lines are the fitting curves. The impedances of the Nyquist plots are normalized to the working areas of the tested electrodes. (FIG. 5D) Linear fitting to the real part of impedance Z' versus the −½ power of the angular frequency ($\omega^{-0.5}$) plots in a frequency range of 1 to 10 Hz to extract the ion diffusion resistance (σ).

FIGS. 6A-6Q show additional SEM images and graphs that can demonstrate characteristics of various porous carbon fibers. (FIGS. 6A-6C) Additional SEM images of porous carbon fibers from a binary polymer blend of PAN and PMMA. The ratio of PAN:PMMA was 64:36 by volume, matching that of the PAN-b-PMMA block copolymer. Non-uniform porous structures were observed after pyrolysis at 800° C. (FIGS. 6D-6L) Additional SEM images of (FIGS. 6D-6F) as-electrospun PAN-b-PMMA block copolymer fibers at various magnifications, (FIGS. 6G-6I) PAN-b-PMMA fibers after oxidation at 280° C. in air, and (FIGS. 6J-6L) PAN-b-PMMA-CFs after pyrolysis at 800° C. (FIGS. 6M-60) Photographs of a piece of PAN-b-PMMA-CFs bent at various angles. Statistic histograms of the diameters of (FIG. 6P) the as-electrospun PAN-b-PMMA block copolymer fibers and (FIG. 60) the corresponding porous carbon fibers after pyrolysis. The PAN-b-PMMA fibers were prepared by single-spinneret electrospinning. For most block copolymers, coaxial electrospinning is required to provide additional protective sheath layers so that the fibers can maintain a fibrous structure and survive the subsequent thermal annealing. For the PAN-b-PMMA block copolymer, because PAN can self-stabilize and crosslink to form ladder structures at elevated temperatures, no sheath material was required during the electrospinning to maintain the fibrous structure and survive the subsequent oxidation and pyrolysis steps. During oxidation, PAN self-stabilized and crosslinked into a ladder molecular structure, which was critical to maintain the integrity of the fibrous structures after pyrolysis. In addition, due to the microphase separation of PAN and PMMA, the PAN-b-PMMA block copolymer self-assembled into well-defined nanostructures.

(FIG. 7A) TGA and the first derivative (labeled as −dW/dT) of the weight losses during the pyrolysis of (FIG. 7B) PAN, (FIG. 7C) PMMA and (FIG. 7D) PAN-b-PMMA. PAN-b-PMMA showed multiple weight loss stages including PAN stabilization (about 250-320° C.), PMMA degradation (about 320-430° C.), and carbonization of PAN at high temperatures.

(FIG. 8B) Raman spectra of porous carbon fibers from PAN, PAN/PMMA and PAN-b-PMMA after pyrolysis at about 800° C. After pyrolysis, all the carbon fibers exhibited two characteristic carbon bands, i.e., "G-band" at about 1560-1600 $cm^{-1}$ and "D-band" at about 1310-1350 $cm^{-1}$. The calculated intensity ratio of "D-band" to "G-band" ($I_D/I_G$) is summarized in Table 2 (FIG. 8C) Fast Fourier transform (FFT) spectra extracted from the SEM images of PAN-b-PMMA fibers after oxidation at 280° C. and after pyrolysis at 800° C.

(FIG. 9A) PSDs from the NLDFT model when the regularization parameter (A) was varied from 0 to 10. (FIGS. 9B-9E) Calculation of the pore sizes in PAN-b-PMMA-CF using image analysis. (FIG. 9B) An original SEM image, (FIG. 9C) a binary image of the SEM micrograph in black and white, and (FIG. 9D) identified boundaries of the pores. (FIG. 9E) PSD of PAN-b-PMMA-CF determined by ImageJ. The PSD curve (blue) was obtained through Gaussian fitting of two peaks (black and red). (FIG. 9F) Comparison of the PSDs of the PAN-b-PMMA-CFs using the NLDFT and BJH models.

(FIGS. 10A-10C) Electrochemical capacitive performance of a representative two-electrode cell made of PAN-b-PMMA-CFs. (FIG. 10A) Cyclic voltammograms (CV) at scan rates from 2 to 100 mV $s^{-1}$; (FIG. 10B) Specific gravimetric capacitance as a function of the scan rate; (FIG. 10C) Chronopotentiometry (CP) curves at current densities from 10 to 100 A $g^{-1}$. (FIG. 10D) An equivalent circuit model for fitting the Nyquist plots of PAN-b-PMMA-CFs. (FIGS. 10E-10F) Electrochemical capacitive performance of PAN-b-PMMA-CFs evaluated by a three-electrode cell. (FIG. 10E) CV curves at scan rates from 10 to 100 mV $s^{-1}$. (FIG. 10F) The gravimetric capacitance as a function of scan rate.

(FIGS. 11A-11C) Trasatti's method analysis: (FIG. 11A) The reciprocal of gravimetric capacitance ($C^{-1}$) versus the square root of scan rate ($v^{0.5}$). (FIG. 11B) The gravimetric capacitance (C) versus the reciprocal of the square root of scan rate ($v^{-0.5}$). The red lines are the linear fittings to the data points at the low scan rates. The fitting equations are shown in the insets. Data points in grey are masked during the fitting. (FIG. 11C) Histogram showing the capacitance contributions from the capacitive processes (i.e., electrical double-layer capacitance, black) and the diffusion-controlled processes (i.e., pseudocapacitance, red). (FIG. 11D) Dunn's method analysis: $iv^{-0.5}$ vs. $v^{0.5}$ plot for PAN-b-PMMA-CFs using the anodic current at a potential of 0.5 V vs. Ag/AgCl.

(FIGS. 12A and 12C) Charge-hold-discharge voltage profiles of a PAN-b-PMMA symmetric supercapacitor in the Pt and 20th cycle with a holding time of (FIG. 12A) 1 min and (FIG. 12C) 5 min. (FIGS. 12B and 12D) The capacitance retention of a PAN-b-PMMA symmetric supercapacitor with a holding time of (FIG. 12B) 1 min and (FIG. 12D) 5 min. The current density for the charge and discharge processes was set at 4 A $g^{-1}$.

FIGS. 13A-13L show graphs and images that can demonstrate XPS survey spectra (FIGS. 13A-13I) and contact angle analysis (FIGS. 13J-13L) of various CFs and PCFs. XPS survey spectra of (FIG. 13A) PAN-CFs, (FIG. 13B) PAN/PMMA-CFs, and (FIG. 13C) PAN-b-PMMA-CFs. XPS N 1s peaks of (FIG. 13D) PAN-CFs, (FIG. 13E) PAN/PMMA-CFs, and (FIG. 13F) PAN-b-PMMA-CFs. XPS O 1s peaks of (FIG. 13G) PAN-CFs, (FIG. 13H) PAN/PMMA-CFs, and (FIG. 13I) PAN-b-PMMA-CFs. Contact angles of (FIG. 13J) PAN-CFs, (FIG. 13K) PAN/PMMA-CFs, and (FIG. 13L) PAN-b-PMMA-CFs after pyrolysis at about 800° C. The fluid used for testing was 6 M aqueous KOH.

DETAILED DESCRIPTION

Figures 1A, 1B, 1C:
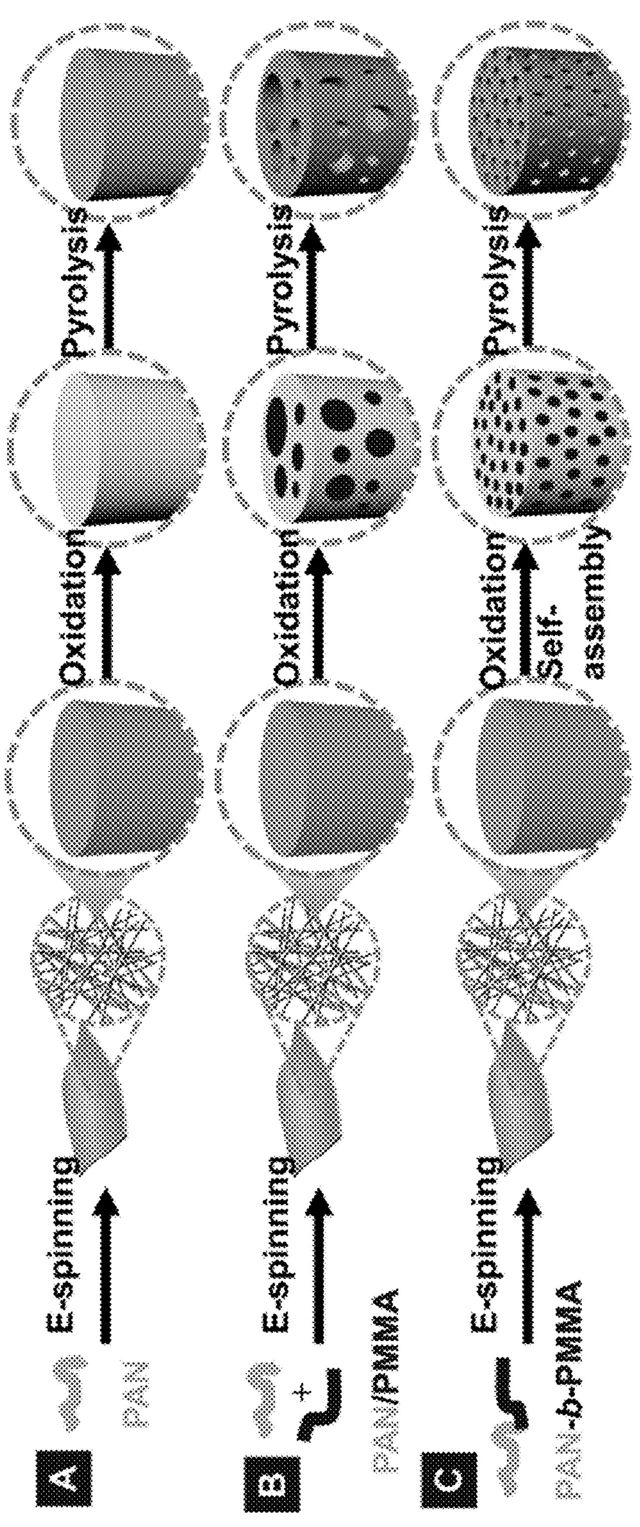
FIGS. 1A-1I can demonstrate fabrication of the carbon fibers and porous carbon fibers (PCFs).

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are cited to disclose and describe the methods and/or materials in connection with which the publications are cited. All such publications and patents are herein incorporated by references as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant application should not be treated as such and should not be read as defining any terms appearing in the accompanying claims. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Where a range is expressed, a further aspect includes from the one particular value and/or to the other particular value. Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10"

is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used in the specification and the appended claims, the singular forms "a," "an," and "the" include plural referents unless the context clearly dictates otherwise.

As used herein, "about," "approximately," "substantially," and the like, when used in connection with a numerical variable, can generally refers to the value of the variable and to all values of the variable that are within the experimental error (e.g., within the 95% confidence interval for the mean) or within +/−10% of the indicated value, whichever is greater. As used herein, the terms "about," "approximate," "at or about," and "substantially" can mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

Embodiments of the present disclosure will employ, unless otherwise indicated, techniques of chemistry, polymer chemistry, physics, and the like, which are within the skill of the art. Such techniques are explained fully in the literature.

Before the aspects of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible unless the context clearly dictates otherwise.

Definitions

As used herein, "amphiphilic" can refer to a molecule combining hydrophilic and lipophilic (hydrophobic) properties.

The term of art "block copolymer" refers to a copolymer having an arrangement of blocks that are linked via covalent bonds, where each type of block are chemically distinct polymers that form the repeat units of the block copolymer. "Block copolymers" can self-assemble from the constituent blocks. "Block copolymers" can have many topologies. For example, a "block copolymer" can be diblock (e.g. AB or BA), triblock (e.g. ABA, BAB). Block copolymers can be linear or branched. "Block copolymers" can be segmented (e.g. those composed of many alternating small blocks of two or more different types of repeating unit), graft, comb, or brush (e.g. those composed of one long main chain of one repeating unit and several smaller blocks of a second repeating unit branching off of the polymer backbone), or radial or star (e.g. those composed of several arms branching from a central attachment point each terminated with an end-block).

As used herein, copolymer generally refers to a single polymeric material that is comprised of two or more different monomers. The copolymer can be of any form, such as random, block, graft, etc. The copolymers can have any end-group, including capped or acid end groups. Copolymers include, but are not necessarily limited to, those including 1, 2, 3, 4, or more different monomers.

As used herein, "derivative" can refer to any compound having the same or a similar core structure to the compound but having at least one structural difference, including substituting, deleting, and/or adding one or more atoms or functional groups. The term "derivative" does not mean that the derivative is synthesized from the parent compound either as a starting material or intermediate, although this may be the case. The term "derivative" can include prodrugs, or metabolites of the parent compound. Derivatives include compounds in which free amino groups in the parent compound have been derivatized to form amine hydrochlorides, p-toluene sulfoamides, benzoxycarboamides, t-butyloxycarboamides, thiourethane-type derivatives, trifluoroacetylamides, chloroacetylamides, or formamides. Derivatives include compounds in which carboxyl groups in the parent compound have been derivatized to form methyl and ethyl esters, or other types of esters or hydrazides. Derivatives include compounds in which hydroxyl groups in the parent compound have been derivatized to form O-acyl or O-alkyl derivatives. Derivatives include compounds in which a hydrogen bond donating group in the parent compound is replaced with another hydrogen bond donating group such as OH, NH, or SH. Derivatives include replacing a hydrogen bond acceptor group in the parent compound with another hydrogen bond acceptor group such as esters, ethers, ketones, carbonates, tertiary amines, imine, thiones, sulfones, tertiary amides, and sulfides. "Derivatives" also includes extensions of the replacement of the cyclopentane ring with saturated or unsaturated cyclohexane or other more complex, e.g., nitrogen-containing rings, and extensions of these rings with side various groups.

As used herein, "hydrophilic", refers to molecules which have a greater affinity for, and thus solubility in, water as compared to organic solvents. The hydrophilicity of a compound can be quantified by measuring its partition coefficient between water (or a buffered aqueous solution) and a water-immiscible organic solvent, such as octanol, ethyl acetate, methylene chloride, or methyl tert-butyl ether. If after equilibration a greater concentration of the compound is present in the water than in the organic solvent, then the molecule is considered hydrophilic.

As used herein, "hydrophobic", refers to molecules which have a greater affinity for, or solubility in an organic solvent as compared to water. The hydrophobicity of a compound can be quantified by measuring its partition coefficient between water (or a buffered aqueous solution) and a water-immiscible organic solvent, such as octanol, ethyl acetate, methylene chloride, or methyl tert-butyl ether. If after equilibration a greater concentration of the compound is present in the organic solvent than in the water, then the molecule is considered hydrophobic.

As used herein, interconnectivity refers to the connection of pores within carbon matrix of the porous carbon fibers.

As used herein, "molecular weight" generally refers to the mass or average mass of a material. If a polymer or oligomer, the molecular weight can refer to the relative average chain length or relative chain mass of the bulk polymer. In practice, the molecular weight of polymers and oligomers can be estimated or characterized in various ways including gel permeation chromatography (GPC) or capillary viscometry. GPC molecular weights are reported as the weight-average molecular weight (Mw) as opposed to the number-average molecular weight ($M_n$). Capillary viscometry provides estimates of molecular weight as the inherent viscosity determined from a dilute polymer solution using a particular set of concentration, temperature, and solvent conditions.

As used herein, the terms "optional" or "optionally" means that the subsequently described event or circumstance can or cannot occur, and that the description includes instances where said event or circumstance occurs and instances where it does not.

As used herein, "polymer" refers to a chemical compound formed from a plurality of repeating structural units referred to as monomers "Polymers" are understood to include, but are not limited to, homopolymers, copolymers, such as for example, block, graft, random and alternating copolymers, terpolymers, etc. and blends and modifications thereof. Polymers can be formed by a polymerization reaction in which the plurality of structural units become covalently bonded together. When the monomer units forming the polymer all have the same chemical structure, the polymer is a homopolymer. When the polymer includes two or more monomer units having different chemical structures, the polymer is a copolymer.

As used interchangeably herein, "polymer blend" and "polymer mixture" refers to a macroscopically homogenous mixture of two or more different species of polymers. Unlike a copolymer, where the monomeric polymers are covalently linked, the constituents of a "polymer blend" and "polymer mixture" are separable by physical means and does not require covalent bonds to be broken. A "polymer blend" can have 2 or more (e.g. 2, 3, 4, 5, 6, 7, 8, 9, 10 or more) different polymer constituents.

As used herein, "pore" is an opening formed by the absence of material. A "pore" can be different sizes as generally defined by the width or diameter of the cross-section as measured at its largest point of the pore. As used herein, the term "micropore" refers to pores with a width or diameter of less than 2 nm (e.g. between any nonzero value up to 2 nm). As used herein, the term "mesopore" refers to pores with a width or diameter of between 2 nm and 50 nm. As used herein, the term "macropore" refers to pores with a diameter of greater than 50 nm.

As used herein, "substantial" and "substantially," specifies an amount of between 95% and 100%, inclusive, between 96% and 100%, inclusive, between 97% 100%, inclusive, between 98% 100%, inclusive, or between 99% 100%, inclusive.

As used herein, "substantially the same" specifies that two or more measurements has a small standard deviation and that all the values measured lie within ±1%, 2%, 3%, 4%, 5%, 6%, 7%, 8%, 9%, or 10% of the mean.

As used herein, "substantially free" can mean an object species is present at non-detectable or trace levels so as not to interfere with the properties of a composition or process.

As used herein, "substantially pure" can mean an object species is the predominant species present (i.e., on a molar basis it is more abundant than any other individual species in the composition), and preferably a substantially purified fraction is a composition wherein the object species comprises about 50 percent of all species present. Generally, a substantially pure composition will comprise more than about 80 percent of all species present in the composition, more preferably more than about 85%, 90%, 95%, and 99%. Most preferably, the object species is purified to essential homogeneity (contaminant species cannot be detected in the composition by conventional detection methods) wherein the composition consists essentially of a single species.

As used herein, the term "uniform pore distribution" can be used to describe the distribution of a plurality of pores within the carbon matrix of a porous carbon fiber and means that the distances between any two pores within the plurality of pores within the carbon matrix are all substantially the same. It will be appreciated that a non-uniform pore distribution means that the distance between the pores vary beyond 10% of the mean and are not all substantially the same.

As used herein, the term "uniform pore size" can be used to describe the statistical distribution or variance of pore size within a plurality of pores within the carbon matrix of the porous carbon fibers and means that the sizes of the pores are all within about one order of magnitude or less from the peak pore size as statistically determined. It will be appreciated that a non-uniform pore size means that the size of the pores vary beyond about 1 (one) order of magnitude from the peak pore size as statistically determined.

As used herein, the terms "weight percent," "wt %," and "wt. %," which can be used interchangeably, indicate the percent by weight of a given component based on the total weight of a composition of which it is a component, unless otherwise specified. That is, unless otherwise specified, all wt % values are based on the total weight of the composition. It should be understood that the sum of wt % values for all components in a disclosed composition or formulation are equal to 100. Alternatively, if the wt % value is based on the total weight of a subset of components in a composition, it should be understood that the sum of wt % values the specified components in the disclosed composition or formulation are equal to 100.

As used herein, "water-soluble", as used herein, generally means at least about 10 g of a substance is soluble in 1 L of water, i.e., at neutral pH, at 25° C.

Discussion

Carbon fibers are superior materials for a variety of applications ranging from energy conversion and storage, separation techniques, membrane technologies, to wearable electronics because of their outstanding mechanical strength, high flexibility, low density, excellent electrical conductivity, chemical stability, high temperature tolerance, and small thermal expansion coefficient. Carbon fibers mostly have been adopted as supporting scaffolds to alleviate the poor electrical conductivity of high-capacitance pseudocapacitive materials in supercapacitors. Besides serving as supports that contribute little to the supercapacitor capacitance, in the last decade, carbon fibers have been the focal point of growing efforts to turn them into active components. The direct use of carbon fibers as self-supporting electrodes removes the need for time-consuming processes to load other materials, such as pseudocapacitive materials, conductive additives, and binders, that introduce additional interfacial resistance and are detrimental to ultrafast charge/discharge.

However, there are problems associated with this approach. Most carbon fibers are solid carbon filaments produced pyrolytically from pitch, polyacrylonitrile (PAN), and biorenewable polymers (e.g., cellulose, lignin, and others). Their smooth surfaces with limited effective surface areas (<10 $m^2$ $g^{-1}$) render them virtually incapable of storing a large amount of electrochemical energy (20, 21). Therefore, strategies to increase the porosity of carbon fibers are highly desirable to realize their potential as active materials in electrochemical energy storage and for other applications were porosity is desirable.

To increase their capacitance, it is important that carbon fibers have (i) highly uniform pores of certain sizes (e.g. micropores of <1 nm and mesopores of about 10 nm) and (ii) hierarchical porous structures to permit easy access by ions to the micropores (24). There are mainly two ways to create PCFs. The first category is to post-treat carbon fibers via activation and chemical exfoliation. Activation with corrosive chemical agents (e.g., $HNO_3$ and KOH) roughens the carbon fiber surfaces, but it usually needs highly reductive chemicals (e.g., hydrogen and hydrazine) and complicated postprocesses to restore the electrical conductivity. Chemical exfoliation is another facile way to activate carbon fibers, but with this method it is difficult to control the porosity and pore size, as well as to preserve the fiber integrity.

The second strategy focuses on designing carbon fiber precursors. A variety of PCFs have been prepared by electrospinning PAN blended with sacrificial homopolymers, $SiO_2$ nanoparticles (29, 30), and carbon additives. Although these methods produce PCFs, they do not allow control over the pore size and uniformity because of the macrophase separation of the polymer blends and the difficulty in distributing the additives uniformly in the PAN matrix. Furthermore, the removal of inorganic particles involves the use of highly toxic and corrosive chemicals, and often it is challenging to fully remove the incorporated particles. Therefore, the development of an effective and efficient method for addressing the aforementioned obstacles, as well as the creation of uniform and hierarchical porous structures, is needed to advance the electrochemical performance of carbon fibers.

With the above deficiencies in mind described herein are PCFs that are prepared from a block co-polymer precursor that can have a hierarchal organization and a uniform pore distribution and/or uniform pore size within each hierarchy of pores. The PCFs described herein can have hierarchically interconnected mesopores and micropores within the carbon matrix. The PCFs described herein can have an increased surface area as compared to conventional carbon fibers or PCFs. Thus, the PCFs described herein can have an improved performance as compared to conventional carbon fibers or PCFs. The PCFs described herein can be used in a variety of applications including, but not limited to, energy conversion and storage, separation techniques, and electronics. Other compositions, compounds, methods, features, and advantages of the present disclosure will be or become apparent to one having ordinary skill in the art upon examination of the following drawings, detailed description, and examples. It is intended that all such additional compositions, compounds, methods, features, and advantages be included within this description, and be within the scope of this disclosure.

Porous Carbon Fibers (PCFs) and Systems

Figure 14:
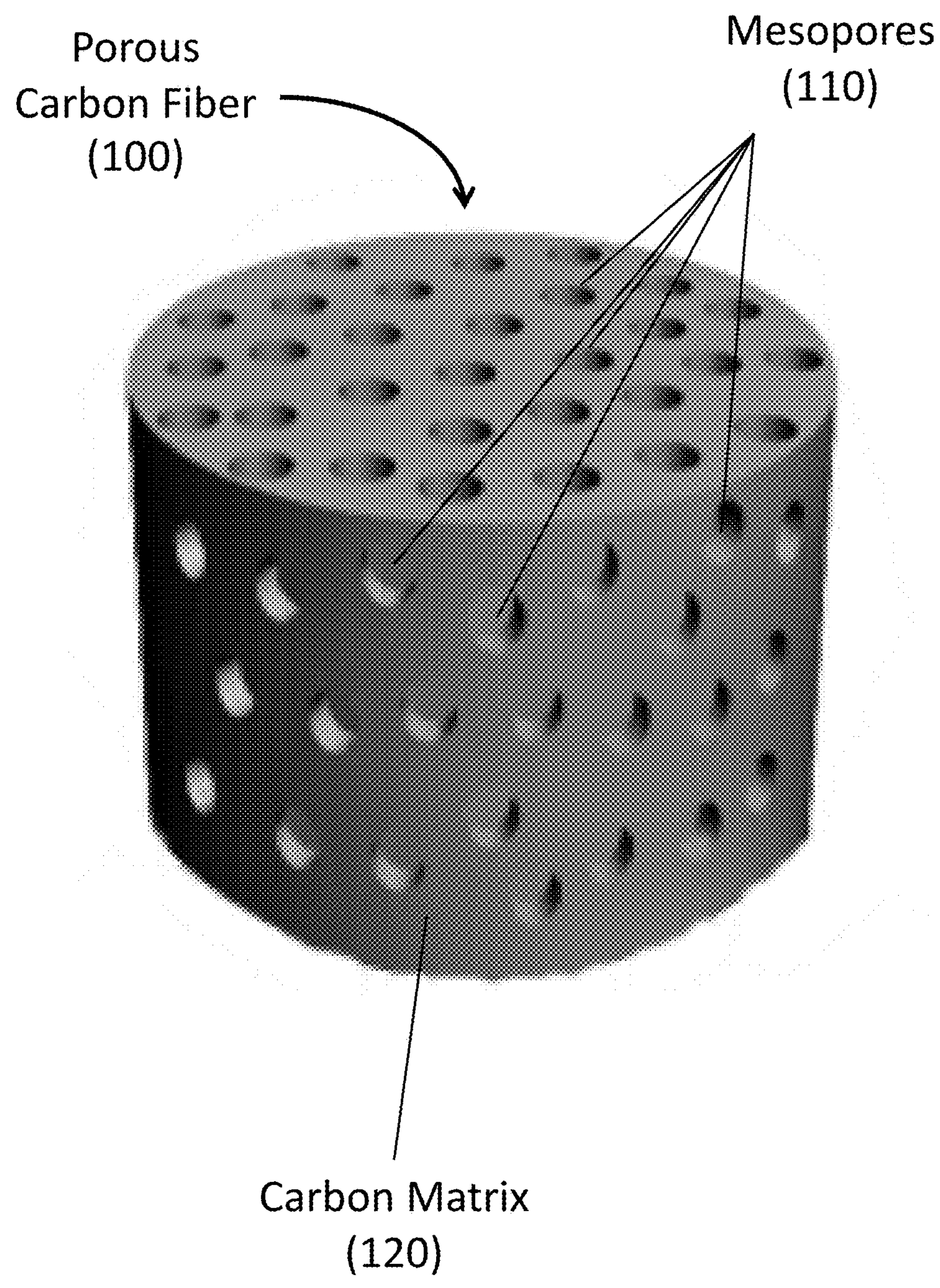
FIG. 14 shows aspects of a porous carbon fiber described herein.

As shown in e.g. FIG. 14 in some aspects, the porous carbon fibers 100 can be composed of a carbon matrix 120. The PCF 100 can have mesopores 110, where the mesopores 110 are uniformly distributed throughout the carbon matrix 120, where the mesopores are uniform in size and where about 50 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99 to 100 percent of the mesopores are interconnected. As used in this context, interconnected is referring to mesopore-mesopore interconnectivity. In some aspects, the porous carbon fibers 100, can be have mesopores 120 that have a certain peak pore size and where the pore size of any given mesopore falls within one order of magnitude of the peak pore size and about 50 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99 to 100 percent of the mesopores are interconnected. As used in this context, interconnected is referring to mesopore-mesopore interconnectivity. In aspects, the degree of mesopore interconnectivity can range from 50 to about 100%. The degree of mesopore interconnectivity can be calculated using eq. 16-22 as is demonstrated elsewhere herein. In aspects, the degree of mesopore interconnectivity can be about 95-96%.

The porous carbon fibers 100 also can optionally include micropores, where the micropores are distributed throughout the carbon matrix 120, where about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99 to 100 percent of the micropores are interconnected with one or more mesopore 110. In some aspects, the micropores are uniformly distributed throughout the carbon matrix 120.

The mesopores can be uniform in size. The mesopores can have a certain peak size. In aspects, the size of any given mesopore can be within one order of magnitude of the peak pore size. The size of any give mesopore or the certain peak size of the mesopores can be about 2, 3, 4, 5, 6, 7, 8, 9, 10, 11, 12, 13, 14, 15, 16, 17, 18, 19, 20, 21, 22, 23, 24, 5, 26, 27, 28, 29, 30, 31, 32, 33, 34, 35, 36, 37, 38, 39, 40, 41, 42, 43, 44, 45, 46, 47, 48, 49 nm. In some aspects, the size of the mesopores is about 10 nm. The size of the micropores can range from about 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, to 2 nm.

The porous carbon fibers can have a porosity. Porosity can be measured using techniques known in the art. The Examples herein can demonstrate at least one method for measuring porosity of the porous carbon fibers described herein. The porosity of the porous carbon fibers can range from about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, to 80 percent. In some aspects, the porosity of the porous carbon fibers can be about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 percent. In some aspects, the porosity of the carbon fibers can be about 50 percent.

As previously noted, the porous carbon fibers described herein can have a greater surface area than conventional PCFs and CFs. In some aspects, the porous carbon fibers can have a surface area of about 200 to 2000 $m^2 g^{-1}$. In some aspects, the porous carbon fibers can have a surface area of about 500 $m^2 g^{-1}$. Techniques for measuring and/or calculating surface are generally known in the art and also described and/or demonstrated in at least the Examples herein.

The PCFs described herein can have a larger pore volume as compared to conventional PCFs and CFs. This can be due to the increased interconnectivity of the mesopores and/or micropores. The increased interconnectivity can be the direct result of the uniform pore size and/or uniform pore distribution. In some aspects, the pores (e.g. mesopores, or micropores, or all pores) have a collective pore volume, where the collective pore volume can range from about 0.05 to 1 $cm^3/g$. In some aspects, the total collective pore volume of the PCF can range from about 0.05 to 1 $cm^3/g$. In some aspects, the total collective volume of the PCF is about 0.3 $cm^3/g$. The collective mesopore volume is the volume of the all the mesopores that are interconnected as they can be thought of and treated as a single pore due to their interconnection in some contexts. The total collective pore volume of PCF is the volume of all the pores in the PCF that are interconnected as they can be thought of and treated as a single pore due to their interconnection in some contexts. Methods and techniques for measuring pore volume are generally known in the art as well as described and/or demonstrate in at least the Examples herein.

The porous carbon fibers can be used to form a carbon fiber matrix composed of porous carbon fibers described herein. The porous carbon fibers can be randomly organized within the matrix. The spaces between the porous carbon fibers in the carbon fiber matrix are macropores. The carbon fiber matrix can be manufactured into any shape or form, which will depend on the specific application.

Methods of Making the Porous Carbon Fibers and Systems

As shown e.g. in FIG. 1C, the PCFs described herein can be made using conventional techniques but with unconventional materials. The manufacture of the PCFs and systems thereof can begin by spinning a copolymer. In aspects, electro spinning or any other spinning technique can be used. The copolymer can be any copolymer that can microphase separate. The copolymer can be a block copolymer, a random copolymer, a brush copolymer, a star copolymer, a branch copolymer, a graft copolymer, and a gradient copolymer. Suitable constituent polymers can include, but are not limited to, polyacrylonitrile (PAN) and derivatives thereof, rayon, petroleum pitch, poly(methyl methacrylate) (PMMA) and derivatives thereof, polyethylene and derivatives thereof, polypropylene and derivatives thereof, polyethylene terephthalate and derivatives thereof, polysaccharides and derivatives thereof, polyvinyl chloride, polystyrene and derivatives thereof, polyacrylate and derivatives thereof, polyacetylene and derivatives thereof, polyamides and derivatives thereof, and polyimides and derivatives thereof. In some aspects, the precursor copolymer can be a block copolymer of PAN and PMMA (PAN-b-PMMA). Methods of forming copolymers will be appreciated by those of ordinary skill in the art including, but not limited to RAFT polymerization, ROM polymerization, radical polymerization, condensation polymerization, etc.

The precursor copolymer can be spun using any suitable electrospinning, melt-spinning, solution-spinning, gel-spinning, injection-molding, or extrusion method into a polymer fiber. The precursor polymer can be processed to crosslink one of the constituent polymers. The cross-links between one or more of the constituent polymers can form a carbon fiber matrix. After spinning and crosslinking, the structure can be oxidized. The microphase separation between the constituent monomers can result in distributed regions of one constituent polymer within the other. After oxidation, the structure(s) can undergo pyrolysis to form the porous carbon fibers.

Uses of the PCFs and Systems

As previously discussed, the PCFs and carbon fiber matrices thereof have a wide variety of applications. In some aspects, they can be used in energy storage and/or energy conversion devices, including but not limited to batteries, capacitors, hydrolyzers, and fuel cells. They can be used in various electronics and related devices. Their flexibility can allow them to be used for where flexibility in the device is desired. Some examples include, but are not limited to, wearable electronics. They can be used to form a membrane that can be used for any application wherein separation, filtration, and purification is desirable.

In aspects, a battery can include one or more porous carbon fibers and/or a carbon fiber matrix as described elsewhere herein. In aspects, a capacitor can include one or more porous carbon fibers and/or a carbon fiber matrix as described elsewhere herein. In aspects, a hydrolyzer can include one or more porous carbon fibers and/or a carbon fiber matrix as described elsewhere herein. In aspects, a fuel cell can include one or more porous carbon fibers and/or a carbon fiber matrix as described elsewhere herein. In aspects, a filtration or separation membrane can include one or more porous carbon fibers and/or a carbon fiber matrix as described elsewhere herein.

EXAMPLES

Now having described the embodiments of the present disclosure, in general, the following Examples describe some additional embodiments of the present disclosure. While embodiments of the present disclosure are described in connection with the following examples and the corresponding text and figures, there is no intent to limit embodiments of the present disclosure to this description. On the contrary, the intent is to cover all alternatives, modifications, and equivalents included within the spirit and scope of embodiments of the present disclosure. The following examples are put forth so as to provide those of ordinary skill in the art with a complete disclosure and description of how to perform the methods and use the probes disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

Example 1

Figures 1D, 1E:
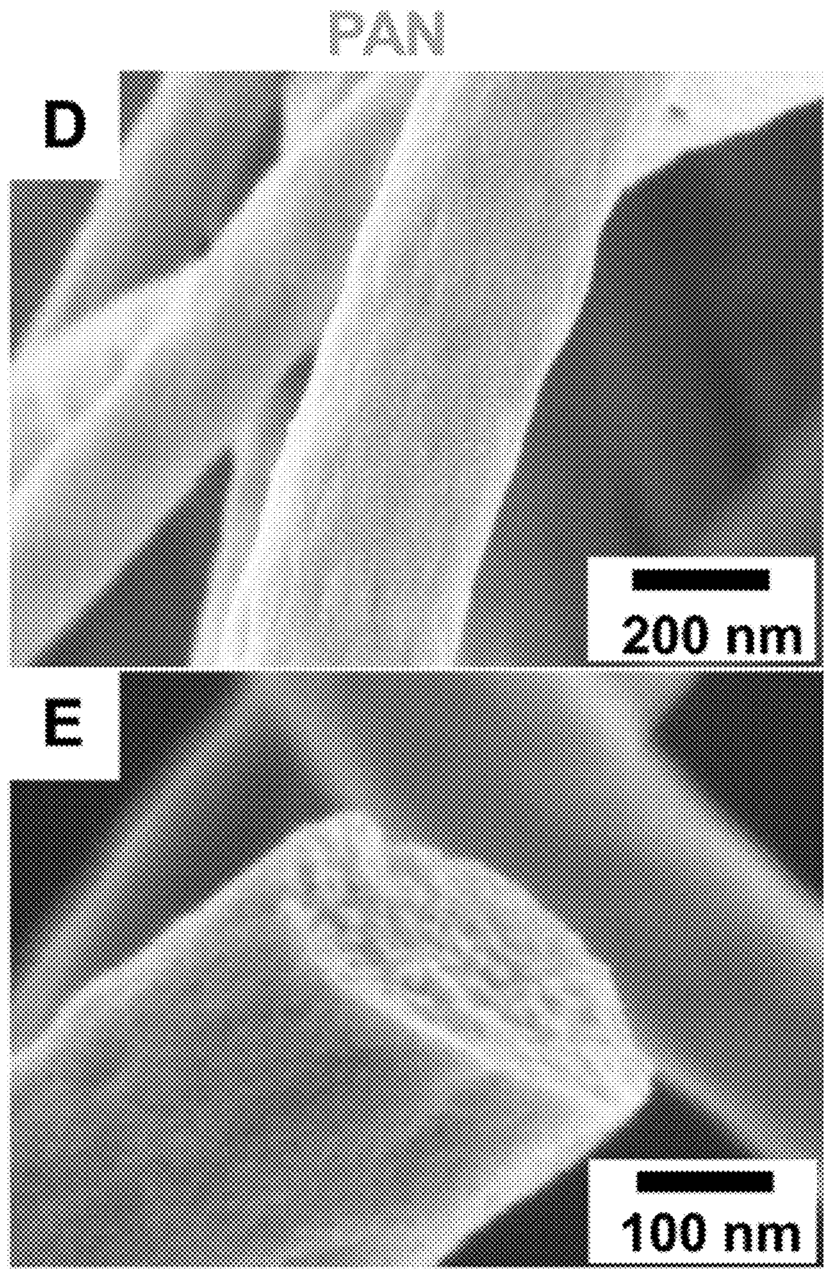
Figure 1F:
Figure 1G:
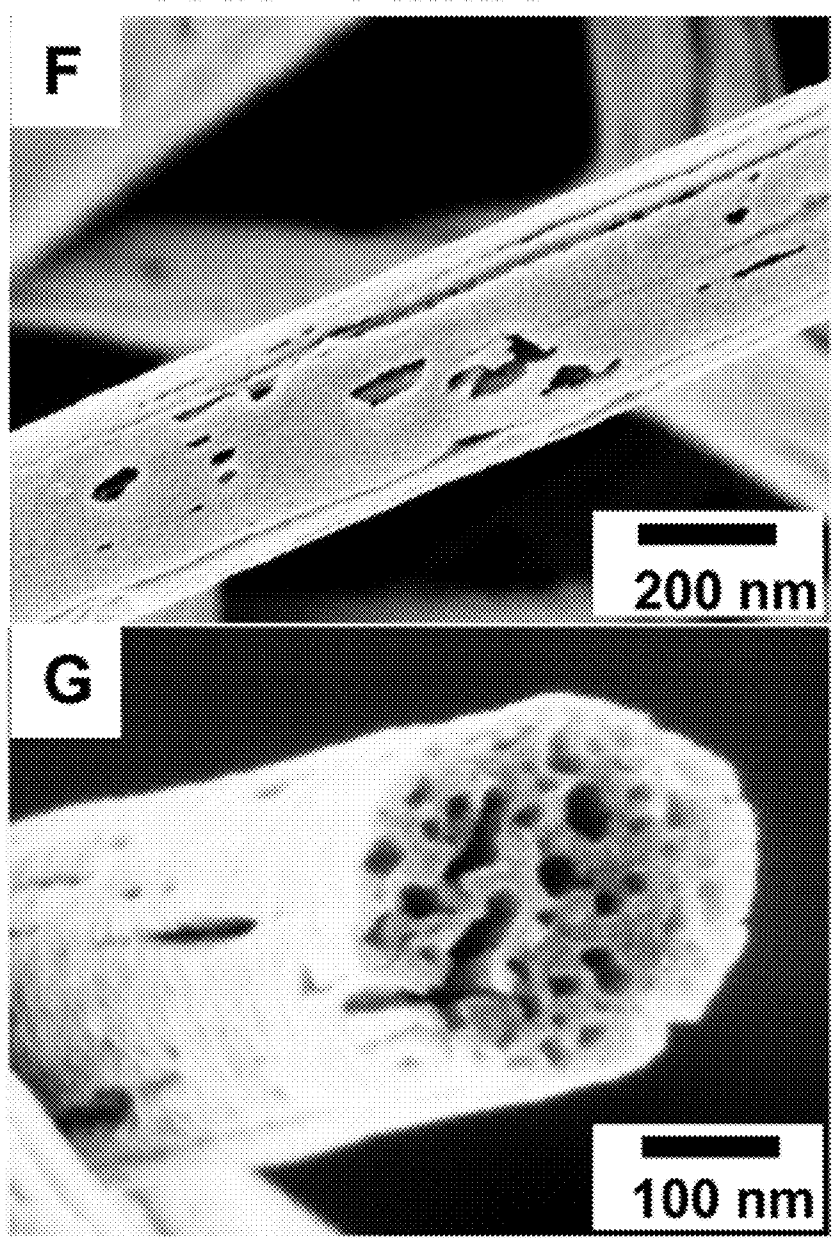

Carbon fibers are superior materials for flexible and wearable electronics (1, 2), as well as for aerospace and airspace applications (3), because of their outstanding mechanical strength, high flexibility, low density, excellent electrical conductivity, chemical stability, high temperature tolerance, and small thermal expansion coefficient (3-5). Carbon fibers mostly have been adopted as supporting scaffolds to alleviate the poor electrical conductivity of high-capacitance pseudocapacitive materials in supercapacitors (6-9). Besides serving as supports that contribute little to the supercapacitor capacitance, in the last decade, carbon fibers have been the focal point of growing efforts to turn them into active components (1, 10, 11). The direct use of carbon fibers as self-supporting electrodes removes the need for time-consuming processes to load other materials, such as pseudocapacitive materials, conductive additives, and binders (12, 13), that introduce additional interfacial resistance and are detrimental to ultrafast charge/discharge. However, there are problems associated with this approach. Most carbon fibers are solid carbon filaments produced pyrolytically from pitch (14), polyacrylonitrile (PAN) (15) (FIGS. 1A, 1D and 1E), and biorenewable polymers [e.g., cellulose (16), lignin (17), and others (18, 19)]. Their smooth surfaces with limited effective surface areas (<10 $m^2$ $g^{-1}$) render them virtually incapable of storing a large amount of electrochemical energy (20, 21). Therefore, strategies to increase the porosity of carbon fibers are highly desirable to realize their potential as active materials in electrochemical energy storage and for other applications were porosity is desirable.

To increase their capacitance, it is important that carbon fibers have (i) highly uniform pores (22) of certain sizes (e.g. micropores of <1 nm and mesopores of about 10 nm) (21, 23) and (ii) hierarchical porous structures to permit easy access by ions to the micropores (24). There are mainly two ways to create PCFs. The first category is to posttreat carbon fibers via activation and chemical exfoliation (25, 26). Activation with corrosive chemical agents (e.g., $HNO_3$ and KOH) roughens the carbon fiber surfaces, but it usually needs highly reductive chemicals (e.g., hydrogen and hydrazine) and complicated postprocesses to restore the electrical conductivity. Chemical exfoliation is another facile way to activate carbon fibers, but with this method it is difficult to control the porosity and pore size, as well as to preserve the fiber integrity.

The second strategy focuses on designing carbon fiber precursors. A variety of PCFs have been prepared by electrospinning PAN blended with sacrificial homopolymers (27, 28), $SiO_2$ nanoparticles (29, 30), and carbon additives (11). Although these methods produce PCFs, they do not allow control over the pore size and uniformity because of the macrophase separation of the polymer blends (FIGS. 1B, 1F, 1G and FIGS. 6A-6C) and the difficulty in distributing the additives uniformly in the PAN matrix. Furthermore, the removal of inorganic particles involves the use of highly toxic and corrosive chemicals, and often it is challenging to fully remove the incorporated particles (29, 30). Therefore, the development of an effective and efficient method for addressing the aforementioned obstacles, as well as the creation of uniform and hierarchical porous structures, is crucial to advance the electrochemical performance of carbon fibers (22).

Described in this Example is the use of PAN-containing block copolymers as precursors to create hierarchical porous structures in carbon fibers (31-35). In contrast to the polymer blends, block copolymers microphase-separate (36) to form highly uniform mesoporous structures (34, 37, 38) with pore sizes in the range of 2 to 50 nm (39-42). Furthermore, block copolymers can create interconnected mesopores and micropores. The hierarchical pores are important for high capacitive performance because mesopores serve as ion-buffering reservoirs and ion-transport pathways that reduce the ion diffusion distances from the bulk electrolyte to the micropores, resulting in an enhanced rate capability (6, 21, 22).

Figures 1H, 1I:
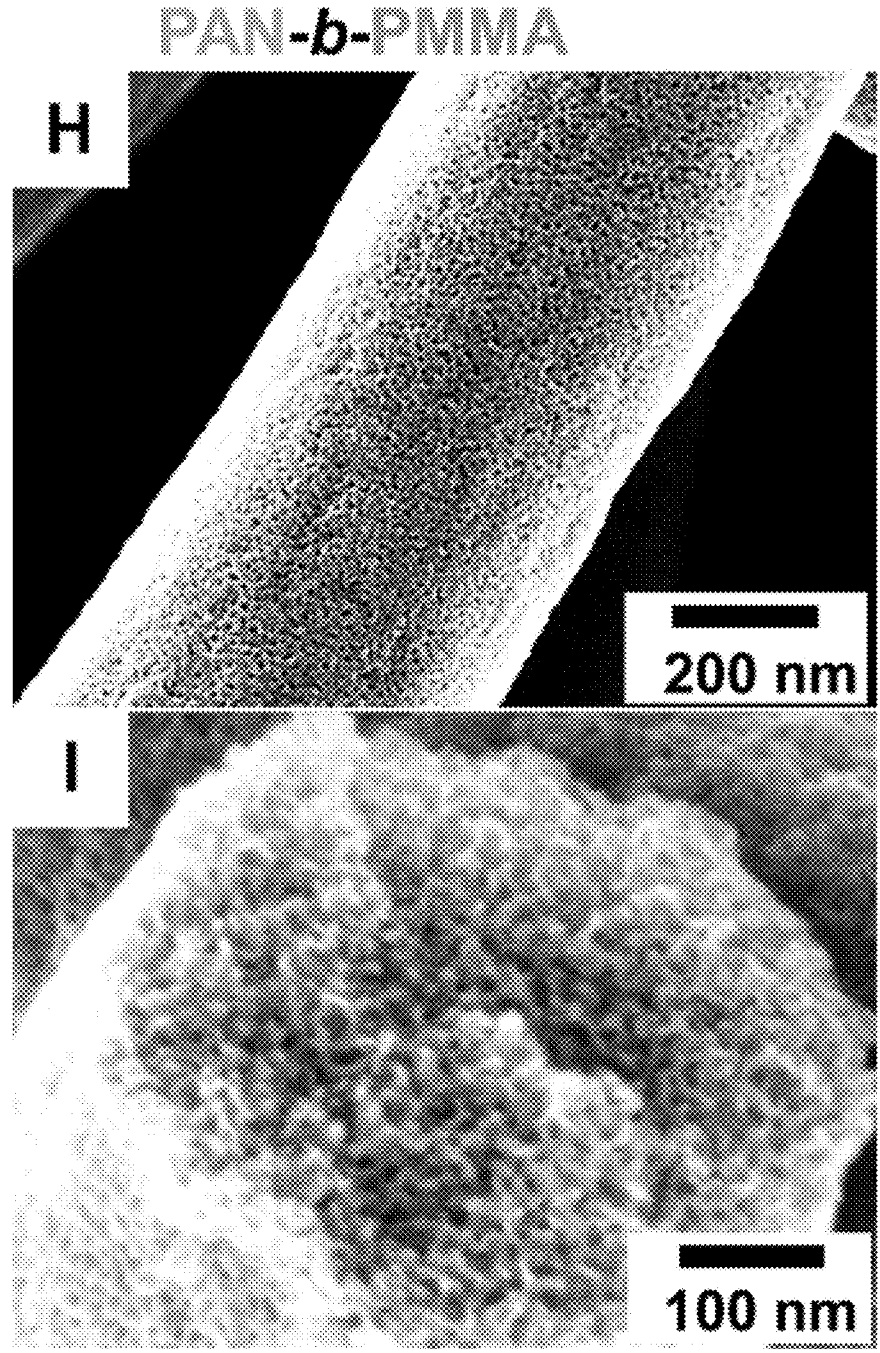

This Example can demonstrate, inter alia, compositions and method for synthesizing hierarchical PCFs with highly controlled structures by taking advantage of block copolymer self-assembly (FIGS. 1C, 1H, and 1I). The method demonstrated in this Example employs a metal-free reversible addition-fragmentation chain transfer (RAFT) polymerization of poly(acrylonitrile-block-methyl methacrylate) (PAN-b-PMMA) followed by electrospinning, oxidation and pyrolysis. The method is free from the use of etchants or activation chemicals. The as-prepared PCFs have hierarchically interconnected meso- and micropores with a high surface area of 503 $m^2$ $g^{-1}$ and a rich nitrogen content of 12.8%. The PCFs achieve a high surface area-normalized capacitance of 66 $\mu F\ cm^{-2}$, substantially higher than any of the state-of-the-art PCFs derived from PAN, PAN blends, and other carbon fiber precursors (Table 1). Table 1 can demonstrate The electrochemical capacitive performance of representative porous carbon fiber electrodes to generate the charts in FIGS. 4A-4F. Notes regarding Table 1:1) For fair comparison, the capacitances are all evaluated at 1 A $g^{-1}$ in a symmetric two-electrode configuration. Capacitances at other current densities are not considered. 2) For fair comparison of fibrous electrodes, the table only incudes capacitances of carbon fibers. 3) The porous carbon fibers in this Example are not activated, which can be done to further improve the performance using methods and techniques known to one of ordinary skill in the art. 4) No conductive additives or polymer binders are considered.

TABLE 1

| Electrode materials | Precursors | Activation agents | Specific surface area ($m^2$ $g^{-1}$) | Gravimetric capacitance (F $g^{-1}$, at 1 A $g^{-1}$) | BET-area-normalized capacitance ($\mu F\ cm^{-2}$) | References |
|---|---|---|---|---|---|---|
| Porous flexible carbon nanofiber (CNF) paper | Phenolic resin/poly(vinyl alcohol) (PVA) | KOH | 1317 | 235 | 18 | *Chem. Eng. J.* 2014, 249, 216-225 |
| CNFs with radially grown graphene sheets | PAN/graphene | $NH_3$ | 2185 | 133 | 6 | *Nanoscale* 2013, 5, 4902-4909 |
| Porous carbon nanofibers with carbon nanotube (CNT) fillers | PAN/CNT | $H_2O_2$ | 810 | 280 | 35 | *J. Mater. Chem.* 2009, 19, 2810-2816 |
| 3D hierarchical porous carbon fibers | PAN | Hydrochloric acid | 2177 | ~270 | 12 | *J. Mater. Chem. A* 2015, 3, 14817-14825 |

TABLE 1-continued

| Electrode materials | Precursors | Activation agents | Specific surface area ($m^2\ g^{-1}$) | Gravimetric capacitance ($F\ g^{-1}$, at $1\ A\ g^{-1}$) | BET-area-normalized capacitance ($\mu F\ cm^{-2}$) | References |
|---|---|---|---|---|---|---|
| Graphene integrating carbon fibers | PAN/graphene | KOH | 830 | 129 | 16 | *Carbon* 2018, 126, 500-506 |
| Nomex-derived activated carbon fibers | Nomex aramid fibers | $H_3PO_4/CO_2$ | 2600 | 175 ($5\ mV\ s^{-1}$) | 7 | *J. Power Sources* 2006, 153, 419-423 |
| CNFs PAN | PAN | Water steam | 1230 | 120 | 10 | *Appl. Phys. Left.* 2003, 83, 1216-1218 |
| CNFs | PAN | $CO_2$ | 705 | 200 | 28 | *Carbon* 2009, 47, 2984-2992 |
| In-situ nitrogen-doped mesoporous CNFs | PAN | $Mg(OH)_2$ | 926 | 327 | 35 | *J. Mater. Chem. A* 2017, 5, 23620-23627 |
| Plasma oxidized electrospun CNFs | PAN | Plasma | 274 | 160 | 58 | *RSC Adv.* 2015, 5, 38868-38872 |
| Activated carbon fiber webs | Poly(amic acid) (PAA) | Water steam | 2100 | 175 | 8 | *Electrochim. Acta* 2004, 50, 883-887 |
| Porous CNFs | PAN/PMMA | $CO_2$ | 2419 | 140 | 6 | *RSC Adv.* 2015,5, 19865-19873 |
| Porous CNFs | PAN | $ZnCl_2$ | 550 | 140 | 25 | *Adv. Mater.* 2007, 19, 2341-2346 |
| Activated porous CNFs using Sn | PAN/poly (vinylpyrrolidone) (PVP) | Sn/Acid | 1082 | 175 | 16 | *Carbon* 2013, 65, 87-96 |
| Nitrogen-doped hierarchical porous carbon fibers | PAN/PMMA/ tetraethyl orthosilicate/ thermoplastic polyurethane | HF acid/$SiO_2$ | 1126 | 198 | 18 | *J. Solid State Electrochem.* 2015, 19, 1591-1597 |
| Nitrogen-doped hollow activated CNFs | PAN/PVP | $NH_3$ | 701 | 180 | 26 | *J. Electroanal. Chem.* 2015, 739, 84-88 |
| Hierarchical porous CNFs | PAN/PMMA/ tetraethyl orthosilicate (TEOS) | HF acid/$SiO_2$ | 699 | 170 | 24 | *J. Solid State Electrochem.* 2013, 17, 2731-2739 |
| Graphitic carbon nitride nanosheets @ N-enriched mesoporous CNFs | PAN/g-$C_3N_4$ nanosheets | Water steam | 554 | 149 | 27 | *Carbon* 2015, 94, 342-348 |
| High surface-area CNFs | Synthesized polymer (PIM-1) | Water steam | 1162 | 149 | 13 | *J. Mater. Chem. A* 2014, 2, 418-424 |
| Mesoporous CNFs with large cage-like pores | PVA/Sn-citric composite | Sn/HCl | 800 | 103 | 13 | *Carbon* 2014, 70, 295-307 |
| N/P/K co-doped porous CNFs | Cane molasses | NA | 580 | 172 | 30 | *RSC Adv.* 2014, 4, 34739-34750 |
| Porous CNFs | PAN/Nafion | NA | 1499 | 210 | 14 | *J. Power Sources* 2013, 235, 289-296 |
| Heteroatom-enriched electrospun CNFs | Melamine formaldehyde resin/PVA | NA | 320 | 160 | 50 | *J. Colloid Interface Sci.* 2013, 395, 217-223 |
| Electrospun CNFs/graphene | PAN/graphene | NA | 480 | 183 | 38 | *J. Power Sources* 2013, 243, 350-353 |
| CNF/CNT composite | PAN/CNT/ spherical latex nanoparticles | NA | 535 | 250 | 47 | *Mater. Lett.* 2015, 161, 587-590 |
| CNFs | Poly(amide imide) | NA | 1360 | 100 | 7 | *Mater. Sci. Eng. B* 2009, 164 , 106-111 |
| Microporous CNFs | Phenolic resin/ TEOS/PVP | NA | 2164 | 310 | 14 | *Int. J. Hydrogen Energy* 2016, 41, 9383-9393 |

TABLE 1-continued

| Electrode materials | Precursors | Activation agents | Specific surface area ($m^2 g^{-1}$) | Gravimetric capacitance ($F g^{-1}$, at 1 $A g^{-1}$) | BET-area-normalized capacitance ($\mu F cm^{-2}$) | References |
|---|---|---|---|---|---|---|
| Nitrogen- and oxygen-enriched 3D hierarchical porous CNFs | PAN copolymer (acrylonitrile/itaconic acid) | NA | 2177 | 250 | 12 | *J. Mater. Chem. A* 2015, 3, 14817-14825 |
| Microporous CNFs | PAA/PVP | NA | 804 | 180 | 22 | *J. Power Sources* 2015, 278, 683-692 |
| Nitrogen-enriched porous CNFs | PAN/allyl polyethylene glycol (PEG) | NA | 753 | 270 | 36 | *Electrochim. Acta* 2015, 158, 306-313 |
| Porous CNTs (55) | Polyaniline nanotubes | NA | 3253 | 285 | 9 | *J. Mater. Chem. A* 2014, 2, 12545-12551 |
| $ZnCl_2$-activated and filter paper-derived CNFs | Waste filter paper | $ZnCl_2$ | 2232 | 302 | 14 | *RSC Adv.* 2015,5, 72019-72027 |
| Nitrogen-doped porous multi-nano-channel CNFs | PAN/polystyrene | NA | 840 | 325 | 39 | *ACS Sustainable Chem. Eng.* 2016, 4, 2439-2448 |

Results

Synthesis and Structural Characterization of Hierarchical PCFs

Figure 2A:
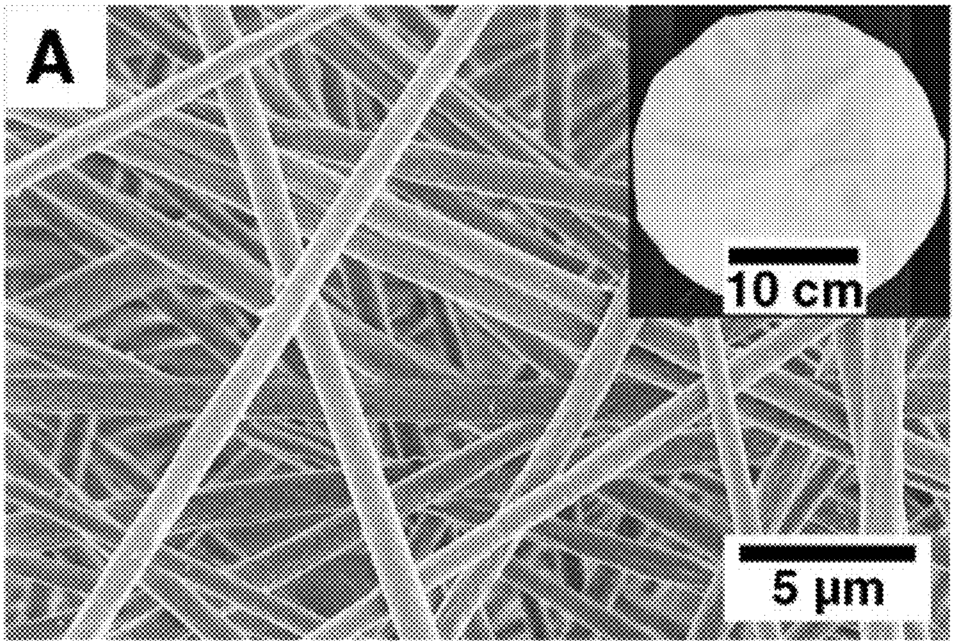
FIGS. 2A-2I can demonstrate microstructures of PCFs. Scanning Electron Micrograph (SEM) images of PAN-b-PMMA fibers (FIGS. 2A and 2B) after electrospinning, (FIG. 2C) after oxidation and self-assembly at about 280° C. in air, and (∫FIGS. 2D to 2F) after pyrolysis at about 800° C. in $N_2$.
Figure 2B:
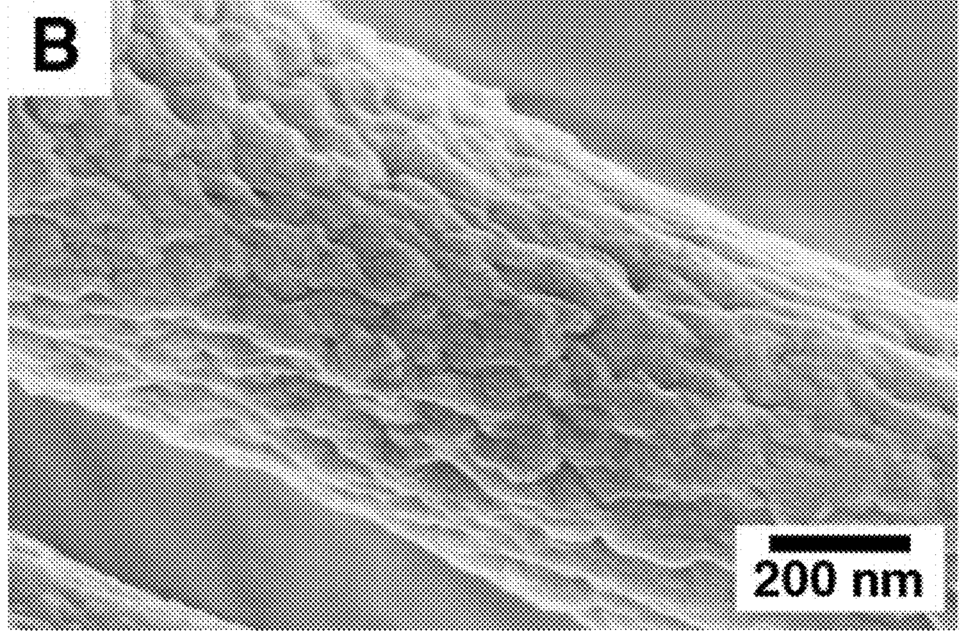
Figures 6A, 6B, 6C:
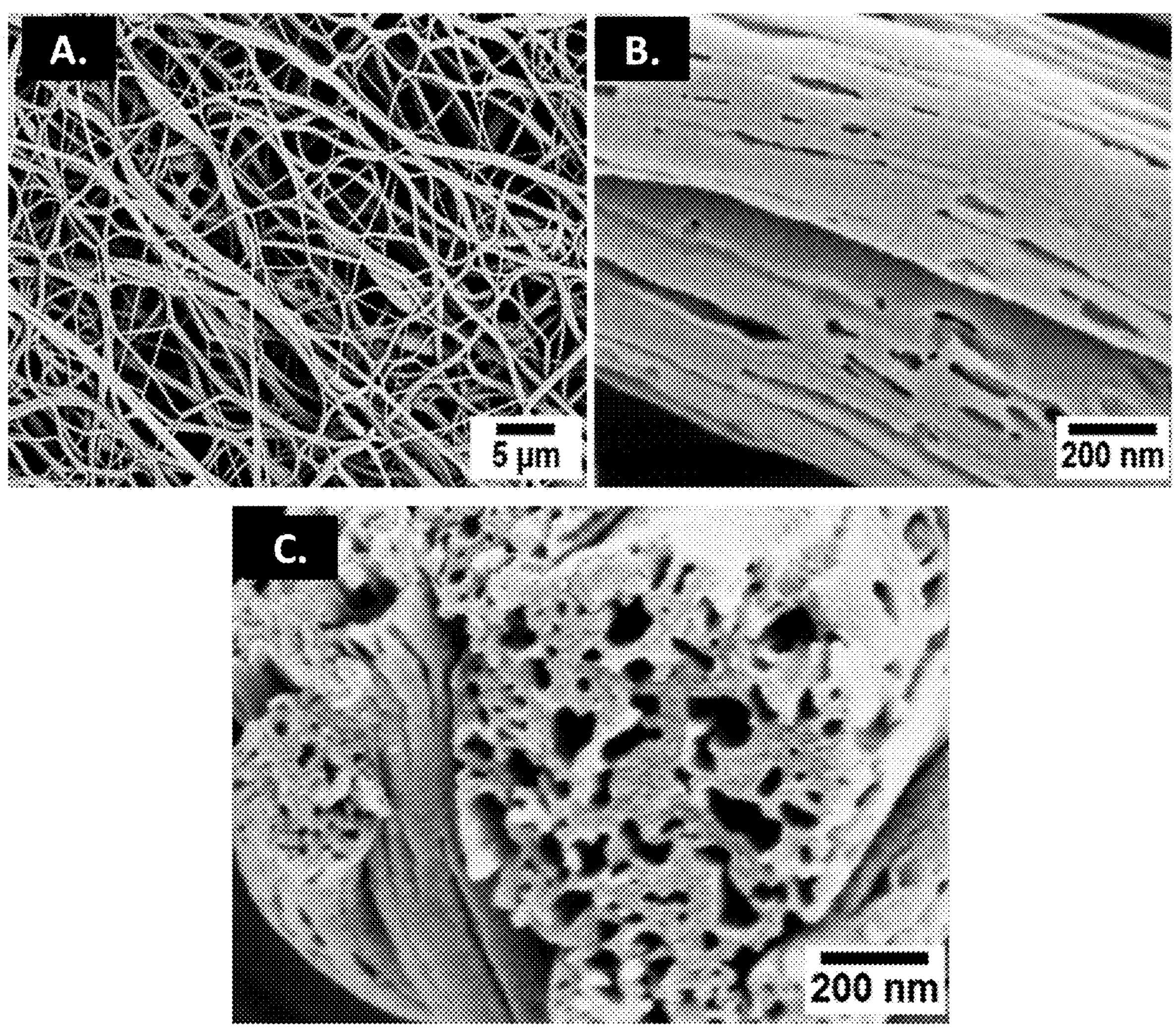
Figures 6J, 6K, 6L:
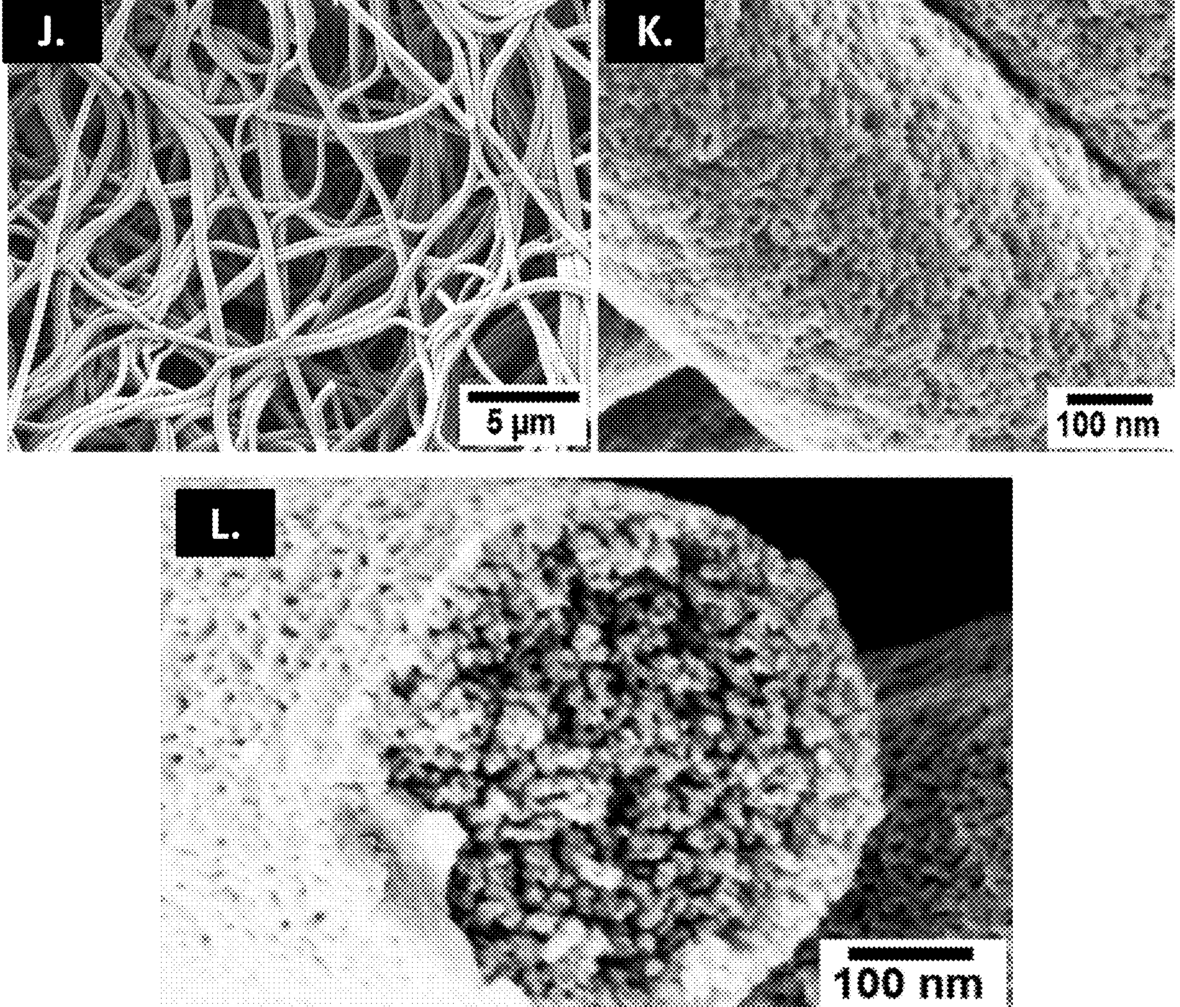
Figures 6P, 6Q:
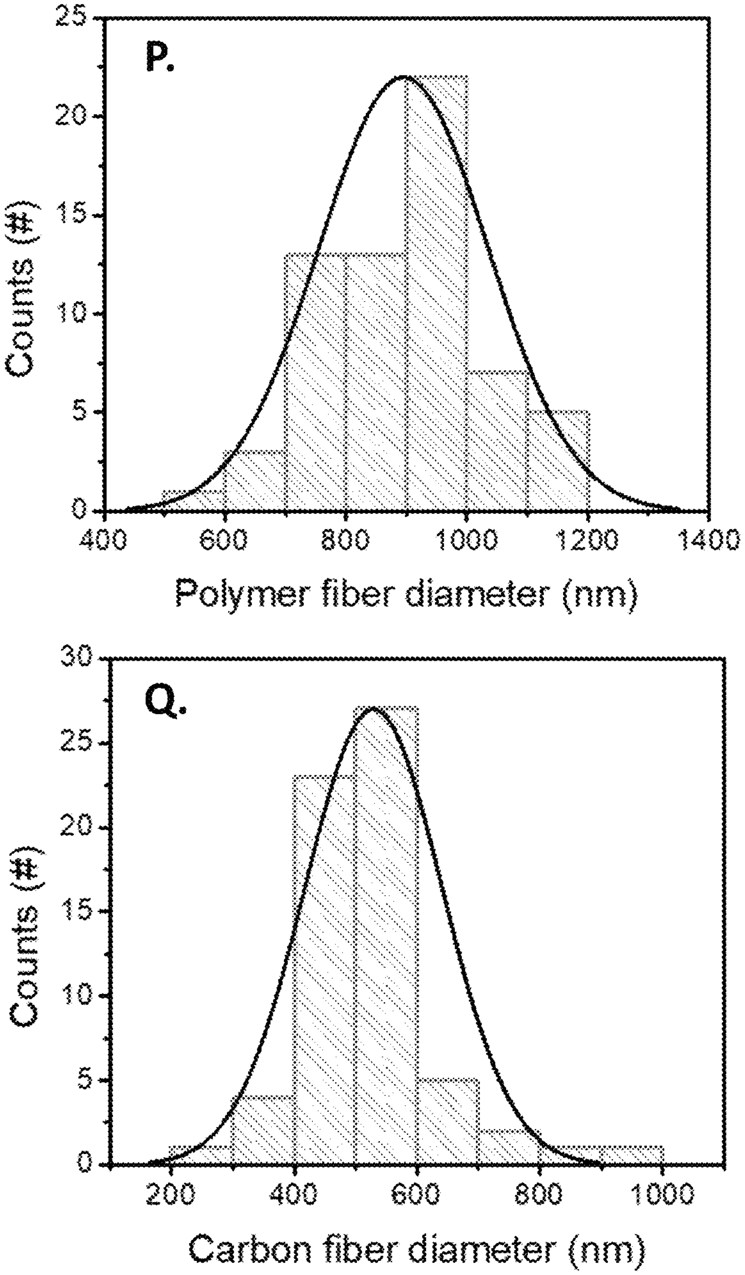
Figures 7A, 7B:
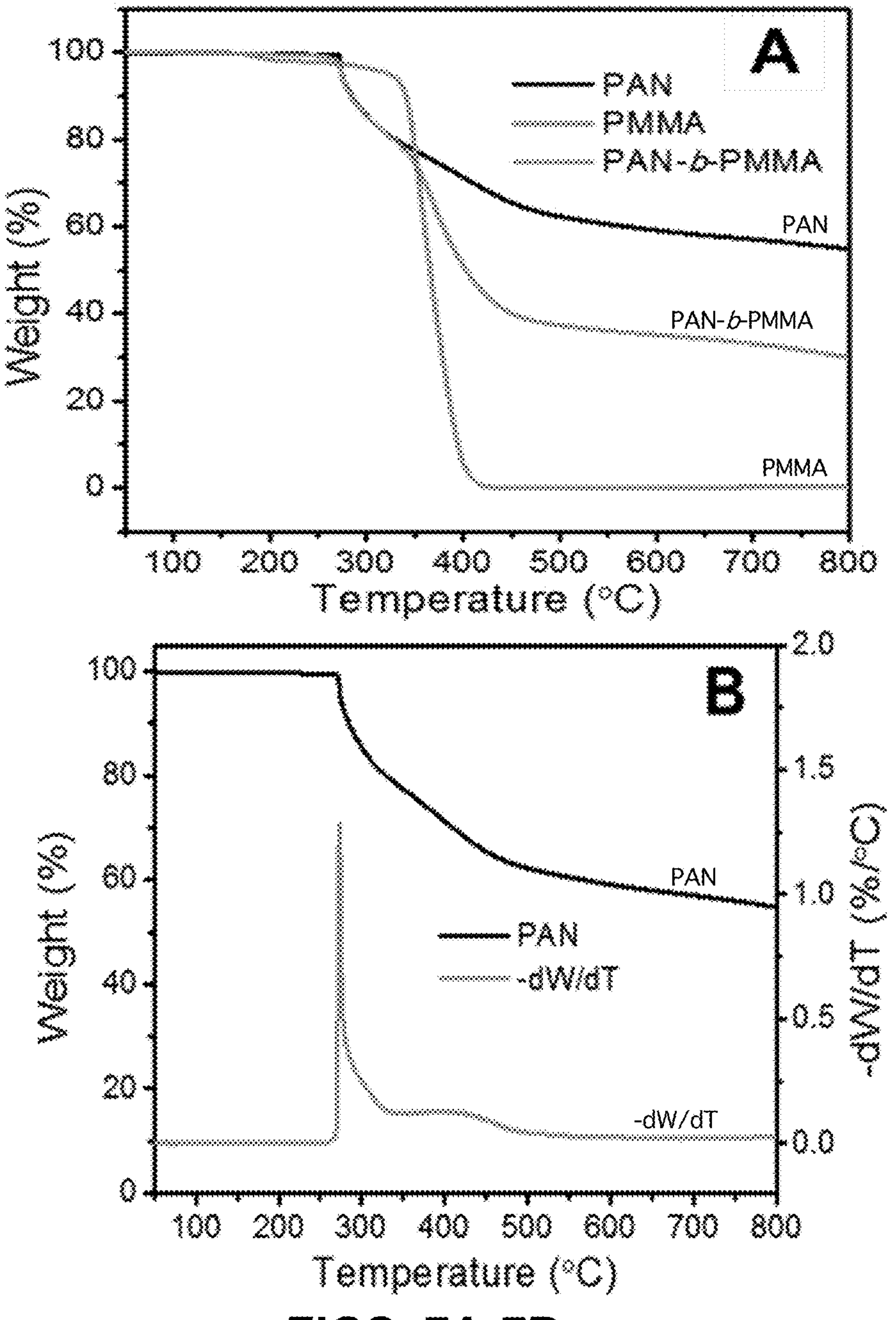
FIGS. 7A-7D show graphs that demonstrate results from thermogravimetric analyses (TGA) of various PCFs.
Figures 7C, 7D:
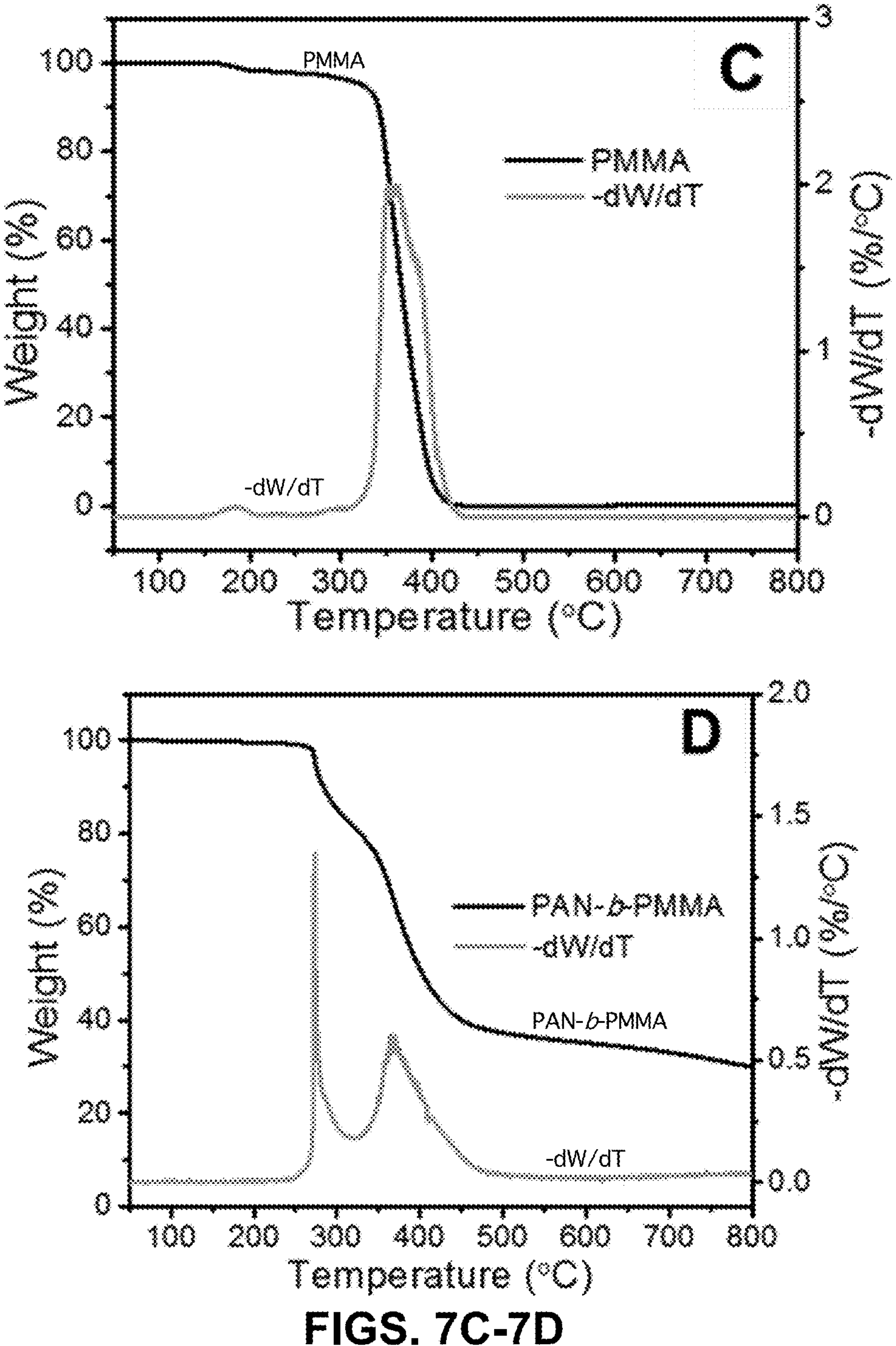

PAN-b-PMMA [111-b-62 kDa, polydispersity index (PDI), 1.14) with 64 volume % of PAN was synthesized and used as the carbon precursor. The as-electrospun polymer fibers were white and flexible (FIG. 2A). Because of the rapid solvent evaporation during electrospinning, the resulting polymer fibers had rough surfaces (FIGS. 2B and 6D-6F). The average diameter of the polymer fibers was 911±122 nm (FIG. 6P). By crosslinking and cyclization of PAN at elevated temperatures in air (43), the oxidation process stabilized the fibrous structures (FIGS. 2C and 6G-6I), and the fiber diameters did not change significantly afterward. The crosslinking of PAN prevented PAN-b-PMMA from forming long range-ordered nanostructures (44), and the resulting porous structures were interconnected and thus beneficial for ion transport in supercapacitors.

After oxidation, PAN-b-PMMA fibers exhibited microphase-separated poly(methyl methacrylate) (PMMA) domains in a PAN matrix (FIGS. 2C and 6G-6I). PAN and PMMA showed excellent contrast and were easily distinguishable in the scanning electron microscopy (SEM) images, owing to the partial degradation of PMMA during the oxidation process as shown by the thermogravimetric analysis (TGA) (FIGS. 7A-7D). The thermally annealed polymer fibers were subjected to pyrolysis in an $N_2$ atmosphere, resulting in PCFs termed PAN-b-PMMA-CFs (FIGS. 2D, 2E and 6J-6L). Without the use of chemical exfoliation or activation, the pyrolysis of PAN-b-PMMA yielded a continuous porous carbon structure. The carbon yield was about 30.5% according to TGA (FIGS. 7A-7D). After pyrolysis, the average fiber diameter decreased to 519±96 nm (FIG. 6Q) and the fibrous network remained intact. The carbon fiber diameter was substantially larger than the supposed diameter of 364 nm, assuming full pyrolysis and consolidation of polymers into non-PCFs (eq. 13), indicating that the resulting carbon fibers were highly porous and had a low density. The estimated porosity of carbon fibers was about 50.8%, in agreement with Brunauer-Emmett-Teller (BET) analysis (about 50.6%; eqs. 14 and 15). The porous structure was confirmed by high-magnification SEM images (FIGS. 1I, 2F and 6J-6L), in which mesopores were observed throughout the fibers. PAN-b-PMMA-CFs were flexible and remained intact when the fiber mat was bent to various angles (FIGS. 6M-60).

Figures 2C, 2D:
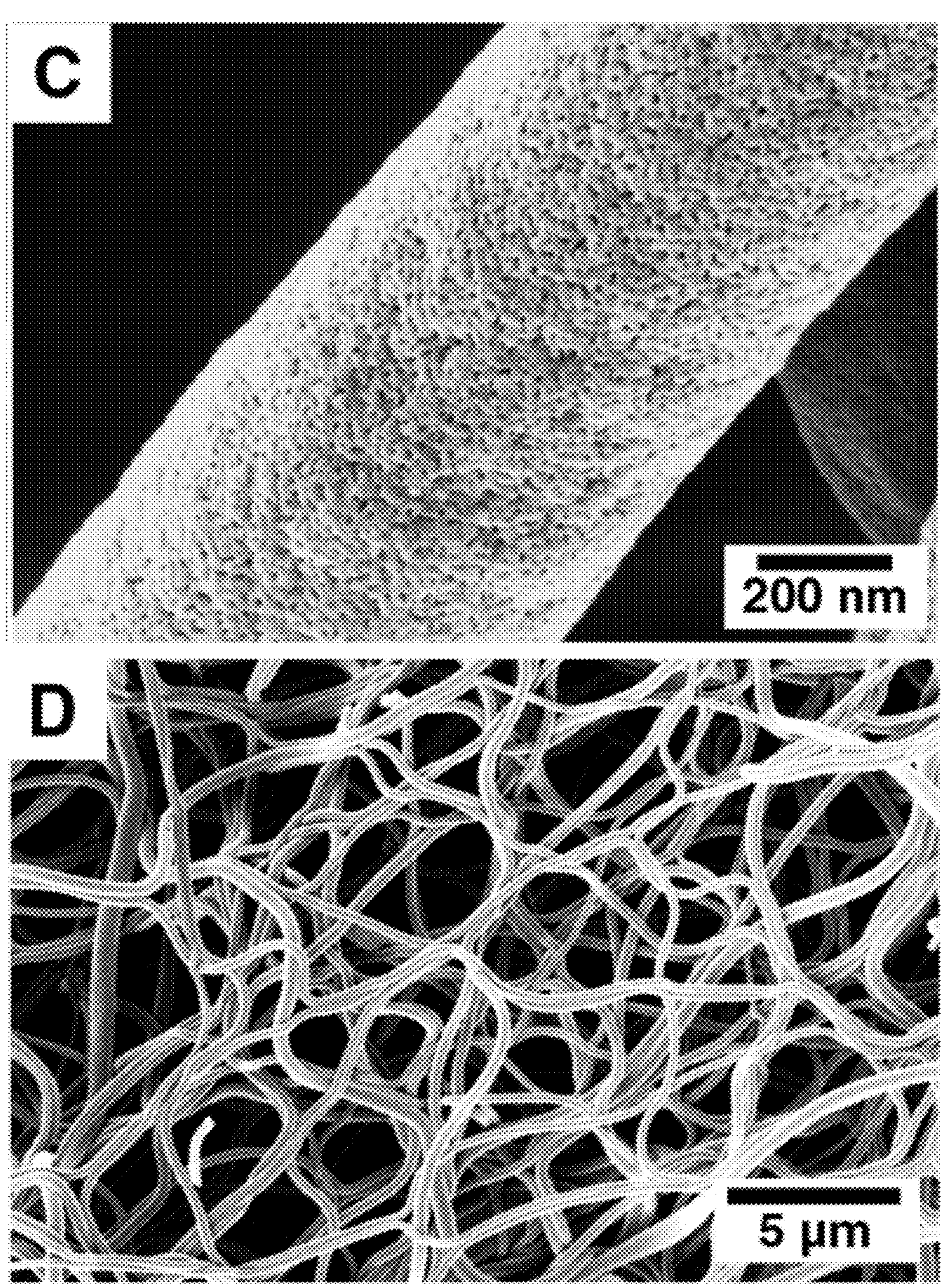
Figures 2E, 2F:
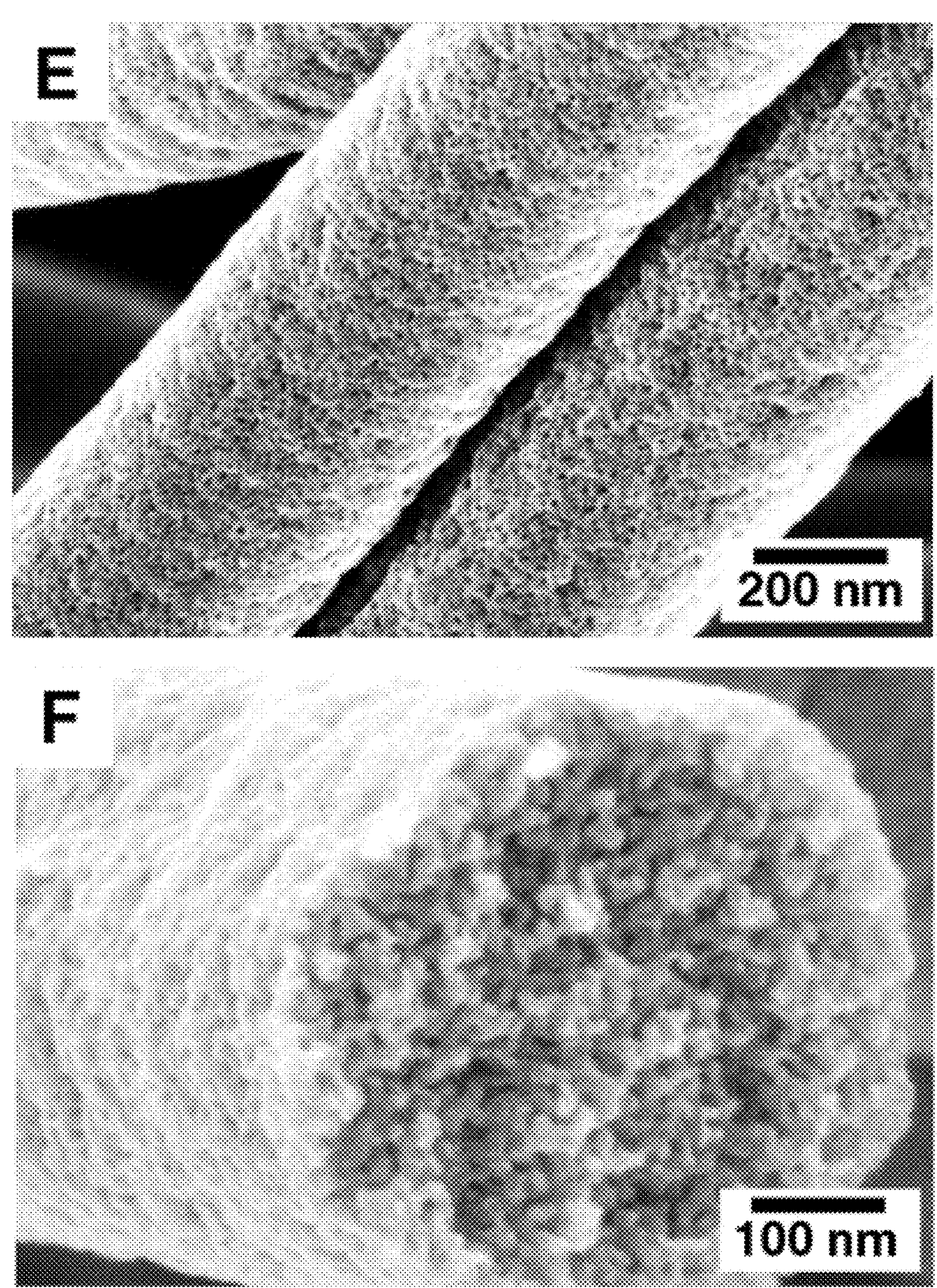
Figures 2G, 2H:
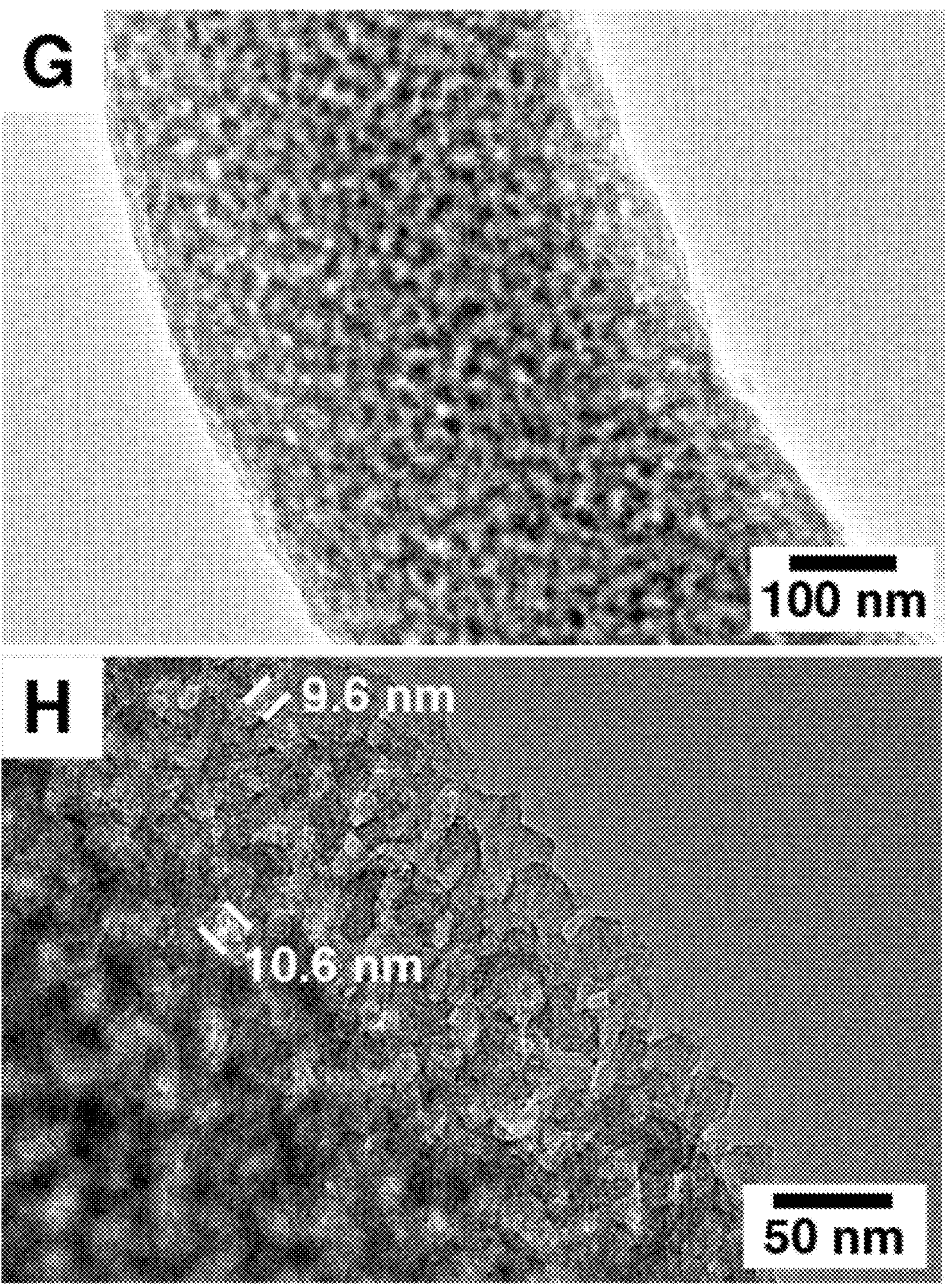
Figures 2I, 3A:
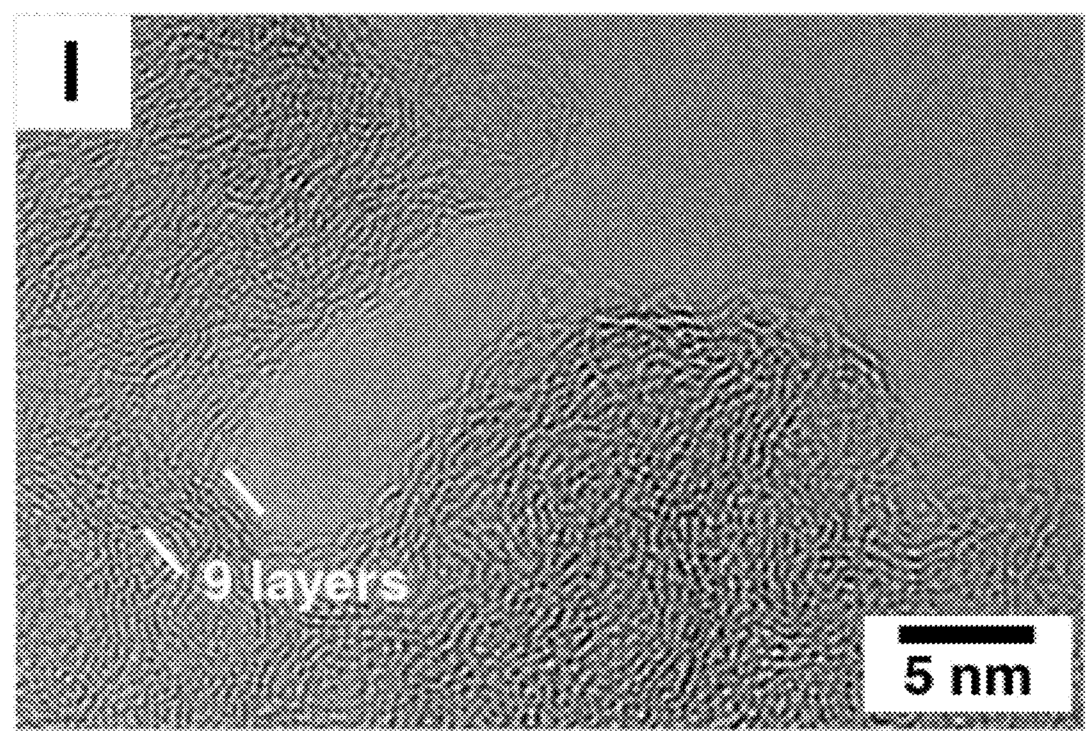
FIGS. 3A-3D can demonstrate a porosity analyses of PCFs.
Figures 8A, 8B:
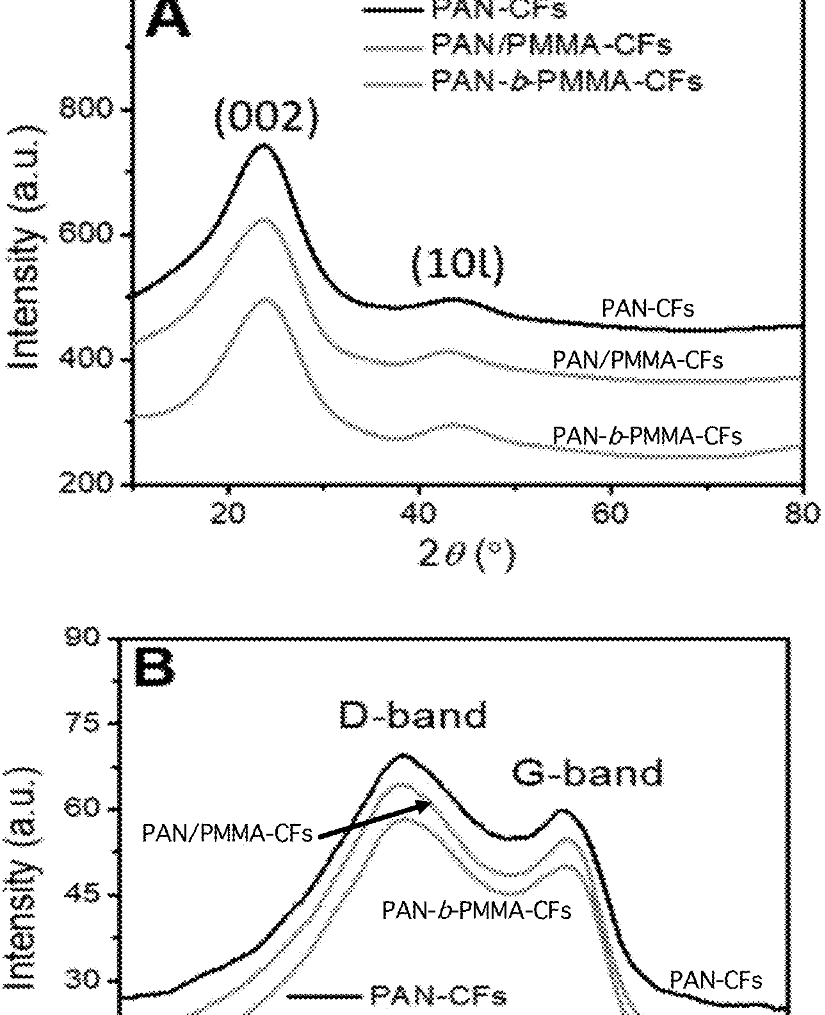
FIGS. 8A-8C show graphs that demonstrate results from (FIG. 8A) XRD profiles of PAN-CFs, PAN/PMMA-CFs and PAN-b-PMMA-CFs after pyrolysis at 800° C. The diffraction peaks at about 24° and about 43° were assigned to the carbon crystallographic planes (002) and (101), respectively. (101) denotes the potentially overlapping peaks of (100) and (101).

Transmission electron microscopy (TEM) further confirmed the interconnected pores in the carbon fibers (FIGS. 2G-2I). The mesopore size was determined to be about 10 nm, as highlighted in the TEM image (FIG. 2H). At the edge of the PCF, layered carbon structures were observed (FIG. 2I). The thickness of a single carbon layer was estimated by averaging over a number of carbon layers. For instance, the thickness of nine layers of carbon was about 3.46 nm (FIG. 2I), corresponding to an interplanar spacing of about 0.38 nm. The measured value agreed well with the value of about 0.37 nm calculated from x-ray diffraction (XRD) analysis. Both PAN-b-PMMA-CFs and PAN/PMMA-CFs (i.e., carbon fibers derived from PAN/PMMA) exhibited a full-width-at-half-maximum of the (100) peak of 0.11 in radian (FIG. 8A and Table 2, XRD section), which corresponded to a lateral size ($L_a$) of about 2.8 nm according to the Debye-Scherrer equation (eq. 7). The lateral sizes of both PAN-b-PMMA-CFs and PAN/PMMA-CFs were twice that of PAN-CFs (carbon fibers derived from PAN). PAN-b-PMMA-CFs had a crystallite size ($L_c$) of 0.98 nm, indicating about three to four π-stacked graphitic layers. In addition, Raman spectra of PAN-CFs, PAN/PMMA-CFs and PAN-b-PMMA-CFs revealed the characteristic "G-band" at about 1560 to 1600 $cm^{-1}$ and "D-band" at about 1310 to 1350 $cm^{-1}$ (FIG. 8B), corresponding to ordered graphitic structures and disordered domains, respectively. The calculated D band to G band intensity ratio ($I_D/I_G$) of all carbon fibers was 1.16 (Table 2, Raman section), indicating that their graphitization degrees were identical.

The microstructures of block copolymer and carbon fibers were further confirmed by small-angle x-ray scattering (SAXS; FIG. 3A). The SAXS spectrum of the as-electrospun PAN-b-PMMA fibers was devoid of any distinct features. After oxidation at about 280° C., PAN-b-PMMA fibers exhibited a broad Bragg peak in the range of 0.172 to 0.218 $nm^{-1}$, corresponding to center-to-center domain spacings of about 37 to 29 nm. The broad SAXS peak suggested that the microphase-separated structures of PAN-b-PMMA were likely disordered and lacked long range order (38). After pyrolysis at about 800° C., the position of the Bragg peak shifted to 0.224 to 0.308 $nm^{-1}$ and the center-to-center spacings decreased to about 28 to 20 nm (Table 2 SAXS section). The shift of the Bragg peak in SAXS spectra agreed with that in the fast Fourier transform (FFT) spectra (FIG. 8C) from the SEM images (FIGS. 2C and 2E). FFT spectra showed center-to-center spacings of about 38 to 29 and about 29 to 20 nm for the oxidized and pyrolyzed PAN-b-PMMA fibers, respectively. In contrast, the pyrolyzed PAN and PAN/PMMA fibers did not exhibit any distinguishable features, indicating the absence of well-defined nanostructures. The scattering intensity (I) and wave vector (q) followed Porod's law(45), I $q^x$. For PAN-b-PMMA fibers, the power-law index x≈−3.73, in contrast with a previous report (35) of x≈−4.00 for block copolymer powders. After pyrolysis, x increased to −3.43, suggesting that the surfaces of the carbon fibers were highly fractal and rough (Table 2, SAXS section).

Figures 3B, 3C:
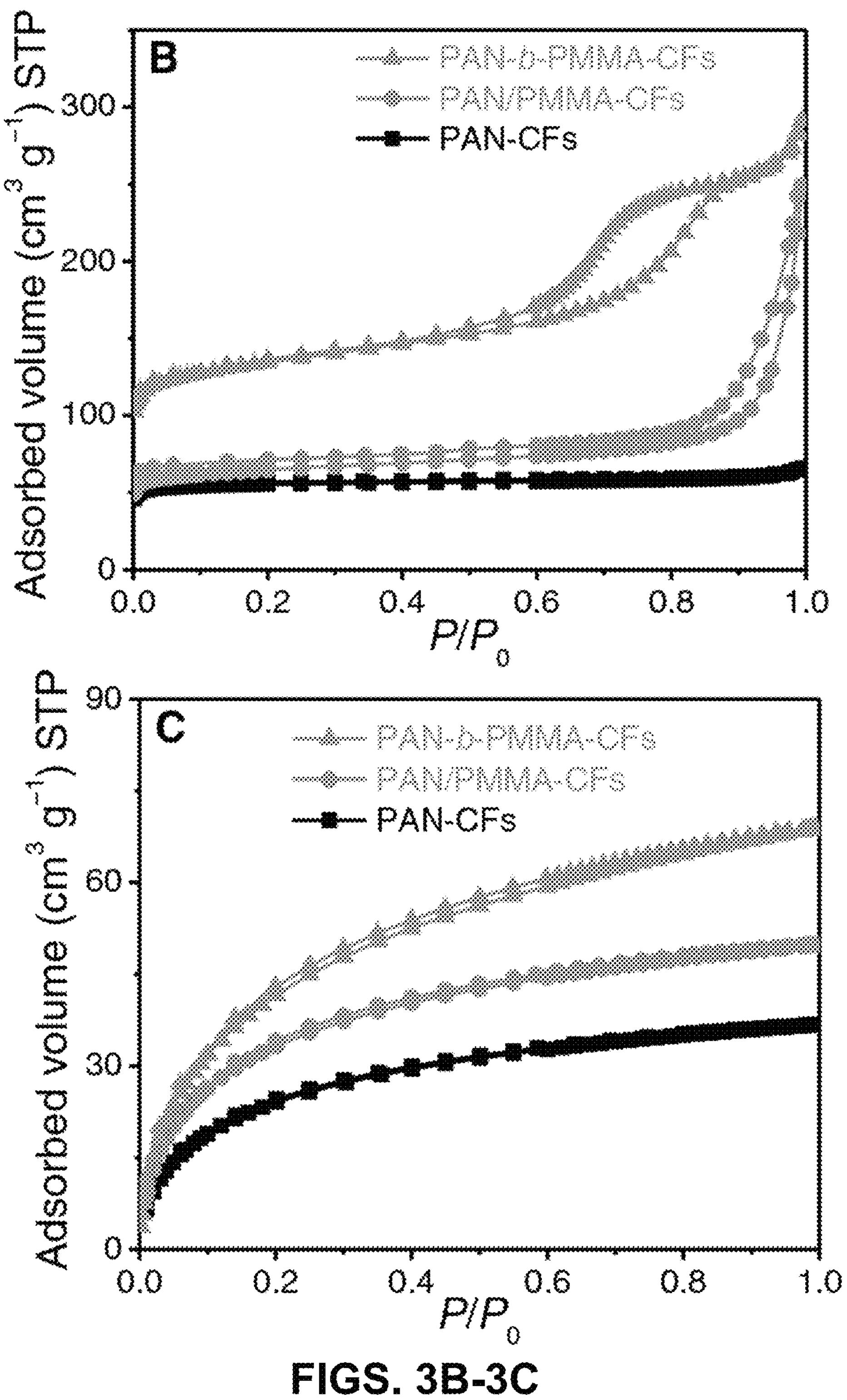
Figure 3D:
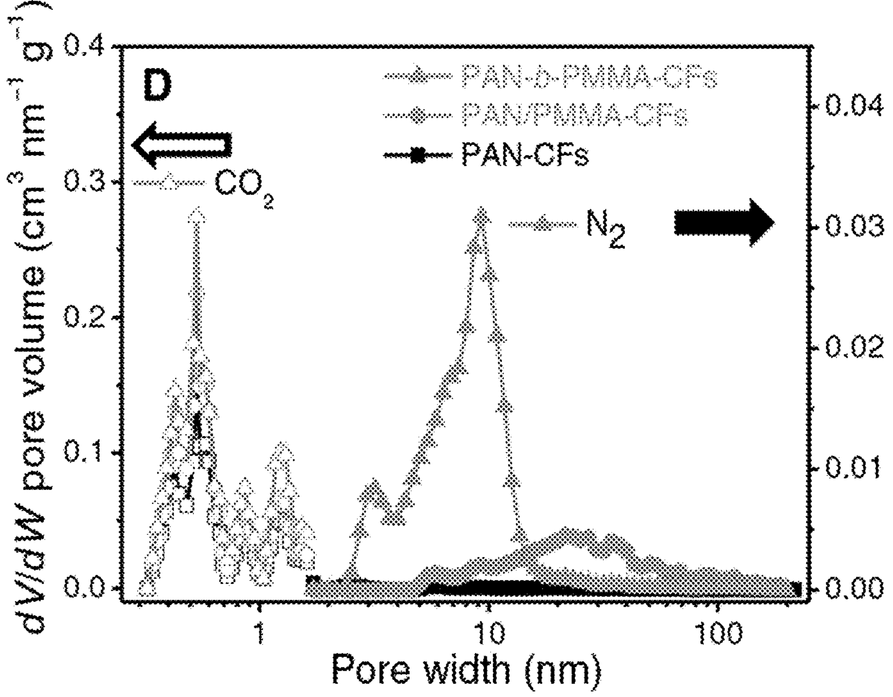
Figures 8C, 9A:
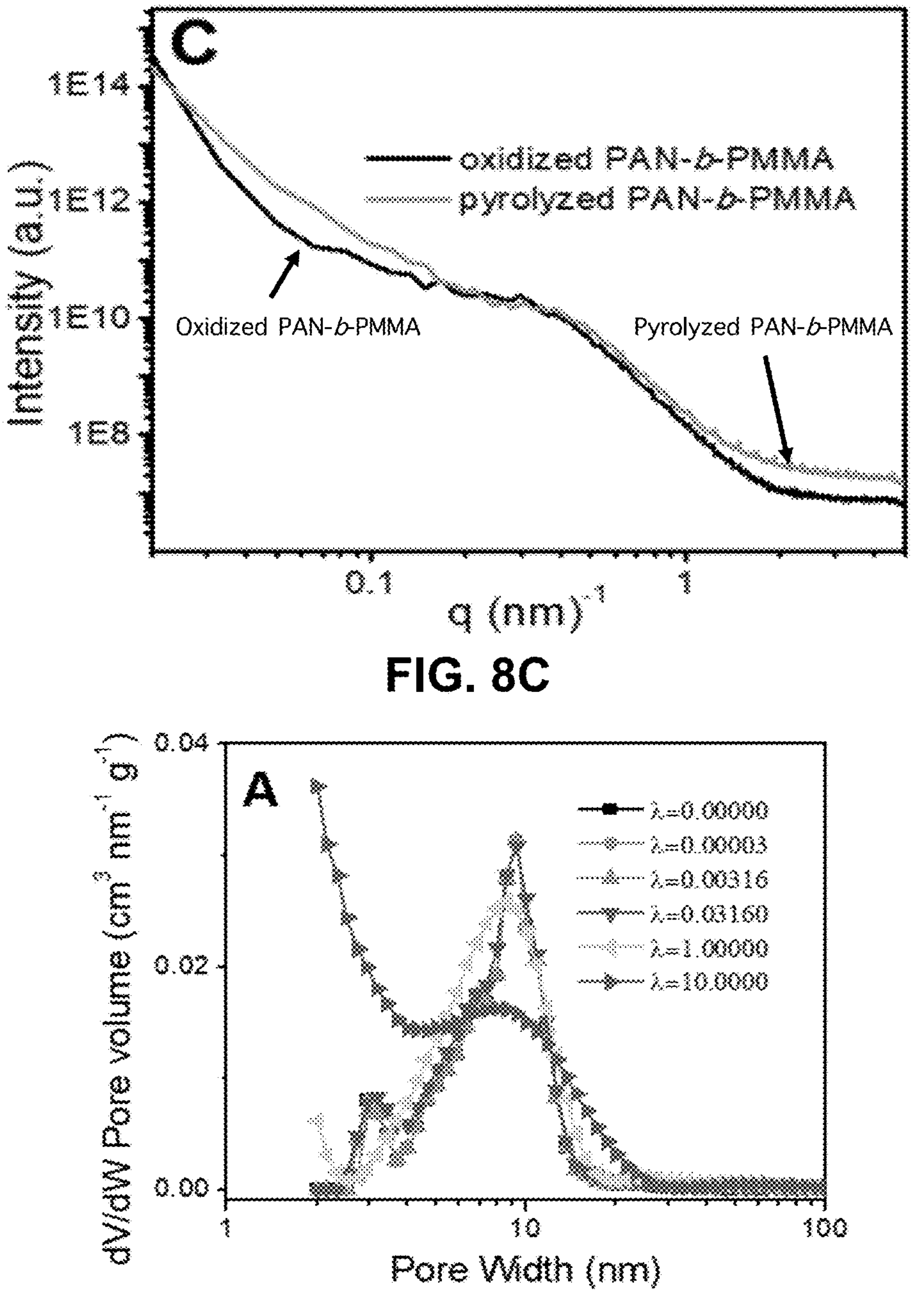
FIGS. 9A-9F show a comparison of the pore-size distributions (PSDs) from image analysis and NLDFT fitting.

Porosity Analysis by Gas Adsorption-Desorption Isotherms $N_2$ and $CO_2$ adsorption-desorption measurements of the PCFs (FIGS. 3B and 3C) revealed type IV and I isotherm characteristics, respectively. At relative $N_2$ pressures ($P/P_0$) of 0.6 to 0.9, the pronounced type H1 hysteresis of PAN-b-PMMA-CFs indicated the presence of mesopores according to the International Union of Pure and Applied Chemistry (IUPAC) classification (46). The pore size distribution was evaluated using a nonlocal density functional theory (NLDFT; FIG. 3D). PAN-b-PMMA-CFs had a BET surface area of 503 $m^2$ $g^{-1}$ (as calculated in the linear range of $P/P_0$=0.01 to 0.1, FIG. 3B) and a total pore volume of 0.45 $cm^3$ $g^{-1}$ (Table 2, BET section). Because of the block copolymer microphase separation, PAN-b-PMMA-CFs exhibited a considerable number of well-controlled mesopores with a narrow pore-size distribution centered at about 9.3 nm (FIG. 3D). FIG. 9A shows PSDs from the NLDFT model when the regularization parameter (λ) was varied from 0 to 10. The SEM image analysis revealed an average mesopore size of about 10.1 nm (FIGS. 9B-9E), in good agreement with the average pore size obtained from the NLDFT model. Notably, similar to the pore size distribution obtained from the NLDFT model, the image analysis also showed a shoulder peak at about 3 to 4 nm (FIG. 9E), validating the fact that the NLDFT model was suitable for pore size analysis of our PCFs. On the contrary, PAN/PMMA-CFs showed meso- and macropores with a much broader distribution (about 2-200 nm) and the PAN-CFs had no detectable mesopores. FIG. 9F shows a comparison of the PSDs of the PAN-b-PMMA-CFs using the NLDFT and BJH models. Thus, PAN-b-PMMA provided substantially better control over the mesopore size than PAN and PAN/PMMA did.

As described in the report by Kupgan et al., [*Langmuir* 33, 11138-11145 (2017)], PSDs can be calculated using the following equation:

$$N_{exp}(P/P_O) = \int_{D_{min}}^{D_{max}} N_{NLDFT}(P/P_O, D)PSD(D)dD + \lambda \int_{D_{min}}^{D_{max}} [PSD''(D)]^2 dD \quad (23)$$

where $N_{exp}$ is the experimental $N_2$ adsorption at 77 K; $P/P_0$ is the relative pressure ratio; D is the pore diameter; $N_{NLDFT}$ is the theoretical $N_2$ isotherm. The accuracy of the PSDs from the above NLDFT model depends on a regularization parameter, λ. Typically, higher λ values yield broader PSDs with less distinct peaks and thus lead to more artifacts. To evaluate the accuracy of NLDFT analysis and the effect of λ on the PSDs in our work, we have tuned λ from 0 to 10. As shown in FIG. 9A, the PSDs do not change drastically when λ is in the range of 0-0.0316. However, the PSDs become broader when λ is increased to 1 and above. Thus, the PSDs using a λ value of 0.0316 should represent a reasonably good approximation to the actual PSDs of the porous carbon fibers.

Figure 9B:
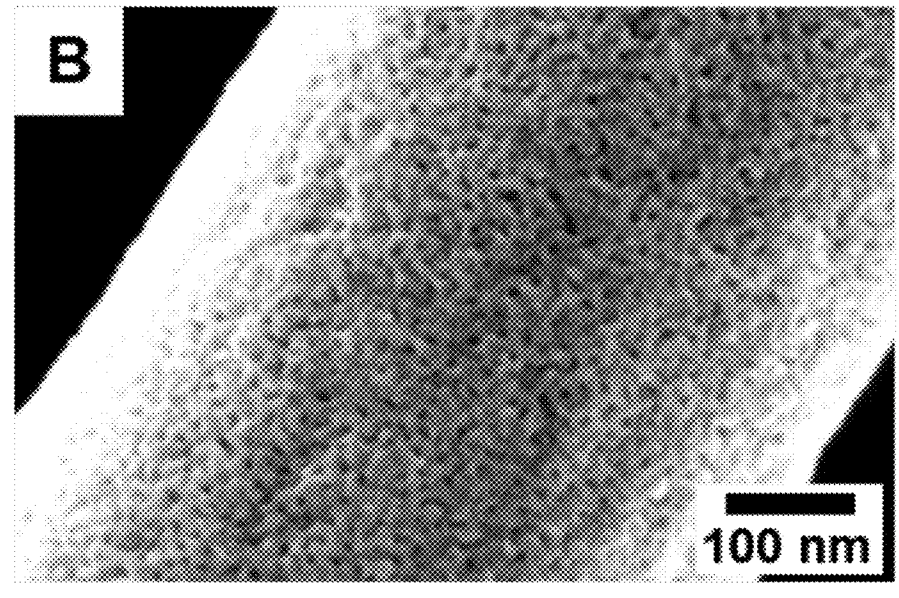
Figure 9C:
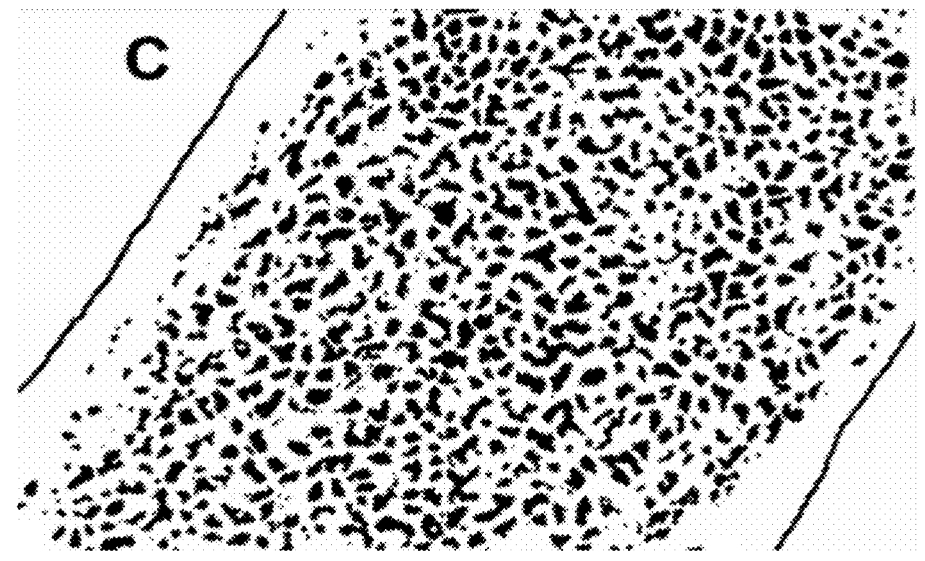
Figures 9D, 9E:
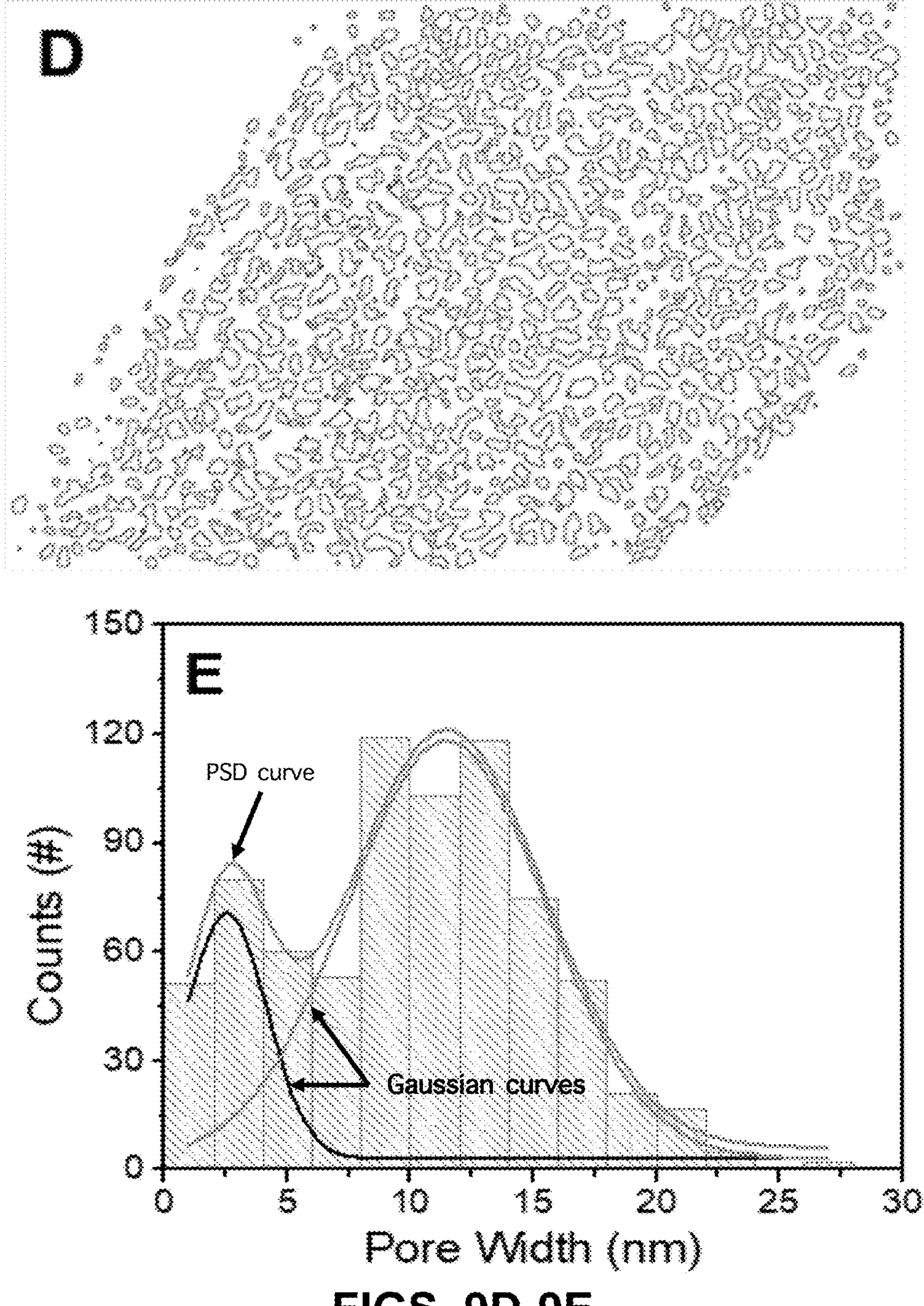
Figure 9F:
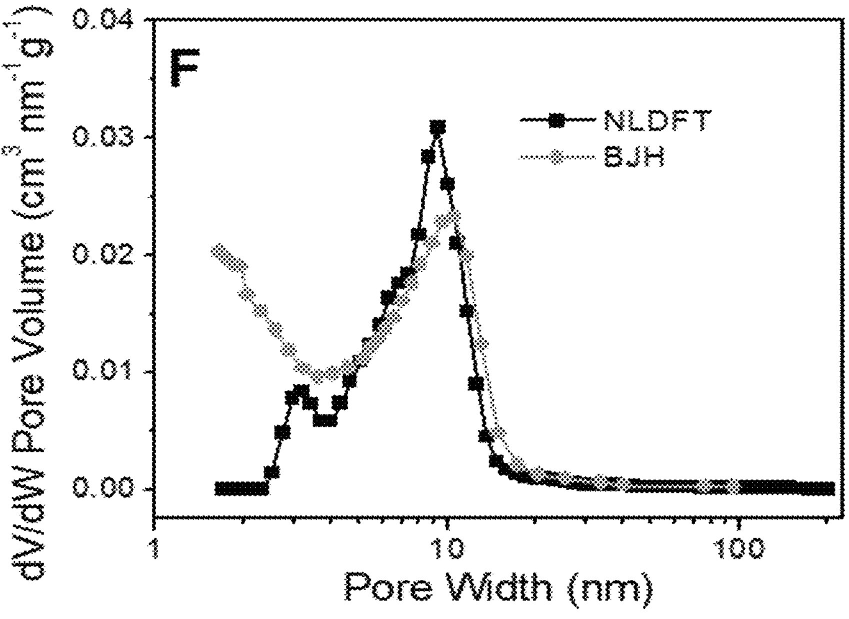

To conduct the image analysis, a representative SEM image (FIG. 9B) of a single PAN-b-PMMA-CF fiber is converted to a binary image in black-white mode (FIG. 9C). The black areas in Fig. S4C represent the pores. The boundaries of the pores are then identified and shown in FIG. 9D. Assuming that the pore openings are circles, the pore sizes (d) can be calculated from the pore areas (S) according to the following equation:

$$d = 2\sqrt{S/\pi} \quad (24)$$

The Barrett-Joyner-Halenda (BJH) model is also commonly used for fitting mesoporous structures, and thus it is used to analyze the porous structures of our PAN-b-PMMA-CFs. As shown in FIG. 9F, the PSD curve of PAN-b-PMMA-CFs obtained from the BJH model is similar to that from the NLDFT model in the pore size range >4 nm. The two fitted PSDs differ in the pore size range <4 nm. The shoulder peak at about 3-4 nm is absent in the PSD from the BJH model. Because the PSD from the NLDFT model matches with that from the image analysis, we have chosen NLDFT as the final model for pore size determination.

Furthermore, the uniform mesopores in PAN-b-PMMA-CFs offered numerous channels to interconnect with the micropores (peaked at 0.5 nm), leading to a 100% increase in the micropore volume (Table 2, BET section). As a result, PAN-b-PMMA-CFs had a specific surface area of 503 $m^2$ $g^{-1}$, more than twice the surface areas of PAN-CFs (213 $m^2$ $g^{-1}$) and PAN/PMMA-CFs (245 $m^2$ $g^{-1}$). Taking together the SEM, SAXS and BET results, can at least demonstrate that PAN-b-PMMA-CFs are equipped with a hierarchical porous structure, a feature that is indispensable to facilitate ion diffusion and to achieve high-rate capability in supercapacitors and other applications.

Electrochemical Performances and Ion Transport Dynamics

Figure 4A:
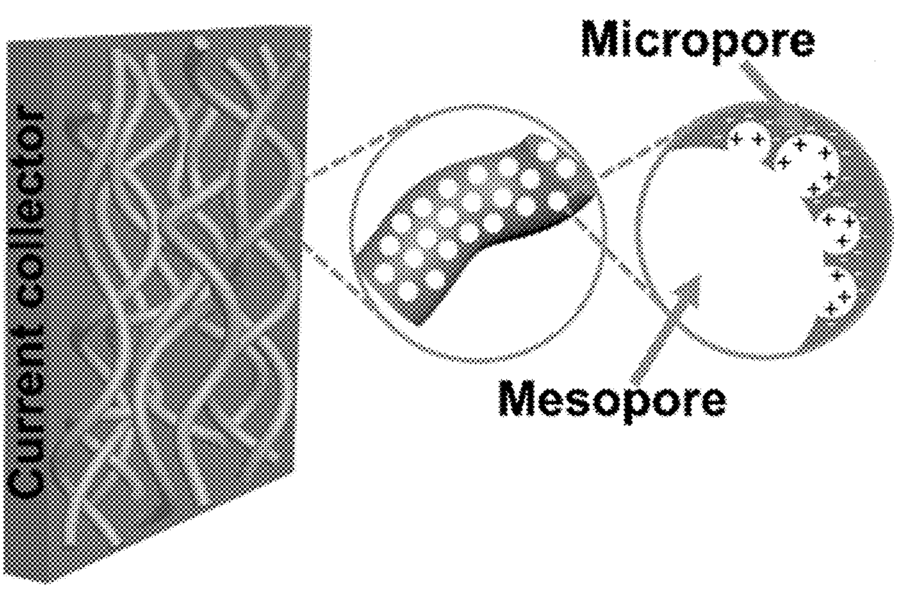
FIGS. 4A-4F can demonstrate electrochemical performance of the carbon fibers and PCFs.
Figures 4B, 4C:
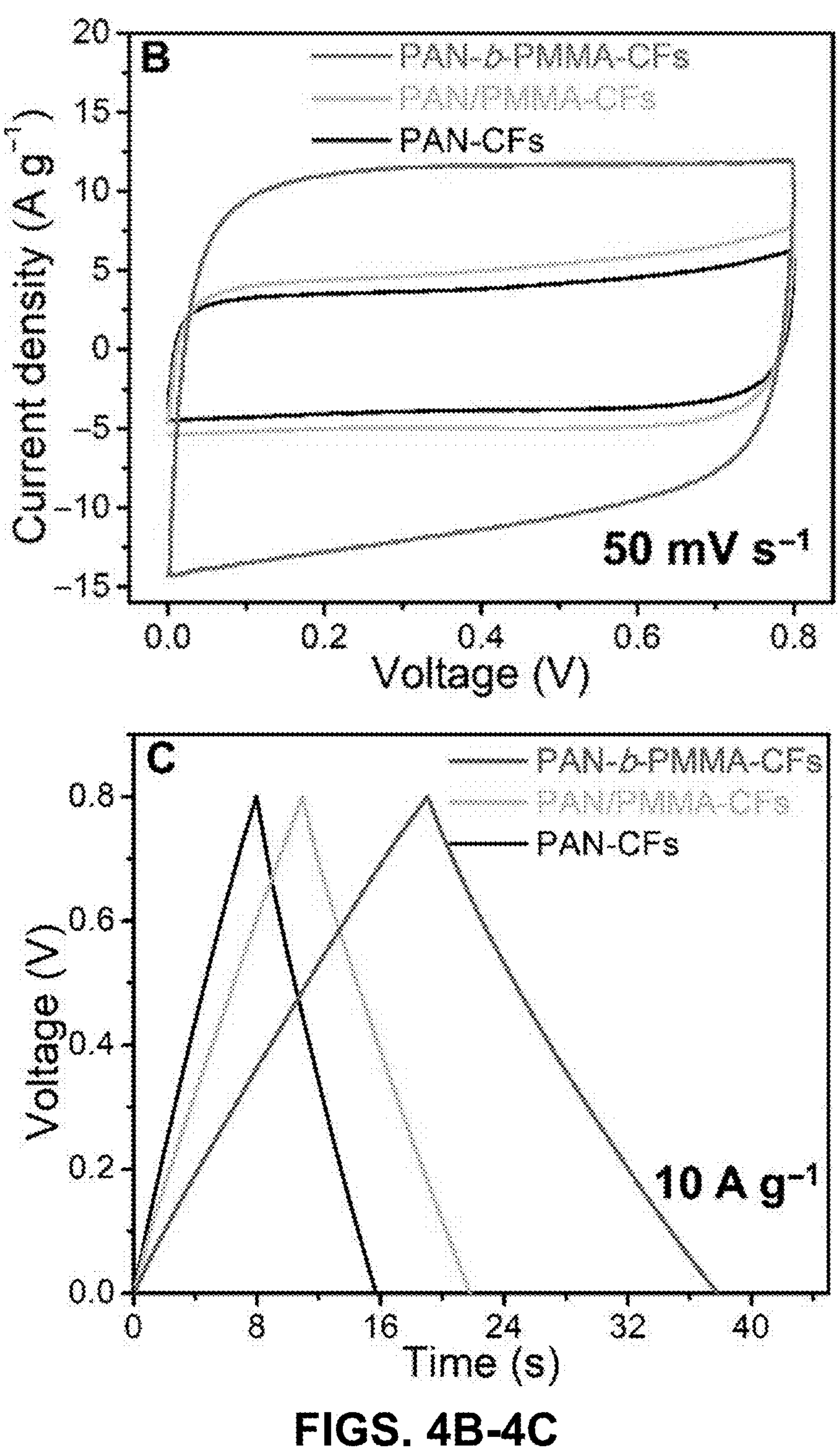
Figure 10A:
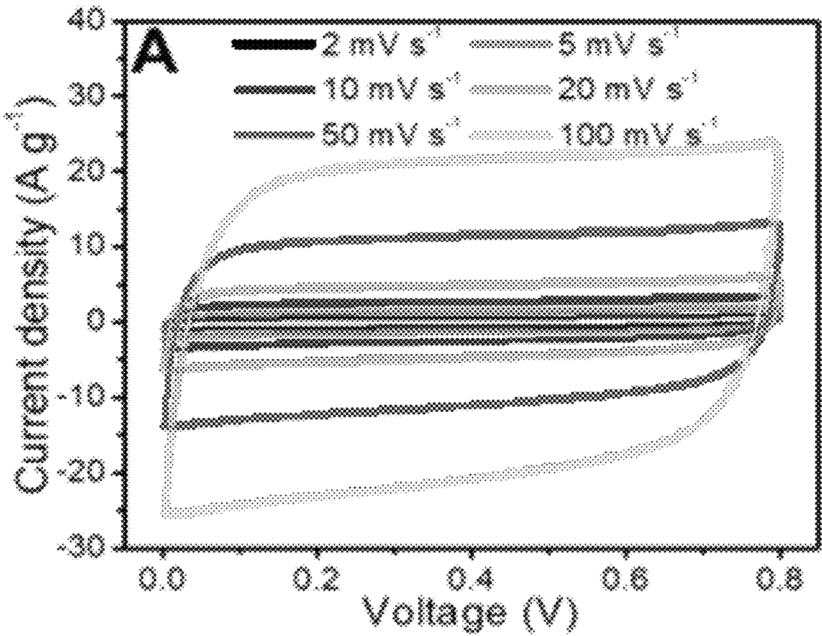
FIGS. 10A-10F show graphs and schematic that can demonstrate the capacitive performance of the PCFs.
Figure 10B:
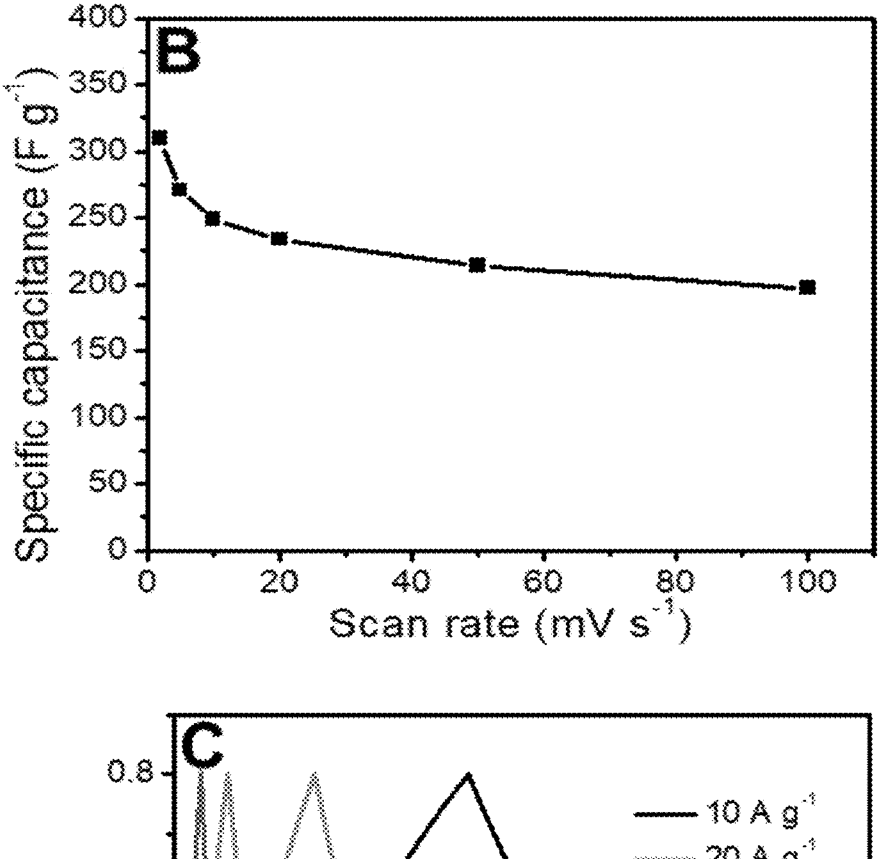
Figure 10C:
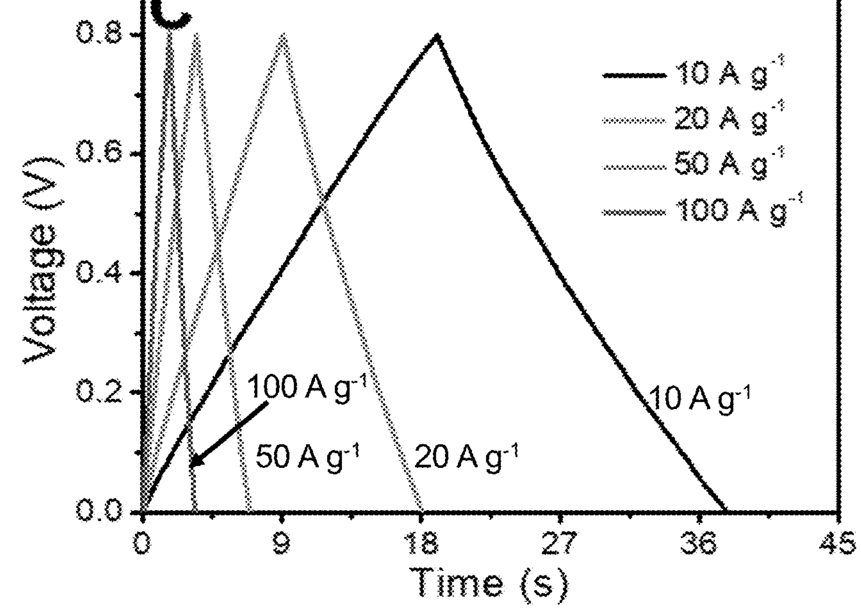

The interconnected meso- and micropores in PAN-b-PMMA-CFs can provide efficient pathways for rapid ion diffusion and enable outstanding capacitive performance (FIG. 4A). To test the capacitive performance, two-electrode symmetric supercapacitor cells were assembled. The electrodes were fabricated by sandwiching carbon fibers between two pieces of Ni foam without any conductive additives or polymer binders. PAN-b-PMMA-CFs exhibited nearly rectangular cyclic voltammograms with no discernible redox peaks, even at a high scan rate of 100 mV $s^{-1}$, suggesting a near-ideal capacitive behaviour (FIGS. 4B and 10A). In comparison with PAN/PMMA-CFs and PAN-CFs, PAN-b-PMMA-CFs had the largest area enclosed by the cyclic voltammetry (CV) and thus the highest capacitance at a scan rate of 50 mV $s^{-1}$ (FIG. 4B). Gravimetric capacitances were calculated based on chronopotentiometry (CP) (FIGS. 4C and 10C) and CV (FIG. 10B). At 1 A $g^{-1}$, the highest gravimetric capacitance of PAN-b-PMMA-CFs was 360 F $g^{-1}$ and the average value over eight devices was 334±17 F $g^{-1}$. At a high current density of 10 A $g^{-1}$, the gravimetric capacitance of PAN-b-PMMA-CFs reached 226±6 F $g^{-1}$ (FIG. 4D), twice those of PAN/PMMA-CFs (111±19 F $g^{-1}$) and PAN-CFs (90±9 F $g^{-1}$). At an extremely high current density of 100 A $g^{-1}$, the capacitance was 202±10 F $g^{-1}$ and retained >60% of the value at 1 A $g^{-1}$.

To further demonstrate the excellent electrochemical performances of the PCFs, three-electrode cells in 6 M KOH aqueous solution were assembled and tested. The electrochemical performance (FIGS. 10E and 10F) corroborated that in a two-electrode testing configuration. When the current density was increased from 10 to 100 A $g^{-1}$, the gravimetric capacitance of PAN-b-PMMA-CFs only dropped by 11%. The outstanding rate capability confirmed that the interconnected meso- and micropores in PAN-b-PMMA-CFs provided efficient pathways for rapid electrolyte infiltration and ion diffusion.

For accuracy, constant phase elements (CPE) instead of ideal capacitors are used in the equivalent circuit model [*Electrochim. Acta* 115, 587-598 (2014)]. The ions diffuse from the bulk electrolyte to both the carbon surface (double-layer capacitance, CPE1) and the heteroatoms (pseudocapacitance, CPE2). Thus, the Warburg impedance ($W_0$, the ion diffusion resistance) and the equivalent series resistance ($R_s$, the combination of the electrolyte resistance, the internal electrode resistance, and the interface resistance between the electrodes and the current collectors) are placed in series with the two capacitors, CPE1 and CPE2. Note that CPE1 is parallel to CPE2 because of their independent charge storage processes. For the pseudocapacitance CPE2, the redox electrochemical reaction is controlled by the kinetics of the charge transfer at the electrode-electrolyte interface, in other words, how fast the charges are transferred from the electrolyte to the electrode surface. Therefore, a charge transfer resistance ($R_{ct}$) is connected in series with CPE2 to describe the charge storage process associated with the heteroatoms.

Discussion

Figures 4D, 4E:
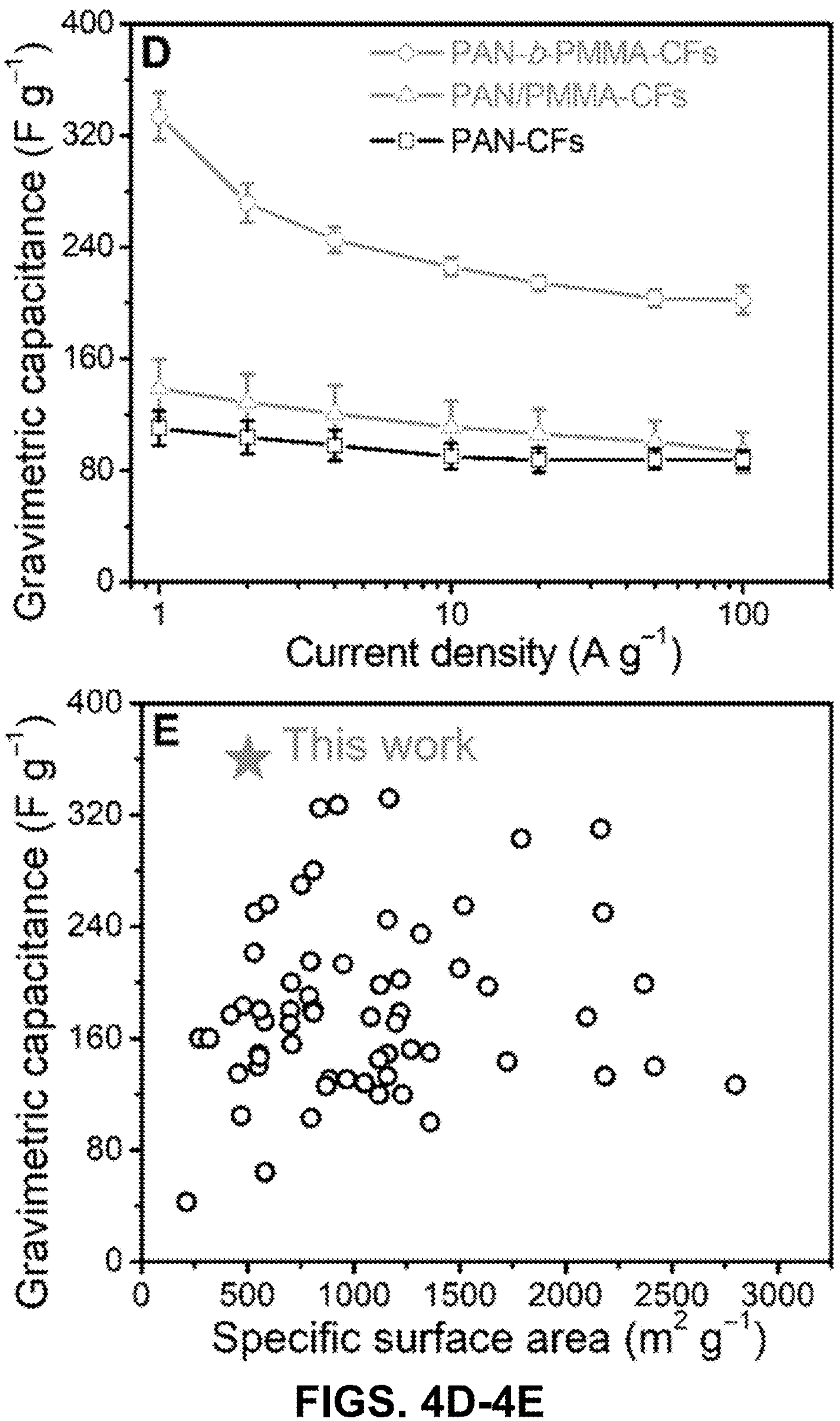

PAN-b-PMMA-CFs exhibited an outstanding gravimetric capacitance of 360 F $g^{-1}$ at a high current density of 1 A $g^{-1}$ (FIG. 4E). This value is higher than those of the previously reported carbon fibers (Table 1), as well as those of the previously reported nonfibrous porous carbons from PAN-containing block copolymers. For example, Zhong et al. (35) reported nanoporous nitrogen-enriched carbon derived from poly(acrylonitrile-b-butyl acrylate) with a gravimetric capacitance of about 166 F $g^{-1}$ at 0.1 A $g^{-1}$. Yan et al. (34) reported block copolymer-derived mesoporous carbon particles (in a nonfibrous format) as supercapacitor electrode materials with 254 F $g^{-1}$ at 0.5 A $g^{-1}$. Our PCFs displayed 33% better capacitive performance than KOH-activated carbon fibers, e.g., the N and O dual-doped, KOH-activated PCFs reported by Li et al. (47) with a capacitance of −270 F $g^{-1}$ at 1 A $g^{-1}$. The block copolymer-based PCFs described in at least this Example were not subjected to any chemical activation or postsynthesis treatments. The enhanced capacitance of PAN-b-PMMA-CFs is mainly attributed to the fiber network and the well-defined hierarchical micro- and mesoporous structures. Without any binders, the pores provide continuous diffusion pathways for the ions, and the carbon matrix offers conduction pathways for the electrons (FIG. 4A).

Figures 4F, 5A:
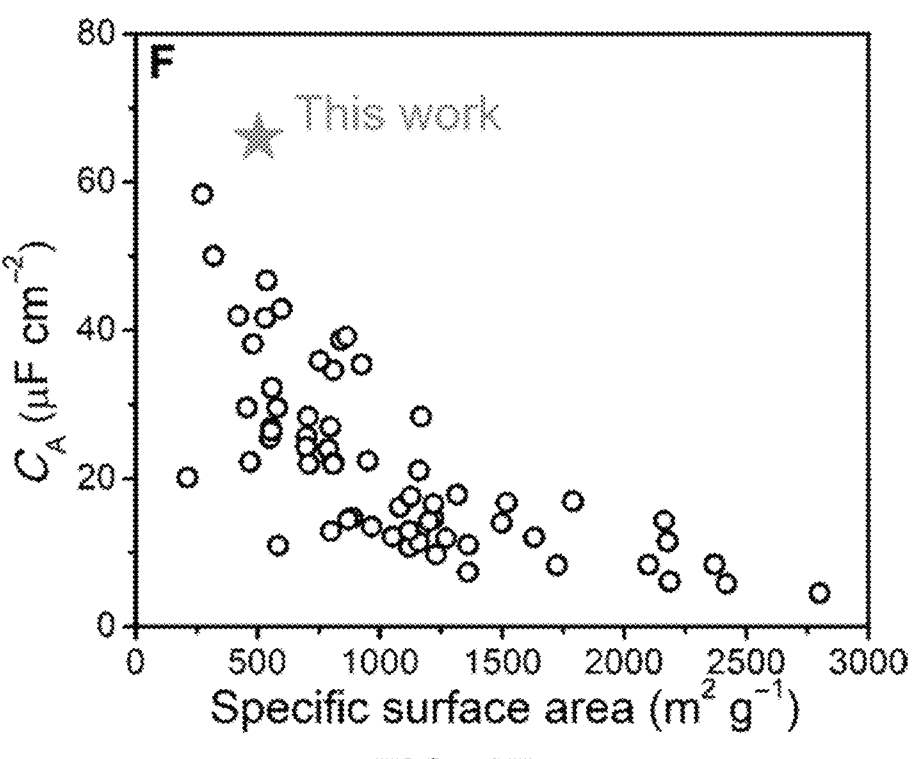
FIGS. 5A-5D can demonstrate electrochemical properties of the carbon fibers.

BET surface area-normalized capacitance ($C_A$) of PAN-b-PMMA-CFs is as high as 66±3 μF $cm^{-2}$, higher than the previously reported PCFs and most porous carbons (FIG. 4F and Table 1). The $C_A$ of PAN-b-PMMA-CFs observed was much higher than the typical value for electrical double layer capacitance (5 to 20 μF $cm^{-2}$) and 6.6 times that of activated carbon (10 μF $cm^{-2}$) (48). The high capacitance stems from the pseudocapacitive reactions brought by the highly accessible heteroatoms (e.g., O and N). Two capacitance differentiation methods (Trasatti and Dunn's methods, FIGS. 11A-11D) reveal that about 37% of the total capacitance is from pseudocapacitance (FIG. 5A).

Trasatti's Method

The CV curves and the corresponding gravimetric capacitances (C) of PAN-b-PMMA-CFs were analyzed at scan rates ranging from 2 to 100 mV $s^{-1}$. The reciprocal of gravimetric capacitances ($C^{-1}$) should scale linearly with the square root of scan rates ($\nu^{0.5}$), assuming ion diffusion follows a semi-infinite diffusion pattern (FIG. 11A) [*J. Am. Chem. Soc.* 134, 14846-14857 (2012)]. Specifically, the correlation can be described by the following equation:

$$C^{-1} = 0.0068\nu^{0.5} + C_T^{-1} \quad (25)$$

where $C_T$ is total capacitance. Data points at higher scan rates deviate from the relationship due to the intrinsic resistance of the electrode and the deviation from semi-infinite ion diffusion [*ACS Nano* 7, 1200-1214 (2013)]. These deviated data points were masked during the linear fitting. $C_T$ equals the sum of electrical double-layer capacitance and pseudocapacitance [*J. Power Sources* 227, 300-308 (2013)].

Similarly, assuming a semi-infinite ion diffusion, the capacitance C follows a linear relationship with the reciprocal of the square root of scan rates ($\nu^{-0.5}$) (Fig. S6B), as described by the following equation [*Electrochim. Acta* 35, 263-267 (1990)], $$C = 4.852\nu^{-0.5} + C_{EDL} \quad (26)$$

where $C_{EDL}$ is the electrical double-layer capacitance. A linear fitting to the plot and extrapolation of the fitted line to the y-axis gives the maximum $C_{EDL}$ [*J. Power Sources* 227, 300-308 (2013)]. Subtraction of $C_{EDL}$ from $C_T$ yields the maximum pseudocapacitance. The histogram shows the percentages of $C_{EDL}$ (63.5%) and pseudocapacitance (36.5%) (FIG. 11C), respectively.

Dunn's Method

Dunn's method enables one to differentiate quantitatively the capacitance contributions from the surface capacitive effects (i.e., EDL capacitive effects) and the diffusion-controlled processes (i.e., pseudocapacitive reactions) [*J. Phys. Chem. C* 111, 14925-14931 (2007)]. At a fixed potential, the current density (I) from the CVs can be expressed as a combination of two terms, i.e., $$i = k_1\nu + k_2\nu^{0.5} \quad (27)$$

where the first term $k_1\nu$ accounts for the current density contributed from the EDL capacitive effects while the second term $k_2\nu^{0.5}$ is the current density associated with the pseudocapacitive reactions. Dividing $\nu^{0.5}$ on both sides of the equation yields:

$$i\nu^{-0.5} = k_1\nu^{0.5} + k_2 \quad (28)$$

Therefore, by reading i from the CVs at a series of scan rates and then plotting $i\nu^{-0.5}$ vs. $\nu^{0.5}$, one expects to obtain a linear fitting line with a slope of $k_1$ and a y-intercept of $k_2$.

Fig. S6D displays an example of an $iv^{-0.5}$ vs. $v^{0.5}$ plot collected for PAN-b-PMMA-CFs using the anodic current at a potential of −0.1 V. Using the $k_1$ and $k_2$ values in Eq. (28) allows one to differentiate the capacitance contribution from $C_{EDL}$ and pseudocapacitance at the specific potential V and a selected scan rate, ν.

Figure 5B:
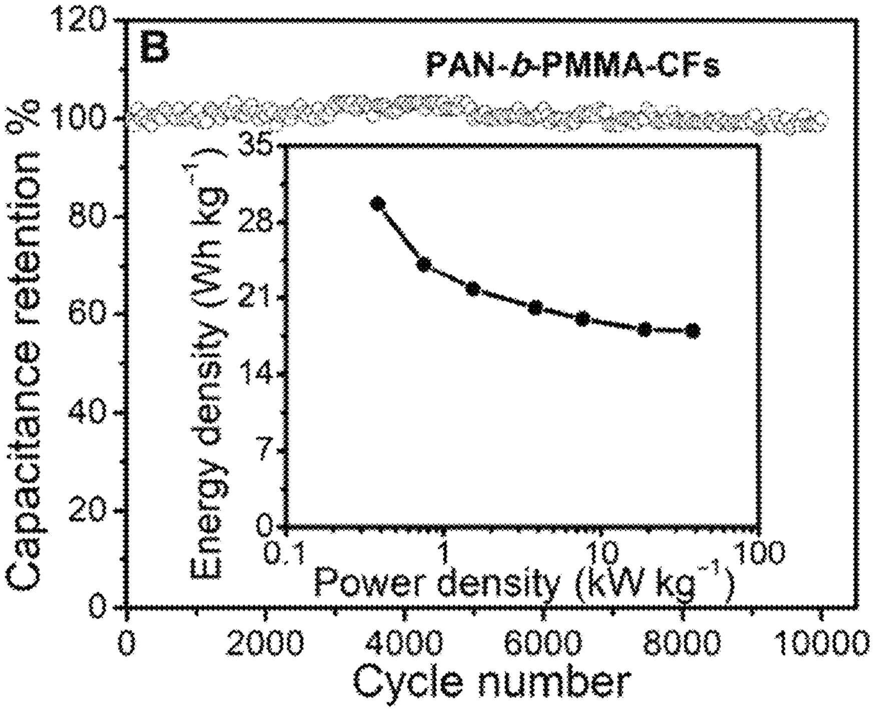

The PCFs display excellent long cycle life, as evaluated by the voltage holding tests (FIGS. 12A-12D and the constant-current charge-discharge cycling test for 10,000 cycles (FIG. 5B). The PCF-based supercapacitors exhibit a power density of 9.6 kW $kg^{-1}$ at an energy density of 4.5 Wh $kg^{-1}$ (FIG. 5B, inset), notably higher than that of the commercially available supercapacitors (typically 1 to 2 kW $kg^{-1}$ at a similar energy density of 5 Wh $kg^{-1}$) (49).

Figure 5C:
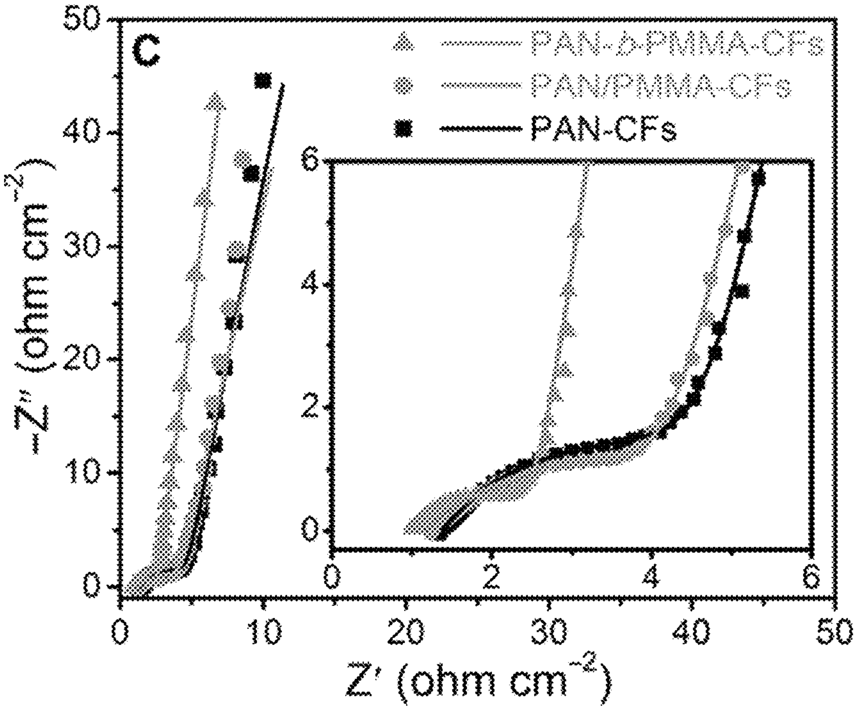
Figure 5D:
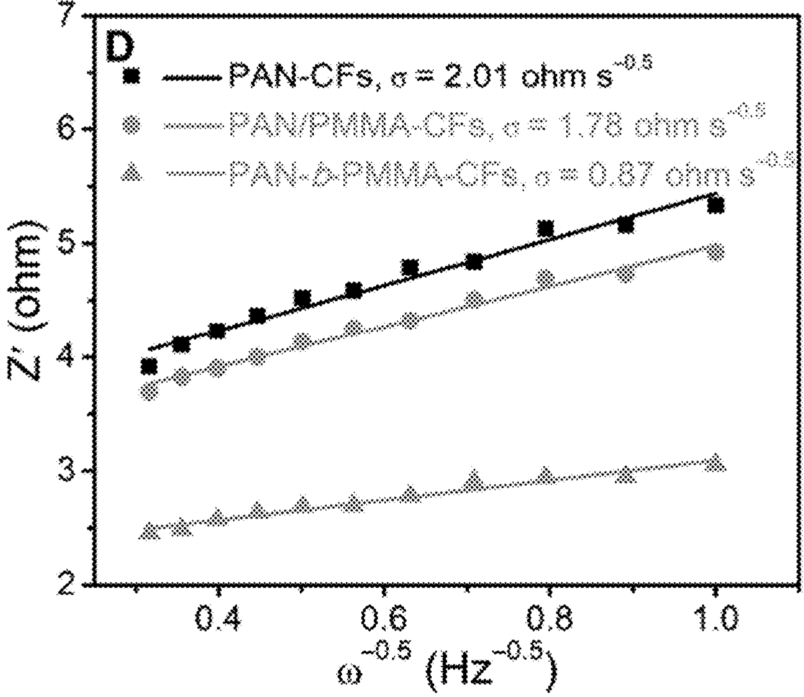
Figure 10D:
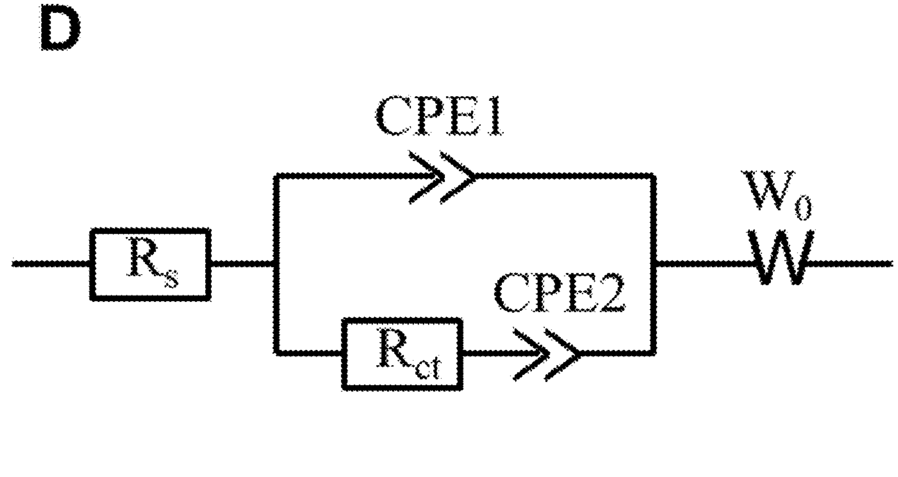
Figure 10E:
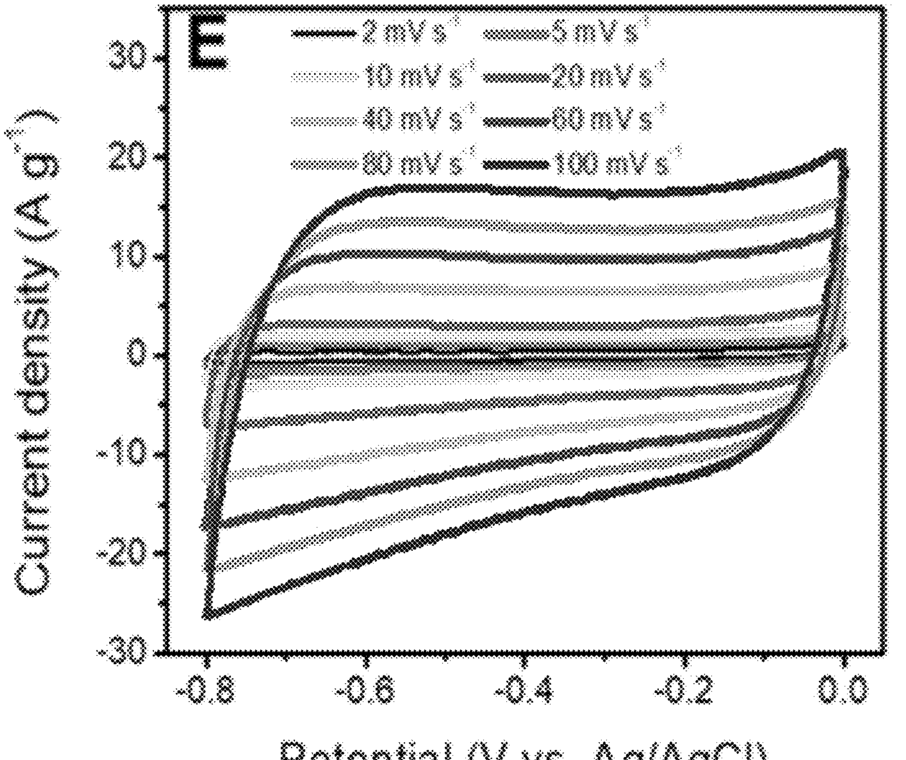
Figure 10F:
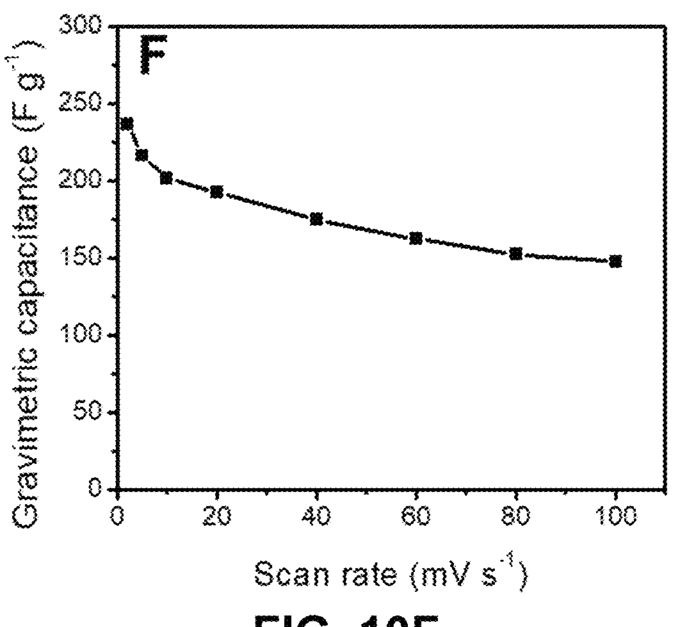
Figures 11A, 11B:
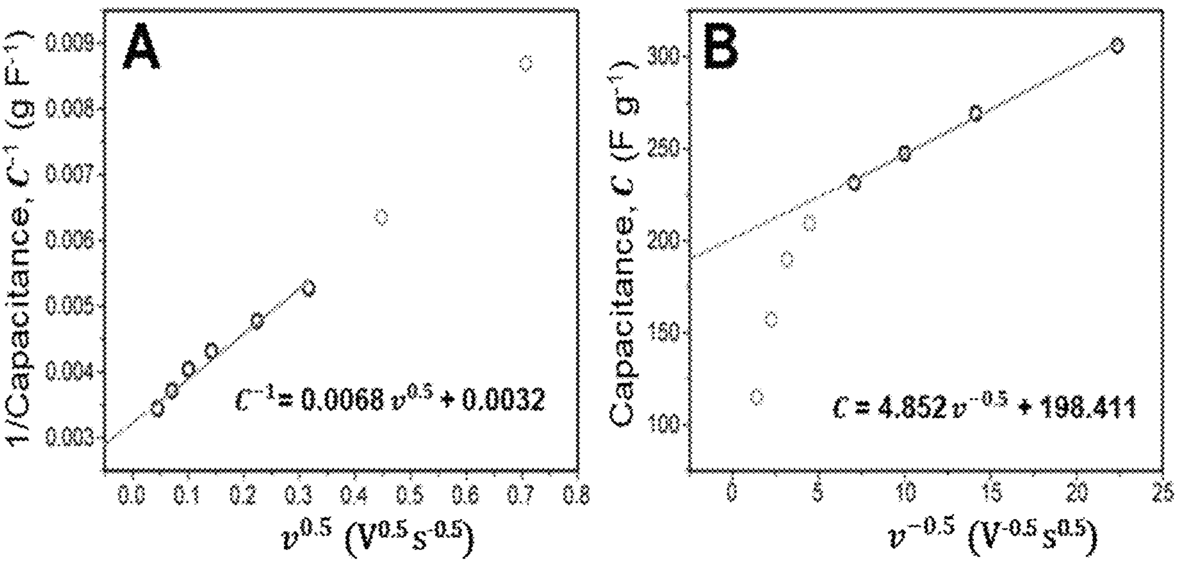
FIGS. 11A-11D show graphs that can demonstrate various capacitance characteristics of the PCFs. Capacitance contribution analysis of PAN-b-PMMA-CFs.
Figure 11C:
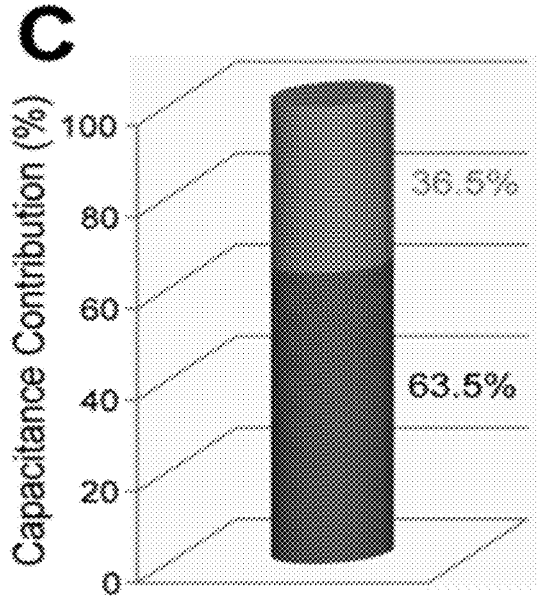
Figure 11D:
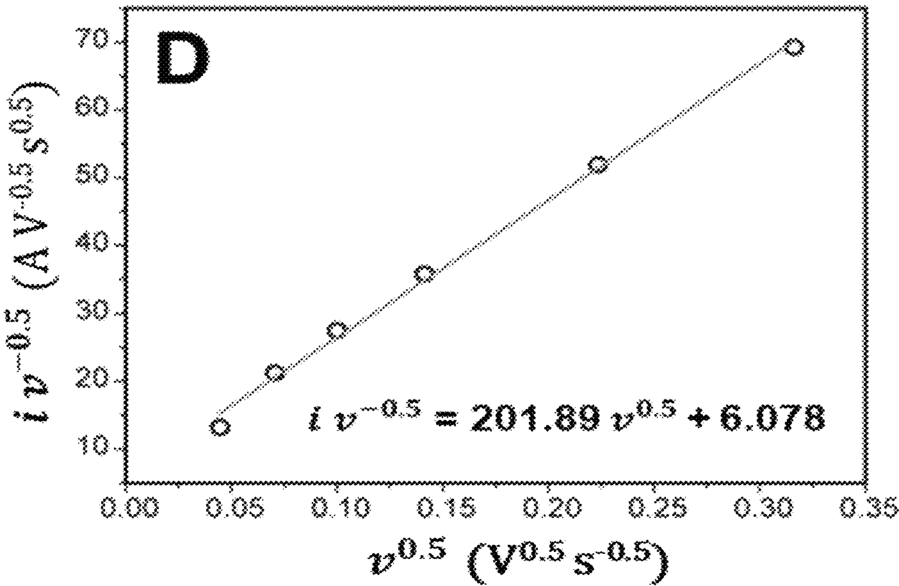
Figures 12A, 12B, 12C, 12D:
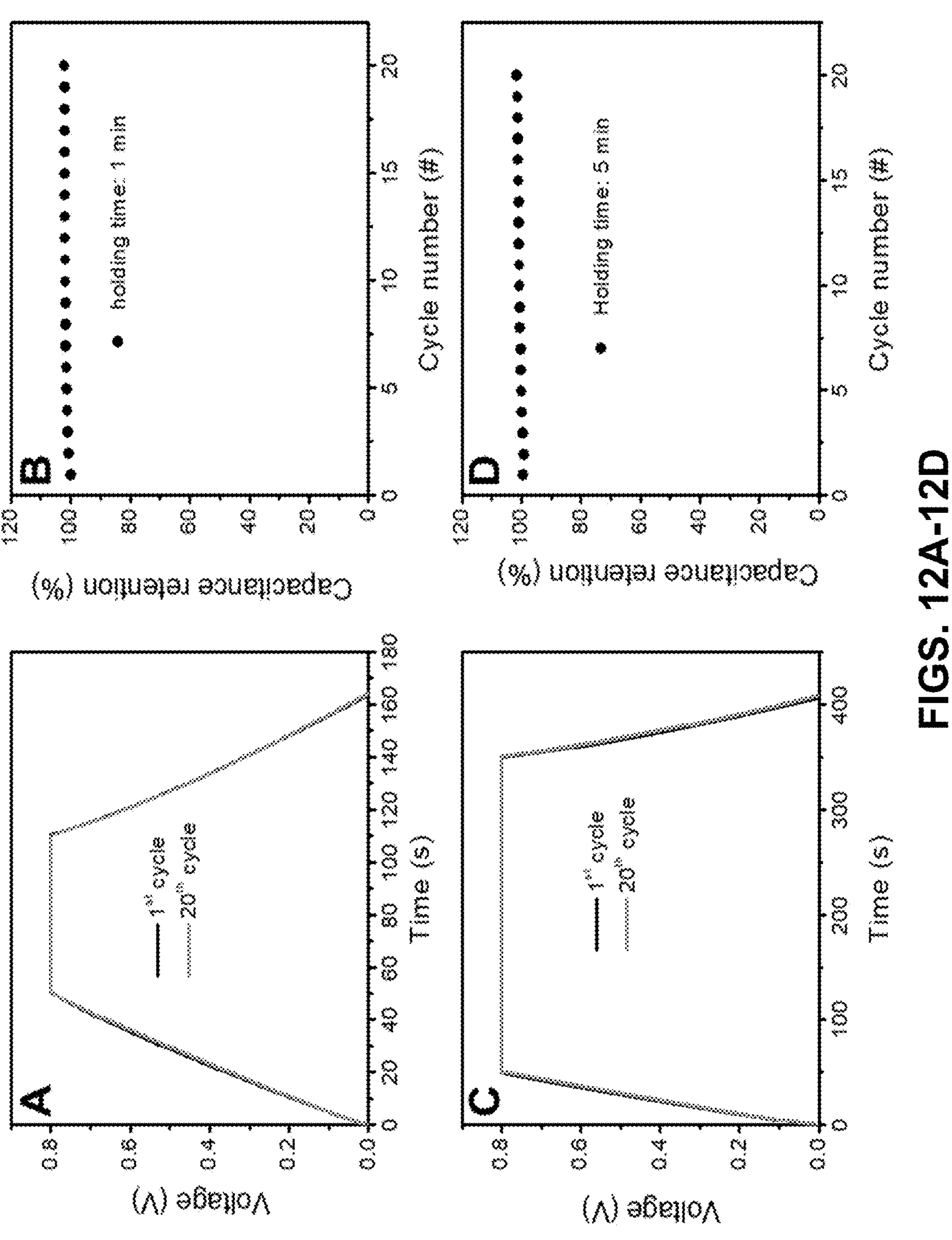
FIGS. 12A-12D show graphs that can demonstrate performance characteristics of a PAN-b-PMMA PCF supercapacitor.
Figures 13A, 13B, 13C:
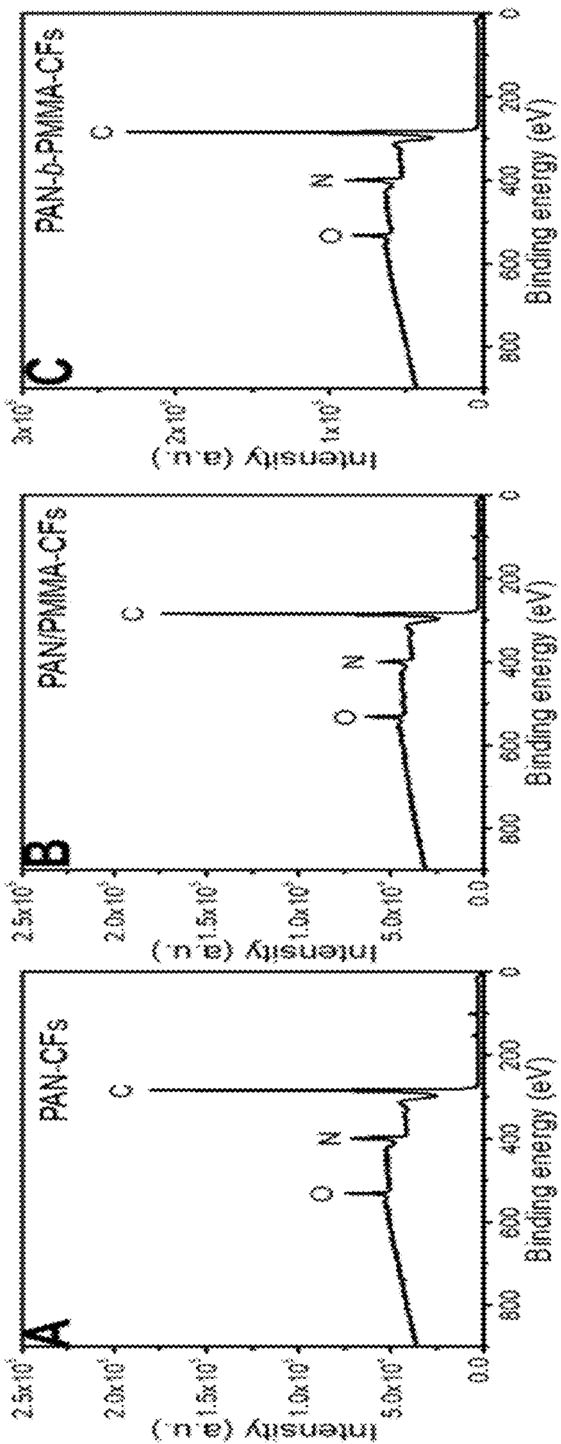
Figures 13D, 13E, 13F:
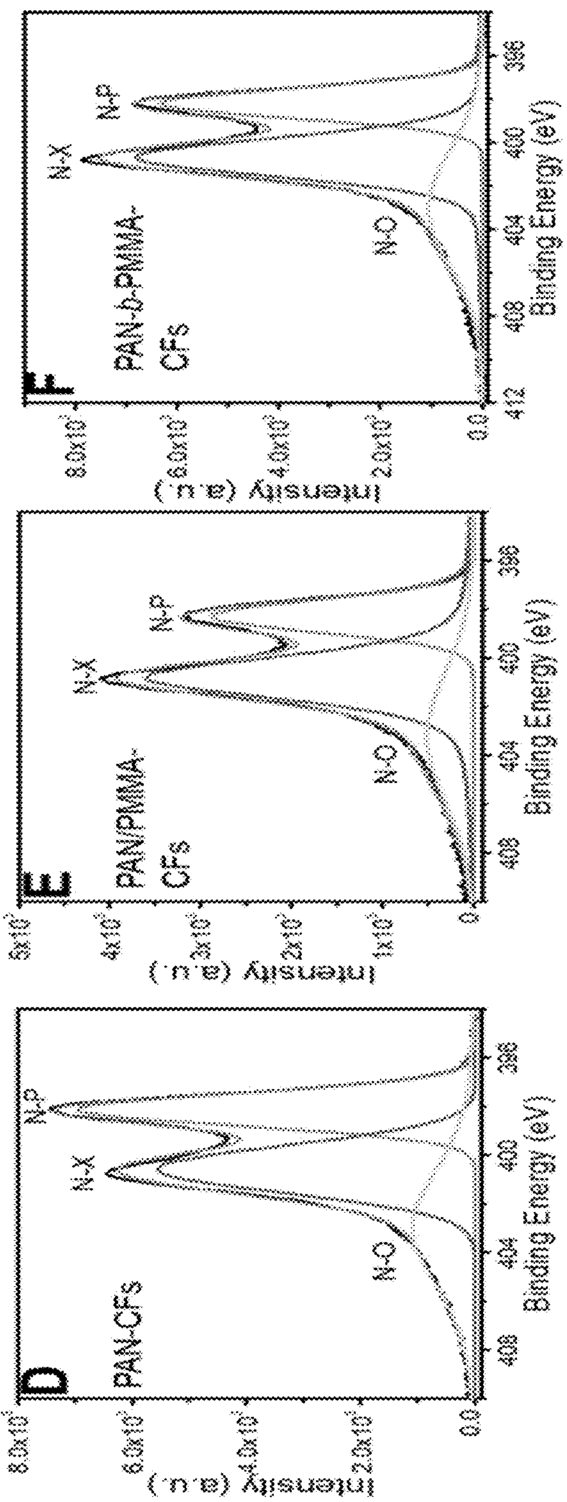
Figures 13G, 13H, 13I:
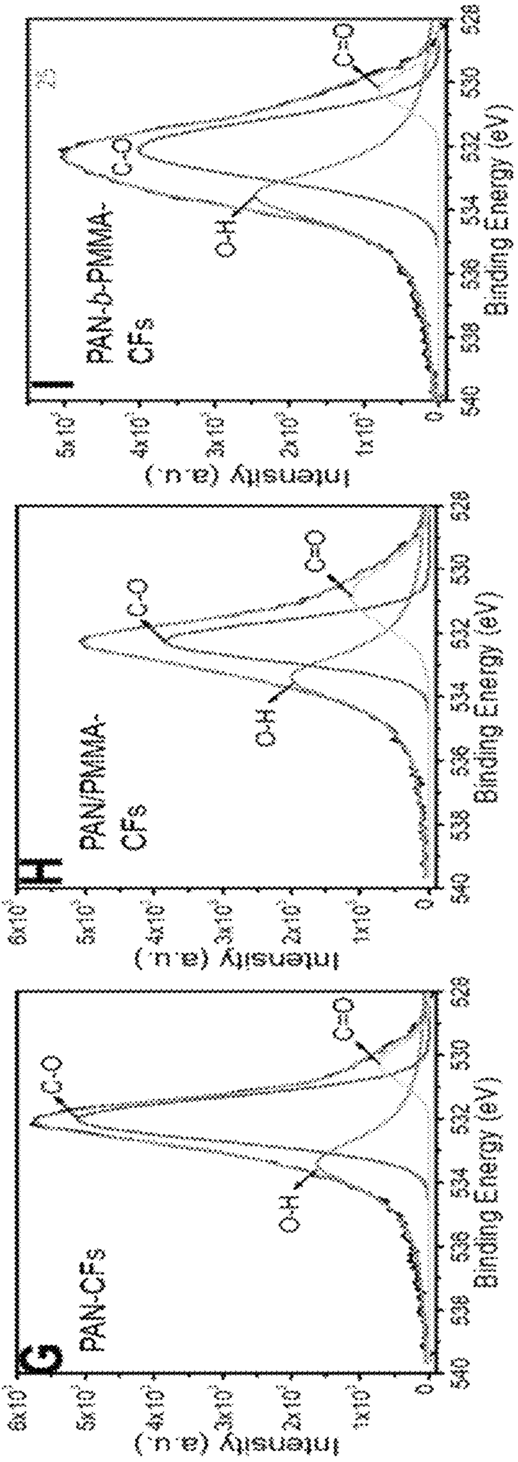

Electrochemical impedance spectroscopy (EIS) reveals the ion and charge transport dynamics. In each Nyquist plot (FIG. 5C, fitted to an equivalent circuit model in FIG. 10D), an incomplete semicircle in the high frequency region is followed by a 45°-inclined Warburg diffusion line and a steep straight line in the low frequency region. The equivalent circuit model (50) successfully describes the resistive features and the capacitive behavior of the PCF electrodes of this Example (FIG. 10D). As shown in FIG. 5C, all carbon fibers exhibit nearly vertical low-frequency lines, indicating nearly ideal capacitive behavior (51). Among the three electrodes studied herein, PAN-b-PMMA-CFs exhibit the steepest linear line in the low-frequency range. This feature is correlated to the ion diffusion resistance, highlighting the merit of the hierarchical porous structures in PAN-b-PMMA-CFs and indicating that the ion diffusion in PAN-b-PMMA-CFs is the most efficient. To quantify the ion diffusion resistance, the Warburg coefficient σ (ohm $s^{-0.5}$) can be extracted by fitting the real part of impedance (Z) versus the −½ power of the angular frequency ($\omega^{0.5}$) in the frequency range of 1 to 10 Hz (FIG. 5D). The slope of the fitted line equals the Warburg coefficient (σ), a parameter measuring the diffusion resistance when the ions diffuse through the electrodes (52). PAN-b-PMMA-CFs display a small σ value of 0.87 ohm $s^{-0.5}$. In contrast, both PAN-CFs and PAN/PMMA-CFs exhibit high σ values of 2.01 and 1.78 ohm $s^{-0.5}$, respectively (Table 2, electrical properties section). Table 2 shows a summary of the physical and chemical properties of PAN-CFs, PAN/PMMA-CFs and PAN-b-PMMA CFs. The high-frequency Z' intercept and the incomplete semicircle are associated with equivalent series resistance ($R_s$) and charge transfer resistance ($R_{ct}$), respectively (FIG. 5C, inset) (50). PAN-b-PMMA-CFs exhibit an intercept and a semicircle smaller than those of PAN-CFs and PAN/PMMA-CFs, indicating lower $R_s$ and $R_{ct}$. These results can demonstrate that the uniformly distributed mesopores are advantageous for ion diffusion and hence PAN-b-PMMA-CFs display high capacitances and excellent rate capabilities.

TABLE 2

| | Characterizations | | PAN-CFs | PAN/PMMA-CFs | PAN-b-PMMA-CFs |
|---|---|---|---|---|---|
| XRD | 2θ (002) | | 23.8° | 23.8° | 24.0° |
| | 2θ (10l) | | 43.5° | 42.8° | 43.5° |
| | β (002) (radian) | | 0.16 | 0.15 | 0.14 |
| | β (10l) (radian) | | 0.21 | 0.11 | 0.11 |
| | $d_{002}$ (nm) | | 0.37 | 0.37 | 0.37 |
| | lateral size, $L_a$ (nm) | | 1.42 | 2.81 | 2.73 |
| | crystallite size, $L_c$ (nm) | | 0.86 | 0.92 | 0.98 |
| SAXS | Index of the Porod's Law (x) | | −3.37 | −3.34 | −3.43 |
| | q ($nm^{-1}$) | | NA | NA | 0.224 |
| | Center-to-center spacing (nm) | | NA | NA | 28.5 |
| Raman | D band center (nm) | | 1327 | 1325 | 1327 |
| | G band center (nm) | | 1563 | 1572 | 1568 |
| | $I_D/I_G$ | | 1.16 | 1.16 | 1.16 |
| BET | $S_{BET}$ ($m^2/g$) | | 213 | 245 | 503 |
| | $S_{micro}$ ($m^2/g$) | | 190 | 185 | 348 |
| | $S_{meso}$ ($m^2/g$) | | 23 | 60* | 155 |
| | Mesopore size range (nm) | | NA | 2-200* | 2-20 |
| | Total pore volume ($cm^3/g$) | | 0.102 | 0.385 | 0.450 |
| | Micropore volume ($cm^3/g$) | | 0.076 | 0.074 | 0.140 |
| | Mesopore volume* ($cm^3/g$) | | 0.026 | 0.311* | 0.310 |
| | C (%) | | 82.1 ± 0.2 | 84.8 ± 0.1 | 82.1 ± 0.6 |
| | N (%) | | 13.4 ± 0.4 | 9.8 ± 0.7 | 12.8 ± 0.1 |
| | O (%) | | 4.6 ± 0.2 | 5.4 ± 0.6 | 5.0 ± 0.6 |
| XPS | N—P | B.E. (eV) | 398.1 | 398.3 | 398.2 |
| | | Content (%) | 4.9 ± 0.1 | 3.0 ± 0.5 | 4.3 ± 0.1 |
| | N—X | B.E. (eV) | 400.6 | 400.8 | 400.7 |
| | | Content (%) | 5.5 ± 0.2 | 4.7 ± 0.2 | 5.8 ± 0.1 |
| | N—O | B.E. (eV) | 403.0 | 403.2 | 403.0 |
| | | Content (%) | 3.0 ± 0.2 | 1.9 ± 0.2 | 2.8 ± 0.1 |
| | C═O | B.E. (eV) | 530.3 | 530.8 | 530.3 |
| | | Content (%) | 0.5 ± 0.1 | 0.6 ± 0.2 | 0.4 ± 0.1 |
| | C—O | B.E. (eV) | 532.0 | 532.3 | 532.1 |
| | | Content (%) | 2.5 ± 0.1 | 2.5 ± 0.5 | 2.8 ± 0.5 |
| | O—H | B.E. (eV) | 533.4 | 533.4 | 533.6 |
| | | Content (%) | 1.6 ± 0.1 | 2.2 ± 0.3 | 1.8 ± 0.1 |

TABLE 2-continued

| | Characterizations | PAN-CFs | PAN/PMMA-CFs | PAN-b-PMMA-CFs |
|---|---|---|---|---|
| Electrical Properties | Equivalent series resistance $R_s$ (Ω) | 1.37 | 1.27 | 1.00 |
| | Charge transfer resistance $R_{ct}$ (Ω) | 3.43 | 2.95 | 1.49 |
| | Diffusion resistivity σ ($\Omega\ s^{-0.5}$) | 2.01 | 1.78 | 0.87 |
| | Bulk electrical resistivity ρ (Ω · cm) | 18.44 ± 1.57 | 14.12 ± 0.69 | 6.83 ± 0.27 |

The results can demonstrate that PAN-b-PMMA is a highly effective precursor to produce hierarchical meso- and micro-PCFs. In contrast to other carbon fiber precursors, PAN-b-PMMA requires no corrosive chemicals for postsynthesis activation, nor any additives to increase the surface area and to control the pore size. The narrow pore-size distribution and high surface area of PAN-b-PMMA-CFs are ascribed to the microphase separation of the block copolymer. The mesopore size of PCFs can be fine-tuned by the polymer molecular weight. The mesopore size is expected to increase as the molecular weight of PMMA is increased. The change in mesopore size will further alter the porosity, surface area, and electrochemical performance of the PCFs.

As supercapacitor electrodes, PAN-b-PMMA-CFs exhibit performance superior to both PAN-CFs and PAN/PMMA-CFs. The high capacitive performance is due to the interconnected micro- and mesoporous carbon structures with high porosity, high surface area, and low resistance. The micropores of about 0.5 nm and the uniform mesopores of about 10 nm are favorable for high-capacitance ion storage (21-23) with two main advantages. First, the micropores on the mesopore walls provide highly ion-accessible surface areas to improve the electrochemical double layer capacitance (FIG. 4A) (24). Second, the interconnected mesopores allow unperturbed ion transport and reduce the distances for ion diffusion from the bulk electrolyte to the micropores. In addition to the structural advantages, the hierarchical porous structure has a surface chemical composition with excellent electrolyte wettability, as revealed by x-ray photoelectron spectroscopy (XPS) (FIGS. 13A-13L and Table 2, XPS section). The gravimetric and area-normalized capacitances of PAN-b-PMMA-CFs were higher than any previously reported PCF electrodes. The ultrahigh values result from the synergistic effects of the interconnected hierarchical porous structures, the well-controlled pore sizes, and the electrochemically active nitrogen and oxygen functional groups that are easily accessible to ions (24). Because the PCFs are flexible, they are suitable for flexible electronics, among other applications.

In sum, this Example can demonstrate a method of using block copolymers for synthesizing PCFs with well-defined bimodal pores and outstanding electrochemical properties. PAN-b-PMMA was demonstrate to produce PCFs via self-assembly and pyrolysis, eliminating the tedious postsynthesis steps that other template or chemical activation methods require. Moreover, PAN-b-PMMA offers remarkable control over the pore size uniformity, better than PAN/PMMA and other polymer blends. Importantly, the area-normalized capacitance of the PCFs reaches 66 $\mu F\ cm^{-2}$, outperforming all previously reported carbon fibers, owing to their hierarchically interconnected meso- and micropores, rich nitrogen and oxygen contents, and self-supporting characteristics. Notably, our PCFs retain high capacitances at ultrahigh current densities, because the uniformly distributed mesopores facilitate ion diffusion across the fibers (22). The versatility of the method extends the frontier of PCFs nanotechnology and enables the development of advanced applications beyond electrochemical energy storage, such as catalysis, separation, purification, and wearable sensors (3, 11).

Materials and Methods

Materials

Acrylonitrile (AN, ≥99%), methyl methacrylate (MMA, ≥99%), 2,2'-azobis(2-methylpropionitrile) (AIBN, ≥98%), cumyl dithiobenzoate (CDB, ≥99%), benzene (≥99.9%), aluminium oxide (activated, neutral, Brockmann Activity I), N,N-dimethylformamide (DMF, ≥99.7/0), and dimethyl sulfoxide (DMSO, ≥99.9%) were purchased from Sigma-Aldrich. The monomers were passed through alumina columns to remove inhibitors before use. All other chemicals were used as received.

Synthesis of PAN-b-PMMA Block Copolymer

The PAN-b-PMMA block copolymer was synthesized by RAFT polymerization (31). First, a mixture of MMA (35.0 ml, 310 mmol), CDB (84.28 mg, 0.3094 mmol), and AIBN (25.42 mg, 0.1548 mmol) was dissolved in benzene (51.6 ml) in a 100 ml Schlenk flask. The mixture was subjected to three cycles of freeze-pump-thaw (FPT), followed by backfilling with $N_2$. Then, the flask was placed in an oil bath at 60° C. and stirred for 24 hours. The resulting PMMA macro-chain-transfer-agent (macro-CTA) was precipitated in methanol and dried under vacuum for 12 hours to completely evaporate the remaining solvent. The purified PMMA macro-CTA ($M_{n,\ SEC}$=about 62 kDa, PDI, 1.04) was used to synthesize PAN-b-PMMA block copolymers. PMMA macro-CTA (0.65 g, 11 μmol), AN (2.6 ml, 43 mmol), AIBN (0.44 mg, 2.7 μmol), and DMSO (7.22 ml) were mixed in a 40 ml Schlenk flask equipped with a magnetic stirring bar. The mixture was degassed by three FPT cycles and then heated in an oil bath at 65° C. under $N_2$ atmosphere for 24 hours. A PAN-b-PMMA block copolymer ($M_{n,\ SEC}$=about 173 kDa) with a PDI of 1.14 and a PAN volume fraction of 64% was obtained. The PAN-b-PMMA block copolymer was purified similarly to PMMA macro-CTA.

Preparation of Hierarchical PCFs

PAN-b-PMMA block copolymer was dissolved in DMF at a concentration of 14 weight %. The solution was stirred at 65° C. for 2 hours and then electrospun to polymer fiber mats at a feeding rate of 1.5 ml/hour under a voltage of 18 kV (Acopian Technical Company, Easton, PA). The polymer fibers were collected on an in-house-built rotary AI disc. After electrospinning, the fiber mat was peeled off from the collector and dried in a vacuum oven at 60° C. for 6 hours. Oxidation and pyrolysis of fibers were conducted in a tube furnace (Lindberg/Blue M, Asheville, NC). The fiber mat was first oxidized by heating from room temperature to 280° C. at a rate of 1° C. $min^{-1}$ and kept at 280° C. for 8 hours in air. After oxidation, the fiber mat was heated again from room temperature to 800° C. at a rate of 10° C. $min^{-1}$, followed by carbonization at the same temperature for 1 hour in a $N_2$ flow (200 standard cubic centimeters per minute). For comparison, pure PAN and a polymer blend of PAN and PMMA (denoted as PAN/PMMA; 64 volume % of PAN) were electrospun into polymer fiber mats and underwent the identical pyrolysis steps at 800° C. to obtain carbon fiber mats.

Electrochemical Characterization

The electrochemical capacitive performance of the carbon fiber mats was evaluated in a symmetric two-electrode configuration. To assemble the testing electrodes, carbon fiber mats with a mass loading of at least 1.0 mg were sandwiched between two pieces of cleaned nickel foam without any conductive additives or binders. An aqueous KOH solution (6 M) was used as the electrolyte. The two electrodes were placed in the aqueous electrolyte. The distance between the two electrodes was about 2 cm to avoid any physical contact or electrical short circuit.

CV and EIS were performed on a PARSTAT 4000+ electrochemical workstation (Princeton Applied Research, AMETEK Inc.). CP experiments were carried out by a battery test system (model 580, Scribner Associates, Inc.). The potential window chosen for both CV and CP was 0 to 0.8 V. EIS was conducted in a frequency range from 100 kHz to 0.1 Hz with a 10-mV perturbation. The electrochemical measurements of three-electrode cells were performed using a Gamry 600 (Gamry Instruments). The synthesized carbon fiber mat, a piece of bare nickel foam, and an Ag/AgCl (in saturated KCl) electrode were used as the working electrode, the counter electrode, and the reference electrode, respectively. The stability was evaluated by constant-current (100 A $g^{-1}$) charge-discharge tests and voltage-holding tests. For the voltage-holding tests, the supercapacitors were charged at a current density of 4 A $g^{-1}$, held at a maximum voltage of 0.8 V for 1 and 5 min, and then discharged at 4 A $g^{-1}$. The charge-hold-discharge process was repeated for 20 cycles.

The gravimetric capacitance (C inF $g^{-1}$) of supercapacitors was calculated using the discharge portion of the collected CP curves (53, 54)

$$C = \frac{4I\Delta t}{m\Delta V} \tag{1}$$

where l is the discharge current (A), Δt is the discharge time (s), ΔV is the potential window (V), and m is the sum of active material mass (g) of two electrodes.

Alternatively, C was evaluated from CV curves using the following equation:

$$C = \frac{1}{2(V_t - V_0)v}\int_{V_0}^{V_t} |I_m(V)| dV \tag{2}$$

where $l_m(V)$ is the current density (A $g^{-1}$), ν is the scan rate (mV $s^{-1}$), and $V_0$ and $V_t$ are the lower and upper potential limits of the chosen potential window, respectively.

The average area-normalized capacitance ($C_A$, μF $cm^{-2}$) was calculated the basis of the BET surface area according to the following formula:

$$C_A = \frac{c}{A_{BET}} \tag{3}$$

where $A_{BET}$ is the BET specific surface area ($m^2$ $g^{-1}$).

The energy density (E, Wh $kg^{-1}$) and power density (P, kW $kg^{-1}$) of the supercapacitors were evaluated by using the following formulas:

$$E_{cell} = \frac{1}{8}C\Delta V^2 \tag{4}$$

$$P = \frac{E_{cell}}{\Delta t} \tag{5}$$

Characterization and Instrumentation

Characterization of polymers: The conversions of monomers were measured by $^1$H NMR (400 MHz U4-DD2 Agilent spectrometer). The molecular weights of PAN, PMMA, and PAN-b-PMMA were measured by both $^1$H NMR and size exclusion chromatography (SEC, EcoSEC HLC-8320, Tosoh Bioscience). The SEC was equipped with a multi-angle light scattering detector (miniDAWN TREOS, Wyatt), a UV detector, and a differential refractive index detector. DMF was used as the eluent and the flow rate was 0.5 mL/min. Polymer solutions in DMF (50 μL, 1 mg/mL) were injected into the SEC, and the traces were collected at 50° C. The decomposition and pyrolysis profiles of PAN, PMMA, and PAN-b-PMMA were analyzed using a thermogravimetric analyzer (TA Instruments, TGA 5500) by heating the as-electrospun polymer fibers from the ambient temperature to 800° C. at a heating rate of 10° C./min under an $N_2$ atmosphere.

X-ray diffraction (XRD): The crystallinity of the porous carbon fibers was examined using an X-ray diffractometer (MiniFlex 600, Rigaku, Cu $K_\alpha$ radiation, λ=1.54 Å). The acceleration voltage and emission current were 40 kV and 15 mA, respectively. The XRD profiles were collected within a 2θ range from 10° to 80° at a scan speed of 0.3°/min and a step size of 0.05°. The interplanar spacing ($d_{002}$), the lateral size ($L_a$, also known as the in-plane crystal size), and the crystallite size ($L_a$) of the porous carbon fibers were calculated using the Bragg's law (Eq. 6) and Debye-Scherrer equations (Eqs. 7 and 8):

$$d_{002} = \lambda / 2\sin\theta \tag{6}$$

$$L_a = \frac{1.84\lambda}{\beta(10l)\cos\theta(10l)} \tag{7}$$

$$L_c = \frac{0.89\lambda}{\beta(002)\cos\theta(002)} \tag{8}$$

where θ and β are the diffraction angle and the full width at half maximum (FWHM) of diffraction peaks in radians, respectively. All the calculated values of these parameters for the carbon fibers are listed in Table 2.

X-ray photoelectron spectroscopy (XPS): The chemical structures and elemental analyses of the porous carbon fibers were carried out on an X-ray photoelectron spectroscope (PHI VersaProbe III) under a pressure of $10^{-9}$ torr. The XPS spectra were acquired using monochromatic Al $K_\alpha$ X-ray source (1486.6 eV) at 100 W over an area of 1400×100 μm$^2$ at an incident angle of 45°. The voltage step size was 1 eV for surveys and 0.1 eV for high-resolution scans. The dwell time at every step was 50 ms. All binding energies were referenced to adventitious C 1s at 284.8 eV. The chemical states of elements in the carbon fibers were assigned based on the PHI and NIST XPS databases. The atomic fraction of each element was calculated based on the area of each fitted peak.

Physisorption analysis: The surface area, absorbed volume and pore-size distribution (PSD) of carbon fibers were determined from $N_2$ (77.4 K) and $CO_2$ (273.2 K) adsorption-desorption isotherms using a Micromeritics-3Flex surface characterization analyzer. The surface area was calculated using a Brunauer-Emmett-Teller (BET) method in the linear range of $P/P_0$=0.01-0.1. The total pore volume was measured using a single point absorption at $P/P_0$ of ~0.99. The PSD was determined using non-local density functional theory (NLDFT). The micropore surface area and volume were calculated using the t-plot method (Harkins and Jura thickness equation) within the thickness range of 3.5 to 5.0 Å. Since the contribution from macropores was negligible for most carbon fibers (except the carbon fibers from PAN/PMMA blends), the mesopore area and volume were obtained by subtracting the micropore portions from the BET total surface area and total volume, respectively. The volume of macropores in porous carbon fibers derived from the PAN/PMMA blends was estimated using NLDFT.

Electron Microscopy: The as-electrospun polymer fibers, the oxidized fibers, and the pyrolyzed carbon fibers were imaged using a field-emission scanning electron microscope (SEM, LEO Zeiss 1550) at an acceleration voltage of 2 kV and a working distance of about 2-4 mm. The high-resolution transmission electron microscope (TEM, FEI Titan 300) operating at 300 kV was used to image the carbonaceous structures of carbon fibers.

Electrochemical impedance spectroscopy (EIS): The EIS was conducted on a PARSTAT 4000+ electrochemical workstation (Princeton Applied Research, AMETEK Inc.) in a frequency range from 100 kHz to 0.1 Hz with a 10-mV perturbation. The Nyquist plots were fitted with a selected equivalent circuit model (Fig. S5D) using an EIS data analysis software (ZSimpWin). The equivalent series resistance ($R_s$) and charge transfer resistance (Rd) were calculated based on fittings to the equivalent circuit model. The Warburg diffusion coefficients ($\sigma$, $\Omega s^{-0.5}$) were calculated by fitting of the real part of impedance (Z) versus the −½ power of the angular frequency ($\omega^{0.5}$) in a frequency range of 1-10 Hz. The fitted resistances and coefficients are listed in Table 2.

Raman analysis: Raman spectra were obtained on a Raman spectrometer (WITec alpha500 in combination with a Confocal Raman Microscope) in the range of 1000-1800 cm$^{-1}$ at a laser excitation wavelength of 633 nm.

Small angle X-ray scattering (SAXS): SAXS was performed on a Bruker N8 Horizon (Cu $K_\alpha$ radiation, $\lambda$=1.54 Å) at a generator voltage of 50 kV and a current of 1 mA. The Porod analyses were performed in the high-q range to extract the power index (x) of the Porod's Law, $I \sim q^x$. The extracted power indices are listed in Table 2.

Contact angle measurement: The contact angles of porous carbon fiber mats were measured on a goniometer (KINO Industry Co. Ltd.) using a solution of 6 M KOH as the liquid of interest. The droplet size was set to be about 8-10 μL for consistency of the measurements.

Four-point probe measurement: The bulk resistivity of carbon fiber mats was measured using a four-point probe system (JANDEL RM3-AR). The bulk resistivity ($\rho$, $\Omega\cdot$cm) is described as follows, $$\rho = 2\pi S \frac{V}{I} \tag{9}$$

where S is the probe spacing (0.1 cm), V is the voltage (V) and I is the current (A).

Calculation of Carbon Fiber Porosity Using Geometric Analysis

If the polymer fibers are fully consolidated to non-porous carbon fibers (NPCF) after pyrolysis, the diameter of the resulting non-porous carbon fibers can be estimated based on the densities of the polymers and carbon, the volumes of the polymer and carbon fibers, and the carbon yield (30.5%, as measured with thermogravimetric analysis (TGA)). In principle, the total mass of carbon should be balanced as follows, $$\rho_{polymer} V_{polymer} \times 30.5\% = \rho_{carbon} V_{carbon} \tag{10}$$

where the volume of the polymer fibers can be calculated assuming a fiber length of $L_{polymer}$, $$V_{polymer} = \pi \times \left(\frac{d_{polymer}}{2}\right)^2 \times L_{polymer} \tag{11}$$

and the volume of the non-porous carbon fibers can be similarly calculated assuming a fiber length of $L_{NPCF}$, $$V_{NPCF} = \pi \times \left(\frac{d_{NPCF}}{2}\right)^2 \times L_{NPCF} \tag{12}$$

where $\rho_{polymer}$, $d_{polymer}$, $L_{polymer}$, and $V_{polymer}$ are the density, diameter, length, and volume of the block copolymer fibers, respectively; $\rho_{NPCF}$, $d_{NPCF}$, $L_{NPCF}$, and $V_{NPCF}$ are the density, diameter, length, and volume of the non-porous carbon fibers, respectively.

According to the SEM images, the average diameter of PAN-b-PMMA fibers is 911±122 nm. The densities of the polymer and carbon are 1.18 and 2.25 g/cm$^3$, respectively. Assuming the length of fibers remains the same before and after pyrolysis ($L_{polymer} \approx L_{NPCF}$), the diameter of non-porous carbon fibers can be estimated as follows:

$$d_{NPCF} = \sqrt{\frac{\rho_{polymer} \times (d_{polymer})^2 \times 30.5\%}{\rho_{NPCF}}} = 364 \text{ nm} \tag{13}$$

According to the SEM images, the measured diameter of the porous carbon fibers ($d_{PCF}$) is 519±96 nm. Thus, the porosity ($\emptyset_{pore}$) of the porous carbon fibers (PCF) can be estimated by the fraction of pore volume in the measured carbon fibers, as follows $$\emptyset_{pore} = 1 - \frac{V_{NPCF}}{V_{PCF}} \times 100\% = 1 - \frac{d_{NPCF}^2}{d_{PCF}^2} \times 100\% = 50.8\% \tag{14}$$

where $V_{PCF}$ is the volume of non-porous carbon fibers.

Calculation of Carbon Fiber Porosity Using BET Analysis

In addition to the geometric analysis, Brunauer-Emmett-Teller (BET) measurements can also be used to estimate the porosity of PAN-b-PMMA-CFs. Using values obtained from BET analysis, the porosity ($\emptyset_{BET}$) of PAN-b-PMMA-CFs can be calculated as $$\emptyset_{BET} = \frac{V_{BET}}{V_{BET} + V_{NPCF}} \times 100\% = \frac{0.45}{0.45 + 1/2.25} \times 100\% = 50.6\% \quad (15)$$

where $V_{BET}$ is the total pore volume of PAN-b-PMMA-CFs measured by BET (as shown in Table S2), $V_{NPCF}$ is the total carbon volume based on carbon density (2.25 g/cm$^3$). The porosity of PAN-b-PMMA-CFs after pyrolysis at 800° C. was calculated to be ~50.6%, in excellent agreement with that determined using the geometric analysis (50.8%).

Calculation of the Degree of Mesopore Interconnectivity

Since the pyrolysis of PAN contributes little to the mesopore volume, as evidenced by the pore-size distributions (PSDs) of PAN-CFs (FIG. 3D), it can be assumed that the mesopores mostly arise by the removal of PMMA. In addition, assuming that all mesopores generated by PMMA are interconnected, we can calculate the theoretical total mesopore volume using the mass fraction of PMMA ($\psi_{PMMA}$). $\psi_{PMMA}$ can be determined using the following equation:

$$\psi_{PMMA} = \frac{M_{n,PMMA}}{M_{n,PMMA} + M_{n,PAN}} \times 100\% = \frac{62.0\ kDa}{111\ kDa + 62.0\ kDa} \times 100\% = 35.8\% \quad (16)$$

where $M_{n,PMMA}$ and $M_{n,PAN}$ are the number-averaged molecular weights of PMMA and PAN, respectively, as determined by SEC.

In 1 g of PAN-b-PMMA, the mass of PMMA is, $$m_{PMMA} = m_{BCP} \times \psi_{PMMA} = 1\ \text{g} \times 35.8\% = 0.358\ \text{g} \quad (17)$$

where $m_{BCP}$ is the total mass of PAN-b-PMMA. Note that the mass of the block copolymer is arbitrary and its value does not alter the final conclusion. We chose 1 g for simplicity.

Converting $m_{PMMA}$ to volume, we have $$V_{PMMA} = \frac{m_{PMMA}}{\rho_{PMMA}} = \frac{0.358\ \text{g}}{1.18\ \text{g cm}^{-3}} = 0.303\ \text{cm}^3 \quad (18)$$

where the density of PMMA is $\rho_{PMMA}$=1.18 g cm$^{-3}$. The char yield of PAN-b-PMMA is 30.5% according to TGA (Fig. S2A). Thus, the carbon from 1 g of PAN-b-PMMA is, $$m_C = 30.5\% \times 1\ g = 0.305\ g \quad (19)$$

Because the block copolymer fibers shrink significantly after pyrolysis, the mesopores shrink accordingly. The percentage of the volumetric shrinkage ($V_{shrink}$%) can be estimated by the difference in fiber diameters, assuming that the length of the fibers remains unchanged during the pyrolysis:

$$V_{shrink}\% = \frac{V_C}{V_{BCP}} \times 100\% = \frac{d_c^2}{d_{BCP}^2} \times 100\% = \frac{(519\ \text{nm})^2}{(911\ \text{nm})^2} \times 100\% = 32.5\% \quad (20)$$

where $V_C$, $V_{BCP}$, $d_C$ and $d_{BCP}$ are carbon fiber volume, block copolymer fiber volume, carbon fiber diameter, and block copolymer fiber diameter, respectively. Therefore, the theoretical mesopore volume is:

$$V_{mesopore,theo} = V_{shrink}\% \times \frac{V_{PMMA}}{m_C} = 32.5\% \times \frac{0.303\ \text{cm}^3}{0.305\ \text{g}} = 0.323\ (\text{cm}^3\text{g}^{-1}) \quad (21)$$

The experimentally measured mesopore volume ($V_{mesopore,exp}$) is 0.310 cm$^3$ g$^{-1}$ (Table 2, BET section). Comparing the theoretical value with the measured value, the degree of mesopore interconnectivity ($\eta$) is calculated to be 96.0%, indicating that the majority of the mesopores are interconnected.

$$\eta = \frac{V_{mesopore,exp}}{V_{mesopore,theo}} = \frac{0.310\ \text{cm}^3\text{g}^{-1}}{0.323\ \text{cm}^3\text{g}^{-1}} = 96.0\% \quad (22)$$

REFERENCES FOR EXAMPLE 1

1. D. Yu et al., Scalable synthesis of hierarchically structured carbon nanotube-graphene fibres for capacitive energy storage. *Nature Nanotechnology* 9, 555-562 (2014).
2. L. Liu, Y. Yu, C. Yan, K. Li, Z. Zheng, Wearable energy-dense and power-dense supercapacitor yarns enabled by scalable graphene-metallic textile composite electrodes. *Nature Communications* 6, 7260 (2015).
3. E. Frank, L. M. Steudle, D. Ingildeev, J. M. Spörl, M. R. Buchmeiser, Carbon fibers: precursor systems, processing, structure, and properties. *Angewandte Chemie International Edition* 53, 5262-5298 (2014).
4. S. Cavaliere, S. Subianto, I. Savych, D. J. Jones, J. Roziére, Electrospinning: designed architectures for energy conversion and storage devices. *Energy & Environmental Science* 4, 4761-4785 (2011).
5. G. Sun, J. Liu, L. Zheng, W. Huang, H. Zhang, Preparation of weavable, all-carbon fibers for non-volatile memory devices. *Angewandte Chemie International Edition* 52, 13351-13355 (2013).
6. M. Salanne et al., Efficient storage mechanisms for building better supercapacitors. *Nature Energy* 1, 16070-16079 (2016).
7. X. Lang, A. Hirata, T. Fujita, M. Chen, Nanoporous metal/oxide hybrid electrodes for electrochemical supercapacitors. *Nature Nanotechnology* 6, 232-236 (2011).
8. L.-Q. Mai et al., Synergistic interaction between redox-active electrolyte and binder-free functionalized carbon for ultrahigh supercapacitor performance. *Nature Communications* 4, 2923-2929 (2013).

9. S. M. Bhaway et al., Hierarchical electrospun and cooperatively assembled nanoporous Ni/NiO/MnOx/carbon nanofiber composites for lithium ion battery anodes. *ACS Applied Materials & Interfaces* 8, 19484-19493 (2016).
10. X. Lu, C. Wang, F. Favier, N. Pinna, Electrospun nanomaterials for supercapacitor electrodes: Designed architectures and electrochemical performance. *Advanced Energy Materials* 7, 1601301 (2017).
11. M. Inagaki, Y. Yang, F. Kang, Carbon nanofibers prepared via electrospinning. *Advanced Materials* 24, 2547-2566 (2012).
12. M. F. El-Kady, V. Strong, S. Dubin, R. B. Kaner, Laser scribing of high-performance and flexible graphene-based electrochemical capacitors. *Science* 335, 1326-1330 (2012).
13. M. F. El-Kady, R. B. Kaner, Scalable fabrication of high-power graphene micro-supercapacitors for flexible and on-chip energy storage. *Nature Communications* 4, 1475 (2013).
14. K. Naito, J.-M. Yang, Y. Xu, Y. Kagawa, Enhancing the thermal conductivity of polyacrylonitrile- and pitch-based carbon fibers by grafting carbon nanotubes on them. *Carbon* 48, 1849-1857 (2010).
15. E. A. Morris et al., High performance carbon fibers from very high molecular weight polyacrylonitrile precursors. *Carbon* 101, 245-252 (2016).
16. J. Cai et al., High-performance supercapacitor electrode from cellulose-derived, inter-bonded carbon nanofibers. *Journal of Power Sources* 324, 302-308 (2016).
17. R. Ding, H. C. Wu, M. Thunga, N. Bowler, M. R. Kessler, Processing and characterization of low-cost electrospun carbon fibers from organosolv lignin/polyacrylonitrile blends. *Carbon* 100, 126-136 (2016).
18. J. T. McCann, M. Marquez, Y. Xia, Highly porous fibers by electrospinning into a cryogenic liquid. *Journal of the American Chemical Society* 128, 1436-1437 (2006).
19. T. Chen, L. Dai, Macroscopic graphene fibers directly assembled from CVD-grown fiber-shaped hollow graphene tubes. *Angewandte Chemie* 127, 15160-15163 (2015).
20. J. Zhou et al., Ultrahigh volumetric capacitance and cyclic stability of fluorine and nitrogen co-doped carbon microspheres. *Nature Communications* 6, 8503-8510 (2015).
21. P. Simon, Y. Gogotsi, Materials for electrochemical capacitors. *Nature Materials* 7, 845-854 (2008).
22. Alexander C. Forse et al., Direct observation of ion dynamics in supercapacitor electrodes using in situ diffusion NMR spectroscopy. *Nature Energy* 2, 16216-16222 (2017).
23. J. Chmiola et al., Anomalous increase in carbon capacitance at pore sizes less than 1 nanometer. *Science* 313, 1760-1763 (2006).
24. A. S. Arico, P. Bruce, B. Scrosati, J. M. Tarascon, W. Van Schalkwijk, Nanostructured materials for advanced energy conversion and storage devices. *Nature Materials* 4, 366-377 (2005).
25. Y. Zhu et al., Carbon-based supercapacitors produced by activation of graphene. *Science* 332, 1537-1541 (2011).
26. G. Wang et al., Solid-state supercapacitor based on activated carbon cloths exhibits excellent rate capability. *Advanced Materials* 26, 2676-2682 (2014).
27. C. Kim et al., Synthesis and characterization of porous carbon nanofibers with hollow cores through the thermal treatment of electrospun copolymeric nanofiber webs. *Small* 3, 91-95 (2007).
28. Y. Yu, L. Gu, C. Zhu, P. A. van Aken, J. Maier, Tin nanoparticles encapsulated in porous multichannel carbon microtubes: preparation by single-nozzle electrospinning and application as anode material for high-performance li-based batteries. *Journal of the American Chemical Society* 131, 15984-15985 (2009).
29. Q. Shi, H. Liang, D. Feng, J. Wang, G. D. Stucky, Porous carbon and carbon/metal oxide microfibers with well-controlled pore structure and interface. *Journal of the American Chemical Society* 130, 5034-5035 (2008).
30. L. Ji, Z. Lin, A. J. Medford, X. Zhang, Porous carbon nanofibers from electrospun polyacrylonitrile/$SiO_2$ composites as an energy storage material. *Carbon* 47, 3346-3354 (2009).
31. Z. Zhou, G. Liu, Controlling the pore size of mesoporous carbon thin films through thermal and solvent annealing. *Small* 13, 1603107 (2017).
32. J. Bae, S. J. Park, O. S. Kwon, J. Jang, A unique embossed carbon layer from induced domain alignment in a block copolymer thin film under an electric field. *Chemical Communications* 49, 5456-5458 (2013).
33. C. Tang et al., Long-range ordered thin films of block copolymers prepared by zone-casting and their thermal conversion into ordered nanostructured carbon. *Journal of the American Chemical Society* 127, 6918-6919 (2005).
34. K. Yan et al., Design and preparation of highly structure-controllable mesoporous carbons at the molecular level and their application as electrode materials for supercapacitors. *Journal of Materials Chemistry A* 3, 22781-22793 (2015).
35. M. Zhong et al., Electrochemically active nitrogen-enriched nanocarbons with well-defined morphology synthesized by pyrolysis of self-assembled block copolymer. *Journal of the American Chemical Society* 134, 14846-14857 (2012).
36. F. S. Bates, G. H. Fredrickson, Block copolymer thermodynamics: theory and experiment. *Annual Review of Physical Chemistry* 41, 525-557 (1990).
37. M. Seo, M. A. Hillmyer, Reticulated nanoporous polymers by controlled polymerization-induced microphase separation. *Science* 336, 1422-1425 (2012).
38. M. Zhong et al., Preparation of porous nanocarbons with tunable morphology and pore size from copolymer templated precursors. *Materials Horizons* 1, 121-124 (2014).
39. M. Park, C. Harrison, P. M. Chaikin, R. A. Register, D. H. Adamson, Block copolymer lithography: periodic arrays of $\sim 10^{11}$ holes in 1 square centimeter. *Science* 276, 1401-1404 (1997).
40. C. M. Bates et al., Polarity-switching top coats enable orientation of sub-10-nm block copolymer domains. *Science* 338, 775-779 (2012).
41. R. Ruiz et al., Density multiplication and improved lithography by directed block copolymer assembly. *Science* 321, 936-939 (2008).

42. C. Tang, E. M. Lennon, G. H. Fredrickson, E. J. Kramer, C. J. Hawker, Evolution of block copolymer lithography to highly ordered square arrays. *Science* 322, 429-432 (2008).

43. C. T. Nguyen, D.-P. Kim, Direct preparation of mesoporous carbon by pyrolysis of poly(acrylonitrile-b-methylmethacrylate) diblock copolymer. *Journal of Materials Chemistry* 21, 14226-14230 (2011).

44. E. D. Gomez, J. Das, A. K. Chakraborty, J. A. Pople, N. P. Balsara, Effect of crosslinking on the structure and thermodynamics of lamellar block copolymers. Macromolecules 39, 4848-4859 (2006).

45. G. L. Hura et al., Robust, high-throughput solution structural analyses by small angle X-ray scattering (SAXS). *Nature Methods* 6, 606-612 (2009).

46. M. Thommes et al., Physisorption of gases, with special reference to the evaluation of surface area and pore size distribution (IUPAC Technical Report). *Pure and Applied Chemistry* 87, 1051-1069 (2015).

47. Y. Li et al., Nitrogen- and oxygen-enriched 3D hierarchical porous carbon fibers: synthesis and superior supercapacity. *Journal of Materials Chemistry* A 3, 14817-14825 (2015).

48. L. L. Zhang, X. S. Zhao, Carbon-based materials as supercapacitor electrodes. *Chemical Society Reviews* 38, 2520-2531 (2009).

49. X. Zhao, B. M. Sanchez, P. J. Dobson, P. S. Grant, The role of nanomaterials in redox-based supercapacitors for next generation energy storage devices. *Nanoscale* 3, 839-855 (2011).

50. J. Kang, J. Wen, S. H. Jayaram, A. Yu, X. Wang, Development of an equivalent circuit model for electrochemical double layer capacitors (EDLCs) with distinct electrolytes. *Electrochimica Acta* 115, 587-598 (2014).

51. Y. Xu et al., Holey graphene frameworks for highly efficient capacitive energy storage. *Nature Communications* 5, 4554-4561 (2014).

52. Y. Yuan et al., The influence of large cations on the electrochemical properties of tunnel-structured metal oxides. *Nature Communications* 7, 13374-13382 (2016).

53. M. D. Stoller, R. S. Ruoff, Best practice methods for determining an electrode material's performance for ultracapacitors. *Energy & Environmental Science* 3, 1294-1301 (2010).

54. C. Zhong et al., A review of electrolyte materials and compositions for electrochemical supercapacitors. *Chemical Society Reviews* 44, 7484-7539 (2015).

55. T. Zhu et al., Hierarchical porous and N-doped carbon nanotubes derived from polyaniline for electrode materials in supercapacitors. *Journal of Materials Chemistry A* 2, 12545-12551 (2014).

What is claimed is:

1. A porous carbon fiber comprising:

a carbon matrix; and mesopores, wherein the mesopores are uniformly distributed throughout the carbon matrix, wherein the mesopores are uniform in size, wherein at least 50% of the mesopores are interconnected; and micropores, wherein the micropores are distributed throughout the carbon matrix, and wherein at least 50% of the micropores are interconnected with one or more mesopores.

2. The porous carbon fiber of claim 1, wherein the micropores are uniformly distributed throughout the carbon matrix.

3. The porous carbon fiber of claim 1, wherein at least 90% of the mesopores are interconnected.

4. The porous carbon fiber of claim 1, wherein the peak size of the mesopores ranges from about 2 to about 50 nm.

5. The porous carbon fiber of claim 1, wherein the porosity of the porous carbon fiber ranges from about 20 to about 80 percent.

6. The porous carbon fiber of claim 1, wherein the BET surface area is greater than 300 $m^2 \cdot g^{-1}$.

7. The porous carbon fiber of claim 1, wherein the porous carbon fibers have a collective pore volume, wherein the collective pore volume ranging from about 0.05 to about 1 $cm^3/g$.

8. A carbon fiber matrix, wherein the carbon fiber matrix comprises:

a plurality of porous carbon fibers, wherein each of the carbon fibers in the plurality of porous carbon fibers comprise a carbon matrix;

mesopores, wherein the mesopores are uniformly distributed throughout the carbon matrix, wherein the mesopores are uniform in size, wherein at least 50% of the mesopores are interconnected; and micropores, wherein the micropores are distributed throughout the carbon matrix, and wherein at least 50% of the micropores are interconnected with one or more mesopores.

9. The carbon fiber matrix of claim 8, wherein the micropores are uniformly distributed throughout the carbon matrix.

10. The carbon fiber matrix of claim 8, wherein at least 90% of the mesopores are interconnected.

11. The carbon fiber matrix of claim 8, wherein the peak size of the mesopores range from about 2 to about 50 nm.

12. The carbon fiber matrix of claim 8, wherein the porosity of the porous carbon fibers ranges from about 25-75 percent.

13. The carbon fiber matrix of claim 8, wherein the BET surface area is about 500 $m^2\ g^{-1}$.

14. The carbon fiber matrix of claim 8, wherein the porous carbon fibers have a collective pore volume, wherein the collective pore volume ranges from about 0.05 to 1 $cm^3/g$.

15. A porous carbon fiber comprising:

mesopores, wherein the mesopores are uniformly distributed throughout the carbon matrix, wherein the mesopores are uniform in size, wherein at least 50% of the mesopores are interconnected; and micropores, wherein the micropores are distributed throughout the carbon matrix, wherein at least 50% of the micropores are interconnected with one or more mesopores, wherein the porous carbon fiber is manufactured from:

a precursor block co-polymer forming a polymer fiber, wherein the precursor block copolymer comprises at least two different polymers that are capable of microphase separation;

oxidizing the polymer fiber to form a microphase separated, oxidized, or crosslinked polymer fiber;

pyrolyzing the microphase separated oxidized or crosslinked polymer fiber to form the porous carbon fiber.

16. The porous carbon fiber of claim 15, wherein the precursor block copolymer is composed of two or more polymers selected from the group consisting of polyacrylonitrile, polyimide, polymethyl methacrylate, polystyrene, polyethylene, polyvinyl pyridine, polycarbonate, polyester, and polysaccharides and derivatives thereof.

17. The porous carbon fiber of claim 15, wherein at least 90% of the mesopores are interconnected.

18. The porous carbon fiber of claim 17, wherein the porosity of the porous carbon fiber is about 20-80 percent.

19. The porous carbon fiber of claim 1, wherein the peak size of the micropores is about 1 nm or less.

20. The porous carbon fiber of claim 19, wherein the peak size of the mesopores is about 10 nm.

* * * * *